United States Patent
Clayton, Jr. et al.

(10) Patent No.: US 12,331,977 B2
(45) Date of Patent: *Jun. 17, 2025

(54) METHOD OF CLEANING AN ICE MACHINE

(71) Applicant: Hoshizaki America, Inc., Peachtree City, GA (US)

(72) Inventors: Luther L. Clayton, Jr., Hogansville, GA (US); Hideki Sakakibara, Aichi (JP); Abdul Waheed, Tucson, AZ (US)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,431

(22) Filed: Apr. 5, 2024

(65) Prior Publication Data
US 2024/0247851 A1  Jul. 25, 2024

Related U.S. Application Data

(60) Continuation of application No. 17/524,893, filed on Nov. 12, 2021, now Pat. No. 11,953,250, which is a
(Continued)

(51) Int. Cl.
*F25C 1/12* (2006.01)
*F25C 1/00* (2006.01)
(Continued)

(52) U.S. Cl.
CPC ............... *F25C 1/12* (2013.01); *F25C 1/00* (2013.01); *F25C 5/182* (2013.01); *F25C 5/187* (2013.01);
(Continued)

(58) Field of Classification Search
CPC .... F25C 1/12; F25C 1/00; F25C 5/182; F25C 5/187; F25C 1/25; F25C 2400/12; F25C 2600/04; F25C 2700/02
See application file for complete search history.

(56) References Cited

U.S. PATENT DOCUMENTS 2,014,703 A  9/1935 Smith
2,983,109 A  5/1961 Leeson
(Continued)

FOREIGN PATENT DOCUMENTS

CN  201724491  1/2011
CN  202048725  11/2011
(Continued)

OTHER PUBLICATIONS

Bracket Synonyms, Bracket Antonyms_Thesaurus.com https://www.thesaurus.com/browse/bracket (2017) (Year: 2021).
(Continued)

*Primary Examiner* — Nael N Babaa
(74) *Attorney, Agent, or Firm* — Taylor English Duma LLP

(57) ABSTRACT

A method of cleaning an evaporator of an ice maker can include a first manual intervention comprising activating a switch of an ice maker, activating the switch of the ice maker comprising initiating an overall cleaning procedure; a first automatic step comprising signaling to a user that a second manual intervention comprising pouring one of a cleaning fluid and a sanitizing fluid into a tank of an evaporator case of the ice maker is required; the second manual intervention comprising pouring the one of the cleaning fluid and the sanitizing fluid into the tank; and a second automatic step comprising automatically initiating and completing at least one of a cleaning stage and a sanitizing stage upon completion of the second manual intervention, automatically initiating the at least one of the cleaning stage and the sanitizing stage comprising operating a cleaning valve of a water circuit of the ice maker by a main controller of the ice maker.

20 Claims, 41 Drawing Sheets

Related U.S. Application Data division of application No. 16/529,055, filed on Aug. 1, 2019, now Pat. No. 11,506,438.

(60) Provisional application No. 62/714,414, filed on Aug. 3, 2018, provisional application No. 62/714,412, filed on Aug. 3, 2018.

(51) Int. Cl.
  F25C 5/182 (2018.01)
  F25C 5/187 (2018.01)
  *F25C 1/25* (2018.01)
  *F25D 23/00* (2006.01)
  *F25D 23/06* (2006.01)
  *F28D 21/00* (2006.01)

(52) U.S. Cl.
  CPC ............ *F25C 1/25* (2018.01); *F25C 2400/12* (2013.01); *F25C 2600/04* (2013.01); *F25C 2700/02* (2013.01); *F25D 23/00* (2013.01); *F25D 23/006* (2013.01); *F25D 23/06* (2013.01); *F25D 23/063* (2013.01); *F28D 21/00* (2013.01); *F28F 2275/085* (2013.01)

(56) References Cited

U.S. PATENT DOCUMENTS

| | | |
|---|---|---|
| 2,997,861 A | 8/1961 | Kocher et al. |
| 3,130,556 A | 4/1964 | Goldsborough |
| 3,280,585 A | 10/1966 | Lowe |
| 3,430,452 A | 3/1969 | Dedricks et al. |
| 3,511,059 A | 5/1970 | Hoenisch et al. |
| 3,520,581 A | 7/1970 | Borghi |
| 3,546,896 A | 12/1970 | Hagen et al. |
| 3,650,121 A | 3/1972 | Kimpel et al. |
| 3,769,809 A | 11/1973 | Robinson et al. |
| 4,158,908 A | 6/1979 | Block et al. |
| 4,344,298 A | 8/1982 | Biemiller |
| 4,366,679 A | 1/1983 | Van Steenburgh, Jr. |
| 4,412,429 A | 11/1983 | Kohl |
| 4,417,450 A | 11/1983 | Morgan, Jr. et al. |
| 4,425,964 A | 1/1984 | Nelson |
| 4,458,503 A | 7/1984 | Nelson |
| 4,489,567 A | 12/1984 | Kohl |
| 4,510,114 A | 4/1985 | Nelson |
| 4,526,014 A | 7/1985 | Suyama et al. |
| 4,555,913 A | 12/1985 | Ishiguro |
| 4,573,325 A | 3/1986 | Chiu et al. |
| 4,580,410 A | 4/1986 | Toya |
| 4,589,261 A | 5/1986 | Ohashi et al. |
| 4,590,774 A | 5/1986 | Povajnuk |
| 4,622,832 A | 11/1986 | Hagen |
| 4,823,559 A | 4/1989 | Hagen |
| 4,862,706 A | 9/1989 | Yoshida et al. |
| 4,986,088 A | 1/1991 | Nelson |
| 4,995,245 A | 2/1991 | Chang |
| 5,060,484 A | 10/1991 | Bush et al. |
| 5,097,897 A | 3/1992 | Watanabe et al. |
| 5,182,925 A | 2/1993 | Alvarez et al. |
| 5,186,022 A | 2/1993 | Kim |
| 5,239,839 A | 8/1993 | James |
| 5,245,841 A | 9/1993 | Paul et al. |
| 5,289,691 A | 3/1994 | Schlosser et al. |
| 5,291,752 A | 3/1994 | Alvarez et al. |
| 5,345,782 A | 9/1994 | Takahashi et al. |
| 5,477,694 A | 12/1995 | Black et al. |
| 5,479,707 A | 1/1996 | Alvarez et al. |
| 5,513,432 A | 5/1996 | Sasaki et al. |
| 5,520,011 A | 5/1996 | Hibino |
| 5,524,453 A | 6/1996 | James |
| 5,586,439 A | 12/1996 | Schlosser et al. |
| 5,606,869 A | 3/1997 | Joo |
| 5,797,451 A | 8/1998 | Grant |
| 5,941,091 A | 8/1999 | Broadbent |
| 6,000,228 A | 12/1999 | Johnson et al. |
| 6,076,749 A | 6/2000 | Moore et al. |
| 6,148,621 A | 11/2000 | Byczynski et al. |
| 6,148,633 A | 11/2000 | Yamada et al. |
| 6,161,396 A | 12/2000 | Allison et al. |
| 6,167,711 B1 | 1/2001 | Slattery et al. |
| 6,205,807 B1 | 3/2001 | Broadbent |
| 6,230,511 B1 | 5/2001 | Lee et al. |
| 6,247,318 B1 | 6/2001 | Stensrud et al. |
| 6,311,501 B1 | 11/2001 | Allison et al. |
| 6,334,328 B1 | 1/2002 | Brill |
| 6,347,526 B1 | 2/2002 | Ledbetter |
| 6,349,557 B1 | 2/2002 | Gresham |
| 6,370,908 B1 | 4/2002 | James |
| 6,463,746 B1 | 10/2002 | Bethuy et al. |
| 6,484,530 B1 | 11/2002 | Hibino et al. |
| 6,619,051 B1 | 9/2003 | Kilawee |
| 6,725,675 B2 | 4/2004 | Kampert et al. |
| 6,742,576 B2 | 6/2004 | Bergevin |
| 7,017,355 B2 | 3/2006 | Allison et al. |
| 7,093,816 B2 | 8/2006 | Lacan et al. |
| 7,225,628 B2 | 6/2007 | Furukawa et al. |
| 7,243,508 B2 | 7/2007 | Sanuki et al. |
| 7,281,385 B2 | 10/2007 | Wakatsuki |
| 7,340,913 B2 | 3/2008 | Miller et al. |
| 7,444,829 B2 | 11/2008 | Mori et al. |
| 7,556,236 B2 | 7/2009 | Slappay |
| 7,703,299 B2 | 4/2010 | Schlosser et al. |
| 7,779,641 B2 | 8/2010 | Lee et al. |
| 8,042,344 B2 | 10/2011 | Morimoto et al. |
| 8,375,738 B2 | 2/2013 | Kawasumi et al. |
| 8,635,877 B2 | 1/2014 | Kim et al. |
| 8,677,774 B2 | 3/2014 | Yamaguchi et al. |
| 8,677,777 B2 | 3/2014 | Yamaguchi et al. |
| 8,844,312 B2 | 9/2014 | Yoshida et al. |
| 8,845,047 B2 | 9/2014 | Luisi et al. |
| 8,857,198 B2 | 10/2014 | Styn et al. |
| 9,017,485 B2 | 4/2015 | Murthy et al. |
| 9,056,337 B2 | 6/2015 | Walker et al. |
| 9,146,049 B2 | 9/2015 | Yamaguchi et al. |
| 9,604,324 B2 | 3/2017 | An et al. |
| 9,643,742 B2 | 5/2017 | Metzger |
| 9,644,879 B2 | 5/2017 | Broadbent |
| 9,688,423 B2 | 6/2017 | Metzger |
| 9,719,710 B2 | 8/2017 | Yang |
| 9,733,003 B2 | 8/2017 | Hoti |
| 9,803,907 B2 | 10/2017 | Erbs et al. |
| 9,845,982 B2 | 12/2017 | Knatt |
| 9,857,117 B2 | 1/2018 | Kim |
| 9,863,682 B2 | 1/2018 | Broadbent |
| 9,869,502 B2 | 1/2018 | Gardner et al. |
| 9,885,511 B2 | 2/2018 | Brunner et al. |
| 9,933,195 B2 | 4/2018 | Roth et al. |
| 9,939,186 B2 | 4/2018 | Roth et al. |
| 10,107,538 B2 | 10/2018 | Hoti et al. |
| 10,113,785 B2 | 10/2018 | Melton et al. |
| 10,458,692 B2 | 10/2019 | Melton et al. |
| 10,677,504 B2 | 6/2020 | Kim |
| 11,506,438 B2 | 11/2022 | Huckaby et al. |
| 11,953,250 B2 | 4/2024 | Clayton, Jr. et al. |
| 2003/0089120 A1 | 5/2003 | Kampert et al. |
| 2004/0026599 A1 | 2/2004 | Lacan et al. |
| 2005/0103726 A1 | 5/2005 | Palm et al. |
| 2005/0109056 A1 | 5/2005 | Rand et al. |
| 2005/0252233 A1 | 11/2005 | Sanuki et al. |
| 2006/0032263 A1 | 2/2006 | Sanuki et al. |
| 2006/0272339 A1 | 12/2006 | Wakatsuki |
| 2007/0101753 A1 | 5/2007 | Broadbent |
| 2007/0214809 A1 | 9/2007 | DiLorenzo |
| 2008/0264090 A1 | 10/2008 | Sowa et al. |
| 2009/0013710 A1 | 1/2009 | Cho et al. |
| 2009/0100847 A1 | 4/2009 | Moon et al. |
| 2009/0165492 A1 | 7/2009 | Wilson et al. |
| 2009/0272130 A1 | 11/2009 | Kim et al. |
| 2010/0126210 A1 | 5/2010 | Rotter et al. |
| 2010/0250005 A1 | 9/2010 | Hawkes et al. |
| 2010/0257886 A1 | 10/2010 | Suzuki et al. |
| 2011/0005263 A1 | 1/2011 | Yamaguchi et al. |
| 2012/0031114 A1 | 2/2012 | Mueller et al. |

(56) References Cited

U.S. PATENT DOCUMENTS

| | | |
|---|---|---|
| 2012/0031135 A1 | 2/2012 | Schill |
| 2012/0121322 A1 | 5/2012 | Minelli |
| 2012/0198870 A1 | 8/2012 | Erbs et al. |
| 2013/0298405 A1 | 11/2013 | An et al. |
| 2014/0007629 A1 | 1/2014 | Arendsee |
| 2014/0013781 A1 | 1/2014 | Antoine et al. |
| 2014/0015394 A1 | 1/2014 | Cha et al. |
| 2014/0027098 A1 | 1/2014 | Alahyari et al. |
| 2014/0138065 A1 | 5/2014 | Hoti |
| 2015/0219380 A1 | 8/2015 | Murthy et al. |
| 2015/0375349 A1 | 12/2015 | Gotterbarm et al. |
| 2016/0054043 A1 | 2/2016 | Broadbent |
| 2016/0081365 A1 | 3/2016 | Bertone |
| 2016/0138846 A1 | 5/2016 | Kim |
| 2016/0231045 A1 | 8/2016 | Wait et al. |
| 2016/0290697 A1 | 10/2016 | Broadbent et al. |
| 2016/0298892 A1 | 10/2016 | Matsumoto |
| 2016/0298893 A1 | 10/2016 | Knatt et al. |
| 2016/0298894 A1 | 10/2016 | Matsumoto |
| 2016/0334157 A1 | 11/2016 | Broadbent et al. |
| 2016/0370061 A1 | 12/2016 | Erbs |
| 2016/0370097 A1 | 12/2016 | Yang |
| 2017/0067678 A1 | 3/2017 | Melton et al. |
| 2017/0122643 A1 | 5/2017 | Cravens et al. |
| 2017/0176077 A1 | 6/2017 | Knatt |
| 2017/0176078 A1 | 6/2017 | Roth et al. |
| 2017/0191723 A1 | 7/2017 | Gardner et al. |
| 2017/0205129 A1 | 7/2017 | Metzger |
| 2017/0211863 A1 | 7/2017 | Nuss et al. |
| 2017/0215620 A1 | 8/2017 | Dade et al. |
| 2017/0227274 A1 | 8/2017 | Almblad |
| 2017/0234594 A1 | 8/2017 | Mitchell et al. |
| 2017/0248357 A1 | 8/2017 | Gardner et al. |
| 2017/0370628 A1 | 12/2017 | Knatt |
| 2018/0017304 A1 | 1/2018 | Knatt |
| 2018/0017306 A1 | 1/2018 | Miller |
| 2018/0031294 A1 | 2/2018 | Olson, Jr. et al. |
| 2018/0038623 A1 | 2/2018 | Hoti |
| 2018/0058743 A1 | 3/2018 | Vorosmarti, III et al. |
| 2018/0106521 A1 | 4/2018 | Broadbent et al. |
| 2018/0142932 A1 | 5/2018 | Kantt et al. |
| 2019/0056162 A1 | 2/2019 | Hoti et al. |
| 2019/0063814 A1 | 2/2019 | Melton et al. |
| 2020/0041187 A1 | 2/2020 | Huckaby et al. |
| 2022/0065515 A1 | 3/2022 | Clayton, Jr. et al. |

FOREIGN PATENT DOCUMENTS

| | | |
|---|---|---|
| CN | 106288619 | 1/2017 |
| DE | 3121267 | 12/1982 |
| DE | 202005002060 U1 | 6/2006 |
| EP | 2077429 | 7/2009 |
| EP | 2400243 | 12/2011 |
| EP | 3604984 B1 | 3/2024 |
| FR | 1402030 | 5/1965 |
| GB | 151075 | 9/1920 |
| GB | 1182971 | 3/1970 |
| GB | 1216693 | 12/1970 |
| GB | 1244831 | 9/1971 |
| GB | 2212899 | 8/1989 |
| JP | 1971036930 | 12/1971 |
| JP | S5428755 | 2/1979 |
| JP | S56132584 | 10/1981 |
| JP | S58110791 | 7/1983 |
| JP | S61-28998 U | 2/1986 |
| JP | S6383582 | 6/1988 |
| JP | H02169979 | 6/1990 |
| JP | H07310966 | 11/1995 |
| JP | 1998096574 | 4/1998 |
| JP | 3936831 | 12/2001 |
| JP | 2003535296 | 11/2003 |
| JP | 2005090814 | 4/2005 |
| JP | 2006064317 | 3/2006 |
| JP | 2006078157 | 3/2006 |
| JP | 2006118848 | 5/2006 |
| JP | 2006145193 | 6/2006 |
| JP | 2006250448 | 9/2006 |
| JP | 2006275481 | 10/2006 |
| JP | 2006349193 | 12/2006 |
| JP | 2008008538 A | 1/2008 |
| JP | 2008244275 | 10/2008 |
| JP | 4428494 B2 | 3/2010 |
| JP | 2011075232 | 4/2011 |
| JP | 2011141090 A | 7/2011 |
| JP | 2012052704 | 3/2012 |
| JP | 2015500977 A | 1/2015 |
| JP | 5830189 | 12/2015 |
| JP | 2016502062 | 1/2016 |
| JP | 2025061503 A | 4/2025 |
| KR | 970075756 | 12/1997 |
| KR | 20010059566 | 7/2001 |
| KR | 100791586 | 11/2007 |
| KR | 20090004995 | 5/2009 |
| KR | 1020150124222 | 11/2015 |
| WO | 8907228 | 8/1989 |
| WO | 9801714 | 1/1998 |
| WO | 0070278 | 11/2000 |
| WO | 200319091 | 3/2003 |
| WO | 2009134102 | 11/2009 |
| WO | 2013096808 | 6/2013 |
| WO | 201486405 | 6/2014 |
| WO | 2014105838 | 7/2014 |
| WO | 2018011711 | 1/2018 |
| WO | 2018098110 | 5/2018 |

OTHER PUBLICATIONS

Friction welding—Wikipedia, the free encyclopedia, https://en.wikipedia.org/wiki/Friction_welding (2015) (Year: 2021).

Huckaby, Sandra A.; Applicant-Initiated Interview Summary for U.S. Appl. No. 16/529,055, filed Aug. 1, 2019, mailed Dec. 17, 2021, 4 pgs.

Huckaby, Sandra A.; Applicant-Initiated Interview Summary for U.S. Appl. No. 16/529,055, filed Aug. 1, 2019, mailed May 25, 2022, 2 pgs.

Huckaby, Sandra A.; Applicant-Initiated Interview Summary for U.S. Appl. No. 16/529,055, filed Aug. 1, 2019, mailed Aug. 13, 2021, 10 pgs.

Huckaby, Sandra A.; Final Office Action for U.S. Appl. No. 16/529,055, filed Aug. 1, 2019, mailed Nov. 2, 2021, 33 pgs.

Huckaby, Sandra A.; Non-Final Office Action for U.S. Appl. No. 16/529,055, filed Aug. 1, 2019, mailed May 13, 2021, 54 pgs.

Huckaby, Sandra A.; Notice of Allowance for U.S. Appl. No. 16/529,055, filed Aug. 1, 2019, mailed Jul. 27, 2022, 9 pgs.

Huckaby; Sandra A.; Non-Final Office Action for U.S. Appl. No. 16/529,055, filed Aug. 1, 2019, mailed Feb. 25, 2022, 34 pgs.

Integral, American Heritage Dictionary, https://www.ahdictionary.com/word/search.html?q=integral (Year: 2022).

Level Sensors www.engineersgarage.com level-sensors (2012) (Year: 2012).

Matt Lombard, Solidworks Bible, Table of Contents and Chap38, 2013 (Year: 2013).

Monolithic Definition & Meaning—Merriam-Webster (Year: 2021).

MySolidWorks, Surface Mesh Edit/ Review PropertyManager, Online help, https://my.solidworks.com/reader/onlinehelp/2021%252Fenglish%252Fswplastics%252Fhidd_edit_mesh_analysis.htm/surface-mesh-editreview-propertymanager, 2021 (Year: 2021).

Paul A Tres Designing plastic parts for assembly 8th edition 2017 (Year: 2017).

Spout, American Heritage Dictionary, https://www.ahdictionary.com/word/search.html?q=spout, 2022 (Year: 2022).

Trimod Besta Level Switch Catalogue (2013) (Year: 2013).

Feb. 1, 2016 FOLLET -20C FZR 20_25-LB, -30C FZR 20_25PL below serial No. J62764, Feb. 1, 2016 (Year: 2016).

Clayton Jr., Luther L.; Applicant-Initiated Interview Summary for U.S. Appl. No. 17/524,893, filed Nov. 12, 2021, mailed Apr. 17, 2023, 5 pgs.

Clayton Jr., Luther L.; Final Office Action for U.S. Appl. No. 17/524,893, filed Nov. 12, 2021, mailed Jul. 14, 2023, 39 pgs.

(56) References Cited

OTHER PUBLICATIONS

Clayton Jr., Luther L.; Non-Final Office Action for U.S. Appl. No. 17/524,893, filed Nov. 12, 2021, mailed Jan. 17, 2023, 44 pgs.
Clayton Jr., Luther L; Notice of Allowance for U.S. Appl. No. 17/524,893, filed Nov. 12, 2021, mailed Nov. 7, 2023, 12 pgs.
Cleaning, definition and meaning, Merriam Webster online, https://www.merriam-webster.com/dictionary/cleaning, accessed Apr. 13, 2023 (Year: 2023).
Drinking water—Wikipedia, https://en.wikipedia.org/wiki/Drinking_water, accessed Jan. 2023 (Year: 2022).
Follett Products, LLC, Symphony Plus Cleaning, Descaling and Sanitizing Video, https://www.youtube.com/watch?v=Q13RTYd9zHY, Jan. 9, 2015 (Year: 2015).
Follett Products, LLC, Symphony Plus™ 25 and 50 Series Ice and Water Dispensers—Installation, Operation and Service Manual, Apr. 2017 (Year: 2017).
Follett Products, LLC, Symphony Plus™ 25 and 50 Series Ice and Water Dispensers: 25CI425A/W, 25HI425A, 50CI425A/W, 50HI425A Installation, Operation and Service Manual, Sep. 7, 2017 (Year: 2017).
Follett Products, LLC, Symphony_Plus_Cleaning-Descaling_and_Sanitizing-Video-Captioning, Jan. 9, 2015 (Year: 2015).
Manitowoc Ice, Inc.; Installation Use and Care Manual for Q Model AuCS A Accessory, Copyright 2002, 28 pgs.
Pulse, definition and meaning, Merriam Webster online, https://www.merriam-webster.com/dictionary/pulse, accessed Apr. 13, 2023 (Year: 2023).
Sanitize, definition and meaning, Merriam Webster online, https://www.merriam-webster.com/dictionary/sanitize, accessed Apr. 13, 2023 (Year: 2023).
Water purification—Wikipedia, https://en.wikipedia.org/wiki/Water purification (Year: 2022).
What's the Difference Between Cleaning, Sanitizing and Disinfecting?, Clorox online, https://www.clorox.com/learn/difference-between-cleaning-sanitizing-and-disinfecting/, accessed Apr. 13, 2023 (Year: 2023).
World Health Organization pH in Drinking water, WHO/SDE/WSH/07.01/1, 2007 (Year: 2007).
Huckaby, Sandra; Office Action for Chinese patent application No. 20190706967.4, filed Aug. 1, 2019, mailed Jul. 9, 2021, 18 pgs.
Huckaby, Sandra A.; Office Action for Japanese patent application No. 2019-143374, filed Aug. 2, 2019, mailed Jun. 2, 2022, 7 pgs.
Huckaby, Sandra A.; Office Action for Japanese patent application No. 2019-143374, filed Aug. 2, 2019, mailed Jul. 1, 2021, 15 pgs.
Huckaby, Sandra A.; Office Action for Canadian patent application No. 3,051,128, filed Aug. 2, 2019, mailed Nov. 15, 2021, 4 pgs.
Huckaby, Sandra A.; Office Action for Canadian patent application No. 3,051,128, filed Aug. 2, 2019, mailed Mar. 9, 2023, 5 pgs.
Huckaby, Sandra A.; Office Action for Canadian patent application No. 3,051,128, filed Aug. 2, 2019, mailed May 13, 2024, 5 pgs.
Huckaby, Sandra A.; Office Action for Canadian patent application No. 3,051,128, filed Aug. 2, 2019, mailed Jun. 21, 2022, 5 pgs.
Huckaby, Sandra A.; Extended European Search Report for serial No. 19189919.4, filed Aug. 2, 2019, mailed Dec. 6, 2019, 10 pgs.
Huckaby, Sandra A.; Office Action for European patent application No. 19189919.4, filed Aug. 2, 2019, mailed Jun. 18, 2021, 7 pgs.
Huckaby, Sandra A.; Office Action for Canadian patent application No. 3,177,110, filed Aug. 2, 2019, mailed Mar. 26, 2024, 5 pgs.
Huckaby, Sandra A.; Office Action for Japanese patent application No. 2022-202018, filed Aug. 2, 2019, mailed Jan. 11, 2024, 18 pgs.
Huckaby, Sandra A.; Extended European Search report for application No. 24154001.2, filed Aug. 2, 2019, mailed Apr. 25, 2024, 8 pgs.
Huckaby, Sandra; Office Action for Chinese patent application No. 20190706967.4, filed Aug. 1, 2019, mailed Jan. 26, 2022, 16 pgs.
Hoti, Milaim; Advisory Action for U.S. Appl. No. 14/022,887, filed Sep. 10, 2013, mailed May 11, 2017, 3 pgs.
Hoti, Milaim; Advisory Action for U.S. Appl. No. 14/022,887, filed Sep. 10, 2013, mailedNov. 2, 2017, 6 pgs.
Hoti, Milaim; Applicant Interview Summary for U.S. Appl. No. 14/022,887, filed Sep. 10, 2013, mailed Mar. 21, 2017, 3 pgs.
Hoti, Milaim; Applicant-Initiated Interview Summary for U.S. Appl. No. 14/022,887, filed Sep. 10, 2013, mailed Mar. 12, 2018, 3 pgs.
Hoti, Milaim; Final Office Action for U.S. Appl. No. 14/022,887, filed Sep. 10, 2013, mailed Mar. 2, 2017, 8 pgs.
Hoti, Milaim; Final Office Action for U.S. Appl. No. 14/022,887, filed Sep. 10, 2013, mailed Jun. 22, 2017, 10 pgs.
Hoti, Milaim; Issue Notification for U.S. Appl. No. 14/022,887, filed Sep. 10, 2013, mailed Oct. 3, 2018, 1 pg.
Hoti, Milaim; Non-Final Office Action for U.S. Appl. No. 14/022,887, filed Sep. 10, 2013, mailed Dec. 15, 2017, 12 pgs.
Hoti, Milaim; Notice of Allowance for U.S. Appl. No. 14/022,887, filed Sep. 10, 2013, mailed Jun. 8, 2018, 15 pgs.
Hoti, Milaim; Supplemental Notice of Allowance for U.S. Appl. No. 14/022,887, filed Sep. 10, 2013, mailed Sep. 24, 2018, 9 pgs.
Hoti, Miliam; Non-Final Office Action for U.S. Appl. No. 14/022,887, filed Sep. 10, 2013, mailed Sep. 21, 2016, 12 pgs.
Hoti, Miliam; Restriction Requirement for U.S. Appl. No. 14/022,887, filed Sep. 10, 2013, mailed Jul. 6, 2016, 10 pgs.
Melton, Glenn O'Neal; Applicant-Initiated Interview Summary for U.S. Appl. No. 15/353,833, filed Nov. 17, 2016, mailed Mar. 13, 2018, 3 pgs.
Melton, Glenn O'Neal; Issue Notification for U.S. Appl. No. 15/353,833, filed Nov. 17, 2016, mailed Oct. 10, 2018, 1 pg.
Melton, Glenn O'Neal; Non-Final Office Action for U.S. Appl. No. 15/353,833, filed Nov. 17, 2016, mailed Jan. 3, 2018, 22 pgs.
Melton, Glenn O'Neal; Notice of Allowance for U.S. Appl. No. 15/353,833, filed Nov. 17, 2016, mailed Jun. 28, 2018, 15 pgs.
Melton, Glenn O'Neal; Supplemental Notice of Allowance for U.S. Appl. No. 15/353,833, filed Nov. 17, 2016, mailed Sep. 14, 2018, 9 pgs.
Melton, Glenn O'Neal; Applicant-Initiated Interview Summary for U.S. Appl. No. 16/172,042, filed Oct. 26, 2018, mailed Jul. 12, 2019, 8 pgs.
Melton, Glenn O'Neal; Non-Final Office Action for U.S. Appl. No. 16/172,042, filed Oct. 26, 2018, mailed Apr. 16, 2019, 28 pgs.
Melton, Glenn O'Neal; Notice of Allowance for U.S. Appl. No. 16/172,042, filed Oct. 26, 2018, mailed Jul. 31, 2019, 9 pgs.
Baxter, Van D.; Ice-Maker Heat Pump Development: Final Report; Oak Ridge National Laboratory, published Sep. 1980, 91 pgs.
Fischer, H.C.; Development and Testing of a Side-Plate and a Two-Plate Ice-Maker Heat Pump; Oak Ridge National Laboratory; published Apr. 1978, 54 pgs.
Hoshizaki America, Inc.; Specification Sheet for KM-515M_J Slim-Line Modular Crescent Cuber, Feb. 23, 2018, 2 pgs.
Hoshizaki America, Inc.; Service Manual for Modular Crescent Cuber, Dec. 18, 2017, 63 pgs.
Hoshizaki Crescent Ice Maker KM Series, The Wayback Machine, 2 pgs. (Year: 2009).
Hoshizaki Europe Catalog, The Wayback Machine, http://en.hoshizakieurope.com/catalogs/1270028976_Hoshi_PL_EXP_ZP_%28lr%29_def.pdf, 40 pgs. (Year: 2011).
Hoshizaki Icemaker KM (Crescent), The Wayback Machine, http://en.hoshizaki-europe.com/product/series/id/4/KM_Crescent, 2 pgs. (Year: 2011).
Hoshizaki Large Icemaker Crescent Ice Maker KM Series, The Wayback Machine, http://en.hoshizaki.co.jp/p/big-ice/detail4.html, 2 pgs. (Year: 2009).
Somerville, M.H.; The Design and Development of a Split Evaporator Heat-Pump System; Oak Ridge National Laboratory, published Dec. 1981, 247 pgs.
TIG R-22 Series TIGAR Ammonia Series Ice Makers, TURBO Refrigerating, http://www.vogtice.com/vogt_ice/details/TIG-TIGAR.pdf, 6 pgs. (Year: 2005).
Melton, Glenn O'Neal; Extended European Search Report for serial No. 17202170.1, filed Nov. 16, 2017, mailed Apr. 5, 2018, 9 pgs.
Huckaby, Sandra A.; Office Action for Japanese patent application No. 2022-202018, filed Aug. 2, 2019, mailed Sep. 19, 2024, 13 pgs.
Huckaby, Sandra A.; Office Action for Japanese patent application No. 2025-007969, filed Aug. 2, 2019, mailed Mar. 13, 2025, 20 pgs.

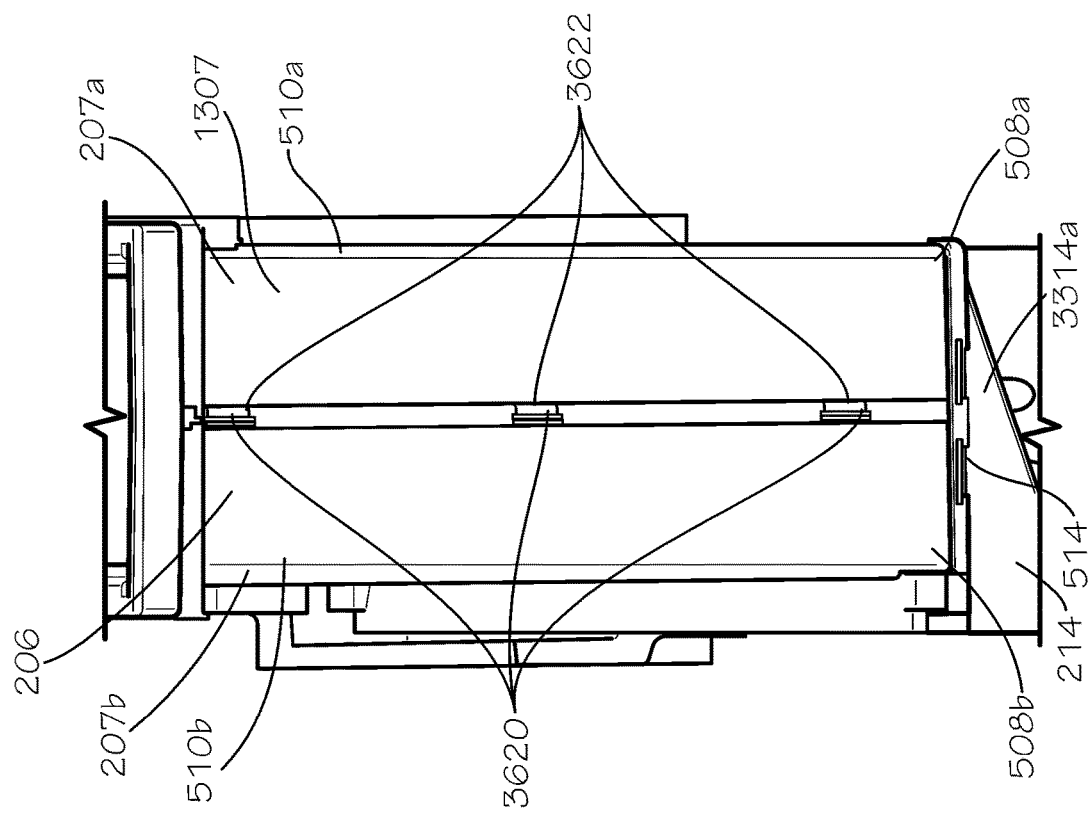
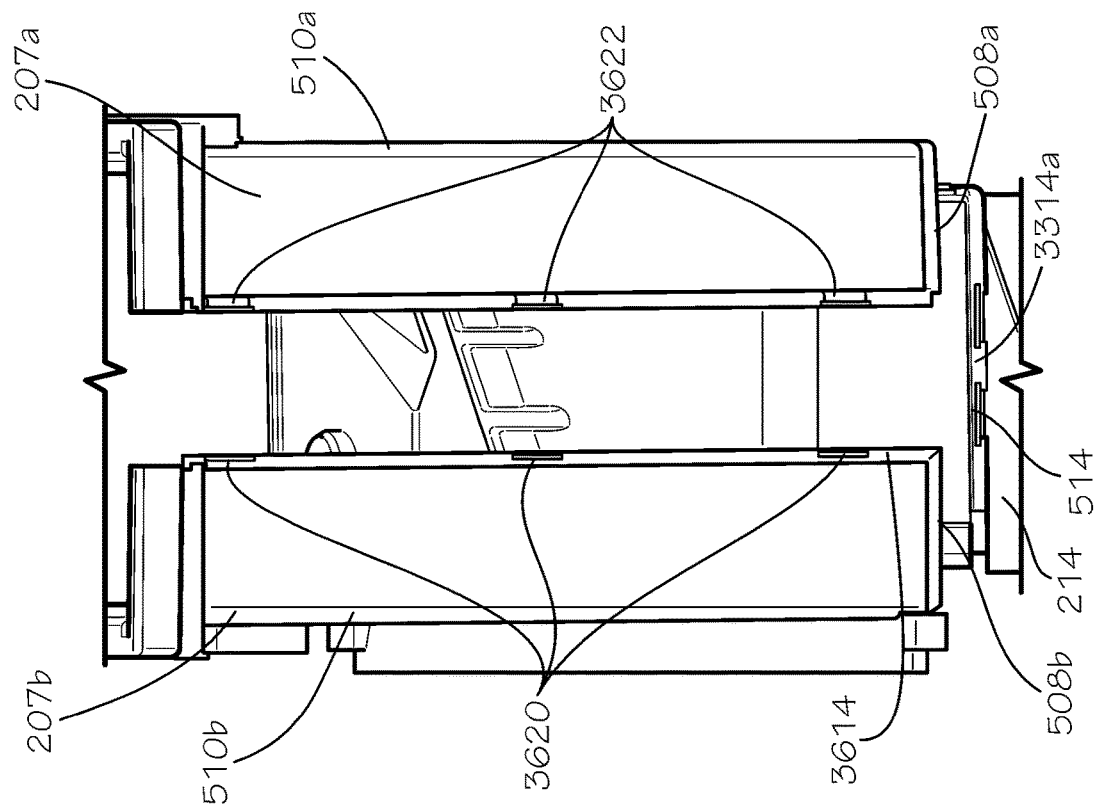

METHOD OF CLEANING AN ICE MACHINE

REFERENCE TO RELATED APPLICATIONS

This application is a continuation of U.S. application Ser. No. 17/524,893, filed Nov. 12, 2021, which issued into U.S. Pat. No. 11,953,250 on Apr. 9, 2024, which is a divisional of U.S. application Ser. No. 16/529,055, filed Aug. 1, 2019, which issued into U.S. Pat. No. 11,506,438 on Nov. 22, 2022, which claims the benefit of U.S. Provisional Application No. 62/714,414, filed Aug. 3, 2018, and U.S. Provisional Application No. 62/714,412, filed Aug. 3, 2018, each of which is hereby specifically incorporated by reference herein in its entirety.

TECHNICAL FIELD

This disclosure relates to ice machines. More specifically, this disclosure relates to an ice machine having an ice maker and a storage bin and, in particular, more streamlined methods of cleaning ice makers.

BACKGROUND

A typical ice maker—and in particular a commercial ice maker configured to produce a high volume of ice for hours, days, and years on end—has at least four circuits not considering a structure of the ice machine itself: a refrigeration circuit circulating refrigerant, an air circuit or a water circuit circulating cooling air or water through the refrigeration circuit and in some aspects as part of the refrigeration circuit, a water circuit circulating water for forming ice and sometimes for cleaning the ice maker, and an electrical circuit circulating electrical current. It is usually important to separate the three circuits in that, for example, the water of either of the water circuits must not leak into the electrical circuit or into foam insulating walls of the refrigeration circuit; hot air must not leak into areas where cool air and water facilitate the forming of ice; and electricity must not leak into the water and vice versa. In assembling the ice maker to an ice storage bin, even more complexities are introduced. In order to separate the various circuits and at the same time facilitate harmonious interactions therebetween, it can be advantageous to consistently and tightly assemble the various subparts of the ice machine while at the same time isolating where appropriate the subparts from each other.

The care necessary to build an ice maker that will withstand the challenging environment in which it often operates can add significant cost and complexity to the ice maker and its use. For example only, the use of additional materials and fasteners to bond or assemble parts of an ice maker can require significantly more labor and require special skills. In addition, an ice maker cleaning procedure that does not consider these same factors can require manual interventions by a user, which can take the user from other responsibilities.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an ice maker comprising: a dry compartment; and a wet compartment adjacent to the dry compartment and comprising: an evaporator case sized to receive an evaporator, the evaporator case comprising: a plurality of interior panels joined to each other with snap-fit joints, each of the snap-fit joints comprising a tab and defining a slot, each of a plurality of seams formed between the interior panels defining a foam-tight seal and a water-tight seal; and a plurality of exterior panels, each of the plurality of exterior panels joined to a mating interior panel of the plurality of interior panels with slide joints, wherein the evaporator case is integrally insulated with blown foam insulation positioned inside an insulation cavity defined by and between the plurality of exterior panels and the plurality of interior panels.

Also disclosed is a method of manufacturing an ice maker, the method comprising:

assembling a plurality of interior panels of an evaporator case to each other with snap-fit joints by inserting a tab of each snap-fit joint into a corresponding slot of the snap-fit joint; forming a foam-tight seal and a water-tight seal at seams defined by connections between the interior panels; assembling a plurality of exterior panels to the interior panels with slide joints by inserting a lip of each slide joint into a corresponding groove of the slide joint, the groove defined at least in part by one of a plurality of sloped projections defined in a respective interior panel; and insulating the evaporator case with blown foam insulation positioned inside an insulation cavity defined by and between the plurality of exterior panels and the plurality of interior panels.

Also disclosed is a method of using an ice maker, the method comprising: forming ice on an evaporator of the ice maker, the evaporator housed inside an evaporator case of the ice maker; harvesting the ice from the evaporator; and performing an overall cleaning procedure on the ice maker, the overall cleaning procedure comprising: a first manual intervention comprising activating a switch of the ice maker, activating the switch of the ice maker comprising initiating the overall cleaning procedure; a first automatic step comprising signaling to a user that a second manual intervention comprising pouring one of a cleaning fluid and a sanitizing fluid into a tank of the evaporator case is required; the second manual intervention comprising pouring the one of the cleaning fluid and the sanitizing fluid into the tank; and a second automatic step comprising automatically initiating and completing at least one of a cleaning stage and a sanitizing stage upon completion of the second manual intervention, automatically initiating the at least one of the cleaning stage and the sanitizing stage comprising operating a cleaning valve of a water circuit of the ice maker by a main controller of the ice maker.

Also disclosed is a method of cleaning an evaporator of an ice maker, the method comprising: a first manual intervention comprising activating a switch of an ice maker, activating the switch of the ice maker comprising initiating an overall cleaning procedure; a first automatic step comprising signaling to a user that a second manual intervention comprising pouring one of a cleaning fluid and a sanitizing fluid into a tank of an evaporator case of the ice maker is required; the second manual intervention comprising pouring the one of the cleaning fluid and the sanitizing fluid into the tank; and a second automatic step comprising automatically initiating and completing at least one of a cleaning stage and a sanitizing stage upon completion of the second manual intervention, automatically initiating the at least one of the cleaning stage and the sanitizing stage comprising operating a cleaning valve of a water circuit of the ice maker by a main controller of the ice maker.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 36A is a rear exploded perspective view of the evaporator walls and the tank of the evaporator case of FIG. 5A during assembly.

FIG. 36B a rear perspective view of the evaporator walls and the tank of FIG. 36 after assembly.

DETAILED DESCRIPTION

Figure 1:
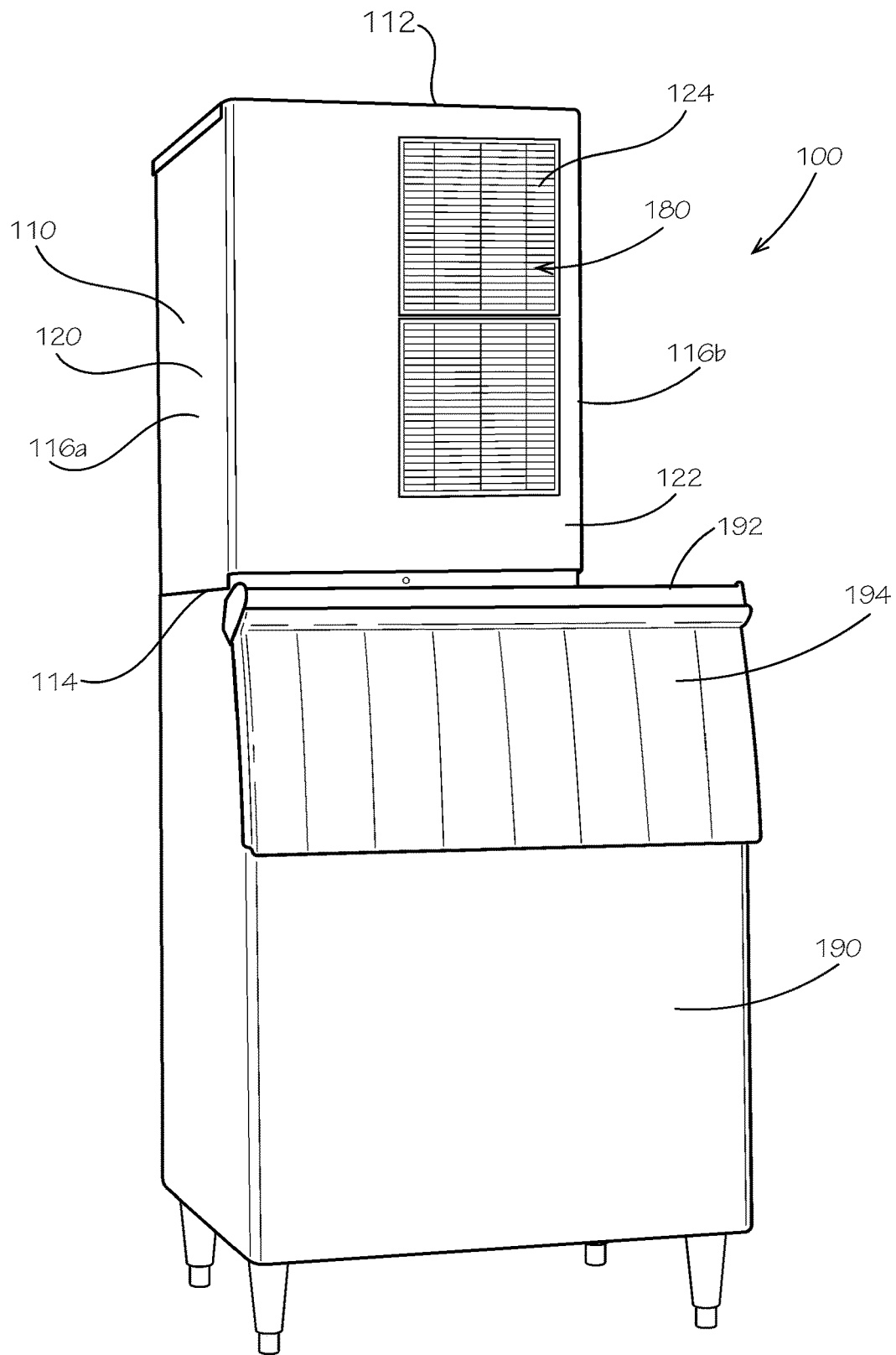
FIG. 1 is a front perspective view of an ice machine comprising an ice maker and a storage bin in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. The phrase "at least one of A and B" as used herein means "only A, only B, or both A and B"; while the phrase "one of A and B" means "A or B."

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of an ice machine nearest to and occupied by a user of the ice machine; "rear" is that end that is opposite or distal the front; "left" is that which is to the left of or facing left from a person standing in front of the ice machine and facing toward the front; and "right" is that which is to the right of or facing right from that same person. "Horizontal" or "horizontal orientation" describes that which is in a plane extending from left to right and aligned with the horizon. "Vertical" or "vertical orientation" describes that which is in a plane that is angled at 90 degrees to the horizontal.

Disclosed is an ice machine and associated methods, systems, devices, and various apparatus. The ice machine can comprise an ice maker and a storage bin. It would be understood by one of skill in the art that the disclosed ice machine is described in but a few exemplary aspects among many. No particular terminology or description should be considered limiting on the disclosure or the scope of any claims issuing therefrom.

FIG. 1 is a front perspective view of an ice machine 100 in accordance with one aspect of the present disclosure. The ice machine 100 can comprise an ice maker 110 and a storage bin 190. The ice maker 110 can be configured to produce ice which can be fed by gravity downwards into the storage bin 190. The storage bin 190 can be insulated to maintain cold temperatures within the bin storage compartment to prevent the ice from melting. In some aspects, the storage bin 190 can be refrigerated, and in other aspects, the storage bin 190 can be unrefrigerated.

The ice maker 110 can comprise an outer casing 120, which can be configured to enclose the ice maker 110 and its internal components. As shown, the outer casing can comprise a front panel assembly 122. The front panel assembly 122 can extend from a top maker end 112 to a bottom maker end 114 of the ice maker 110, and from a left maker side 116a to a right maker side 116b of the ice maker 110. The front panel assembly 122 can define an air inlet opening 180 and can comprise an air filter 124. The air inlet opening 180 and the air filter 124 can be configured to provide ventilation for the ice maker 110 in the form of clean air from outside the ice maker 110.

The storage bin 190 can define a top bin end 192, on which the bottom maker end 114 of the ice maker 110 can be mounted. The storage bin 190 can comprise a bin door 194 located proximate to the top bin end 192, and the bin door 194 can provide access to a bin storage compartment (not shown) defined within the storage bin 190.

Figure 2A:
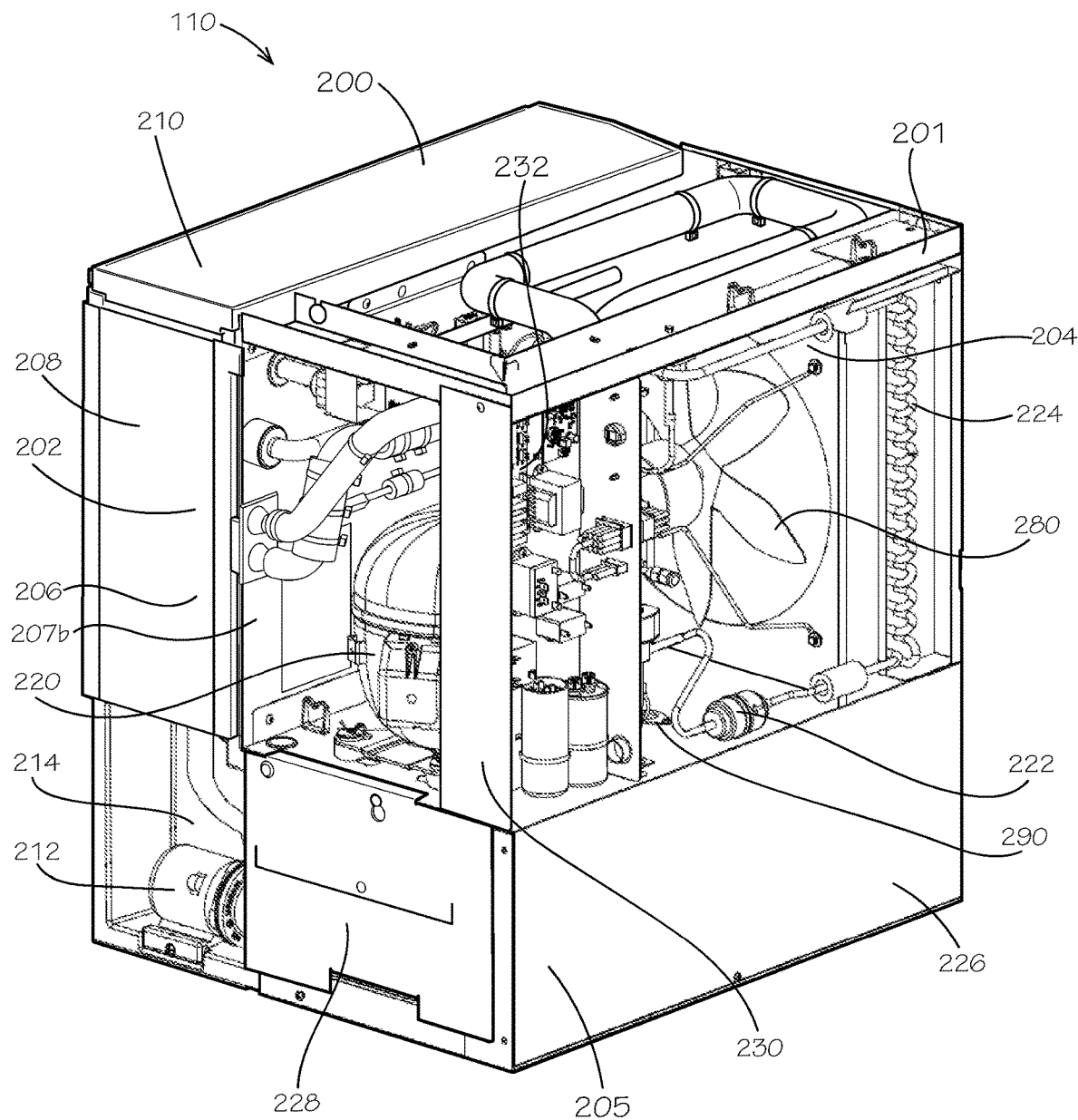
FIG. 2A is a front perspective view of the ice maker of FIG. 1 with an outer casing of the ice maker removed.

FIG. 2A is a front perspective view of the ice maker 110 of FIG. 1 with the outer casing 120 (shown in FIG. 1) removed. In the present aspect, the ice maker 110 can be an air-cooled model, which can be cooled by circulating air through the outer casing 120, such as through the air inlet opening 180 (shown in FIG. 1). In some aspects, the ice maker 110 can be a water-cooled model or can be coupled to a remote condensing unit for cooling. In the present aspect, the ice maker 110 can comprise a fan assembly 280, which can be configured to circulate air through the ice maker 110. Beneath or inside the outer casing 120, the ice maker 110 and a body 200 thereof can be compartmentalized into a wet compartment 202 and a dry compartment 204 and can further comprise a frame 201 and a base case 205. The wet compartment 202 can be primarily defined by an evaporator case 206, which can be insulated. The evaporator case 206 can enclose the majority of the components of a water circuit 450 (shown in FIG. 3) of the ice maker 110, which can be configured to form ice from liquid water delivered to and circulating through the ice maker 110. An evaporator compartment 306 (shown in FIG. 2B) of the evaporator case 206 can be insulated. The evaporator case 206 can comprise a removable front insulation 208 and a removable top insulation 210, for example and without limitation, which can partially enclose and insulate the evaporator compartment 306. Either of the front insulation 208 or the top insulation 210 can be a panel or an insulation panel. Additionally, a tank 214—which can be a water tank—and evaporator walls 207a,b (207a shown in FIG. 2B) of the evaporator case 206 can be integrally insulated as further discussed below. By "integrally insulated," walls of the ice maker 110 can be filled with liquid foam insulation while the ice maker 110 or an insulated portion thereof is supported inside a foaming jig or mold. Such insulation can be, for example and without limitation, a water-blown or refrigerant-blown high-pressure or low-pressure foam that flows through the walls of the ice maker 110 and hardens and cures, which can result in the walls developing insulating properties. The pressure of such foam can reach as much as 14 psi or more above atmospheric pressure. Each of the tank 214, the evaporator walls 207a,b, and any other panel forming a portion of an interior of the evaporator case 206 or the base case 205—such as, for example and without limitation, a molded interior panel of a compressor base 226 shown in FIG. 31—can be an interior panel.

The water circuit 450 can comprise a water pump 212, which can be mounted on or adjacent to the tank 214 in a location external to the evaporator compartment 306. A portion of the tank 214 enclosing the water pump 212 can be uninsulated. The tank 214 can be positioned beneath the evaporator walls 207a,b. The water pump 212 can be configured to pump water from the tank 214 upwards into the evaporator compartment 306 where the water can be formed into ice.

Within the dry compartment 204, the majority of the components of a refrigeration circuit 400 (shown in FIG. 4) of the ice maker 110 can be enclosed, including a compressor 220, a drier 222, and a condenser 224, for example and without limitation. The compressor 220 can be mounted to the compressor base 226, which can comprise a horizontal compressor base panel to which the compressor can be more directly mounted. The compressor base 226 can comprise a base case cover 228. Within the dry compartment 204, refrigerant flowing through the refrigeration circuit 400 can be compressed by the compressor 220 and then cooled into a liquid state in the condenser 224 before being fed through an expansion device 240 (shown in FIG. 3), such as a thermostatic expansion valve, before being fed into an evaporator 310 housed inside the evaporator compartment 306. Additionally, a control box 230 of the ice maker 110, which can comprise a controller 232, can be housed within the dry compartment 204. The controller 232 can be a control board.

An ultrasonic bin sensor 290 can be installed within the dry compartment 204 and can extend through the compressor base 226. The ultrasonic bin sensor 290 can be configured to monitor a level of ice cubes 490 (shown in FIG. 4) accumulated within the storage bin 190 (shown in FIG. 1). The ultrasonic bin sensor 290 can act as a proximity sensor by transmitting ultrasonic waves downwards toward the ice and receiving the ultrasonic waves, which reflect off the ice cubes 490. The distance from a level position defined by an outlet of the ultrasonic bin sensor 290 to a level position defined by the level of the ice cubes 490 can be determined from the travel times of the returning ultrasonic waves. The ultrasonic bin sensor 290 can be in electronic communication with the control box 230. Once the level of the ice cubes 490 in the storage bin 190 reaches a shut-off height, which can be a predetermined value as desired and set by a technician or a user of the ice maker 110, a signal from the ultrasonic bin sensor 290 can be received by the control box 230, and the control box 230 can cease the ice making process, thereby stopping further production of the ice cubes 490. As the ice melts or ice is removed from the storage bin 190, the level can reach a refill height. Once the level of the ice cubes 490 within the storage bin 190 reaches the refill height, the ultrasonic bin sensor 290 can send a signal to the control box 230, and the control box 230 can resume the ice making process to refill the storage bin 190 with the ice cubes 490. The "full" height or level can be a predetermined value as desired and set by a technician or a user of the ice maker 110, or the "full" height can be programmed into the controller 232.

Figure 2B:
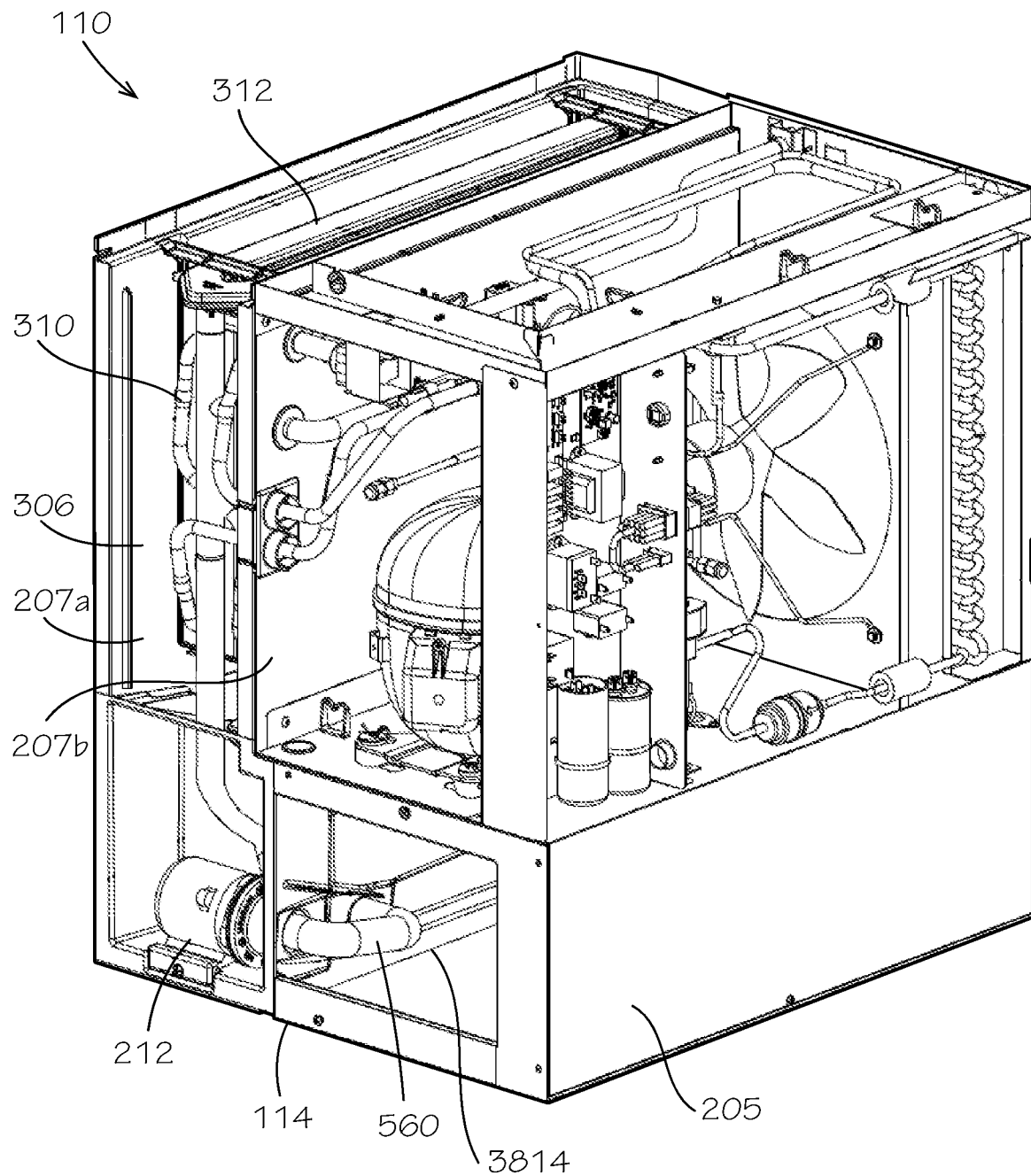
FIG. 2B is a front perspective view of the ice maker of FIG. 1 with a front insulation and a top insulation of an evaporator case of the ice maker as well as a base case cover of a compressor base of the ice maker further removed.

FIG. 2B is a front perspective view of the ice maker 110 of FIG. 2 with the front insulation 208 and top insulation 210 of the evaporator case 206 and the base case cover 228 of the compressor base 226 further removed. With the front insulation 208 and the top insulation 210 removed, the evaporator compartment 306 can be exposed. The evaporator 310 and a spray tube 312 can be enclosed within the evaporator compartment 306 between the evaporator walls 207a,b. The spray tube 312 can be positioned proximate to a top end of the evaporator case 206 and above the evaporator 310 and coupled to the evaporator 310.

The refrigeration circuit 400 can comprise the evaporator 310, and the liquid refrigerant can evaporate to a gaseous phase within the evaporator 310, thereby cooling the evaporator compartment 306 below the freezing temperature of water. Liquid water can be pumped by the water pump 212 up to the spray tube 312, where the liquid water can be sprayed toward the evaporator 310 to form ice. A suction hose 560 can connect the water pump 212 to the tank 214 to provide a source of water from which to produce the ice. The body 200 and specifically at least the base case 205 can define a bottom opening 3814 at the bottom maker end 114 of the ice maker 110.

Figure 2C:
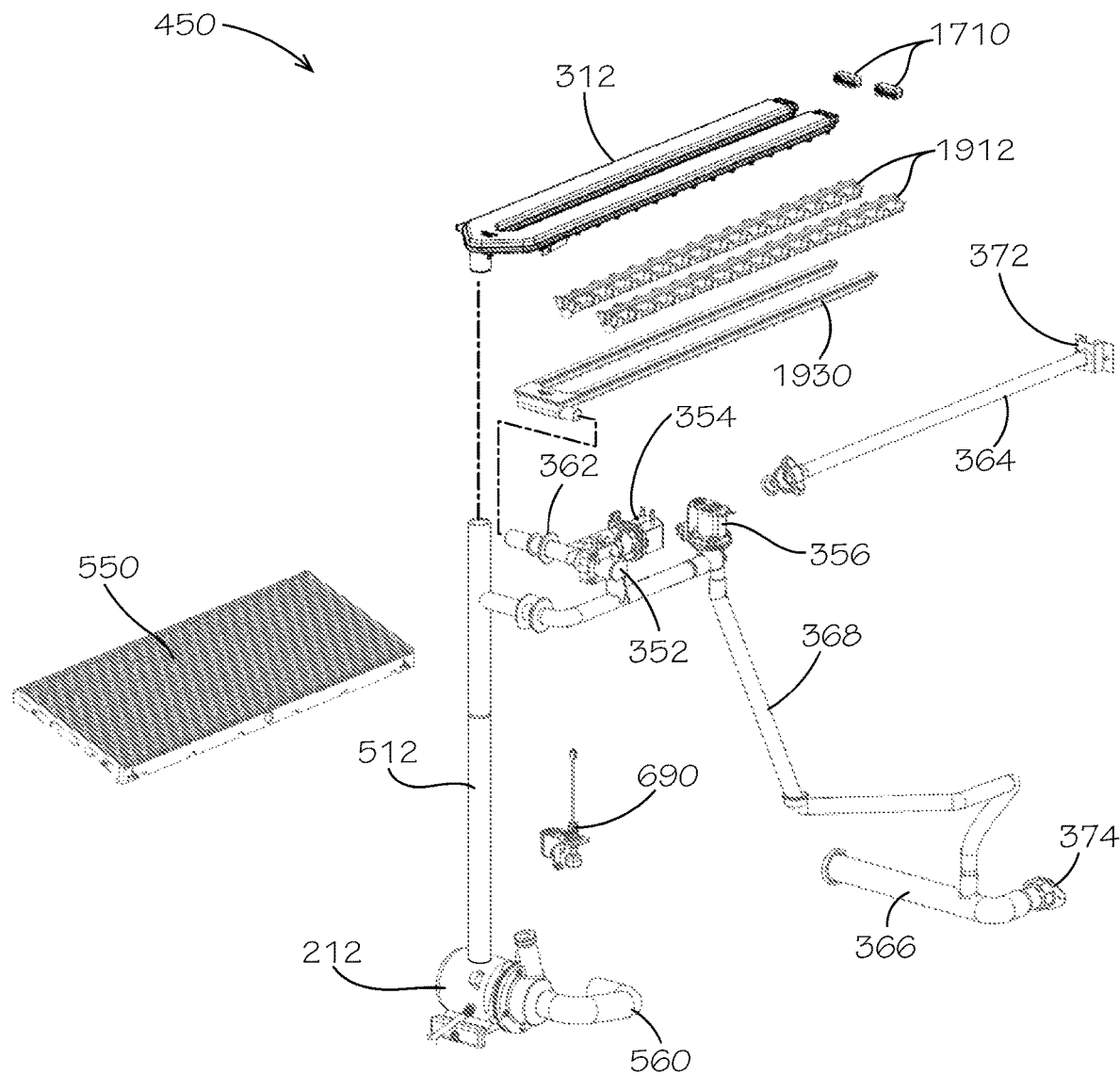
FIG. 2C is a front perspective exploded view of a spray tube, a water pump, and other components of a water circuit 450 of the ice maker of FIG. 1.

FIG. 2C shows a front perspective exploded view of the spray tube 312, the water pump 212, and other components of the water circuit 450. The water circuit 450 can comprise one or more valves 350, each of which can be a solenoid valve operated by the controller 232. More specifically, the water circuit 450 can comprise an inlet water valve 352, a cleaning valve 354, and a drain valve 356. The water circuit 450 can comprise a supply tube 1930, which can be coupled to the inlet water valve 352 and the cleaning valve 354 with a supply tube inlet pipe 362. Meanwhile, the inlet water valve 352 can be in fluid communication with water entering the ice maker 110 at a water inlet 372 and through an inlet water valve inlet pipe 364. The water circuit 450 can comprise a drain pipe or drain hose 366, which can be coupled to the drain valve 356 with a drain valve outlet pipe 368 and can allow water to drain from the ice maker 110 at a water outlet 374. The water circuit 450 can comprise a float switch 690.

Figure 3:
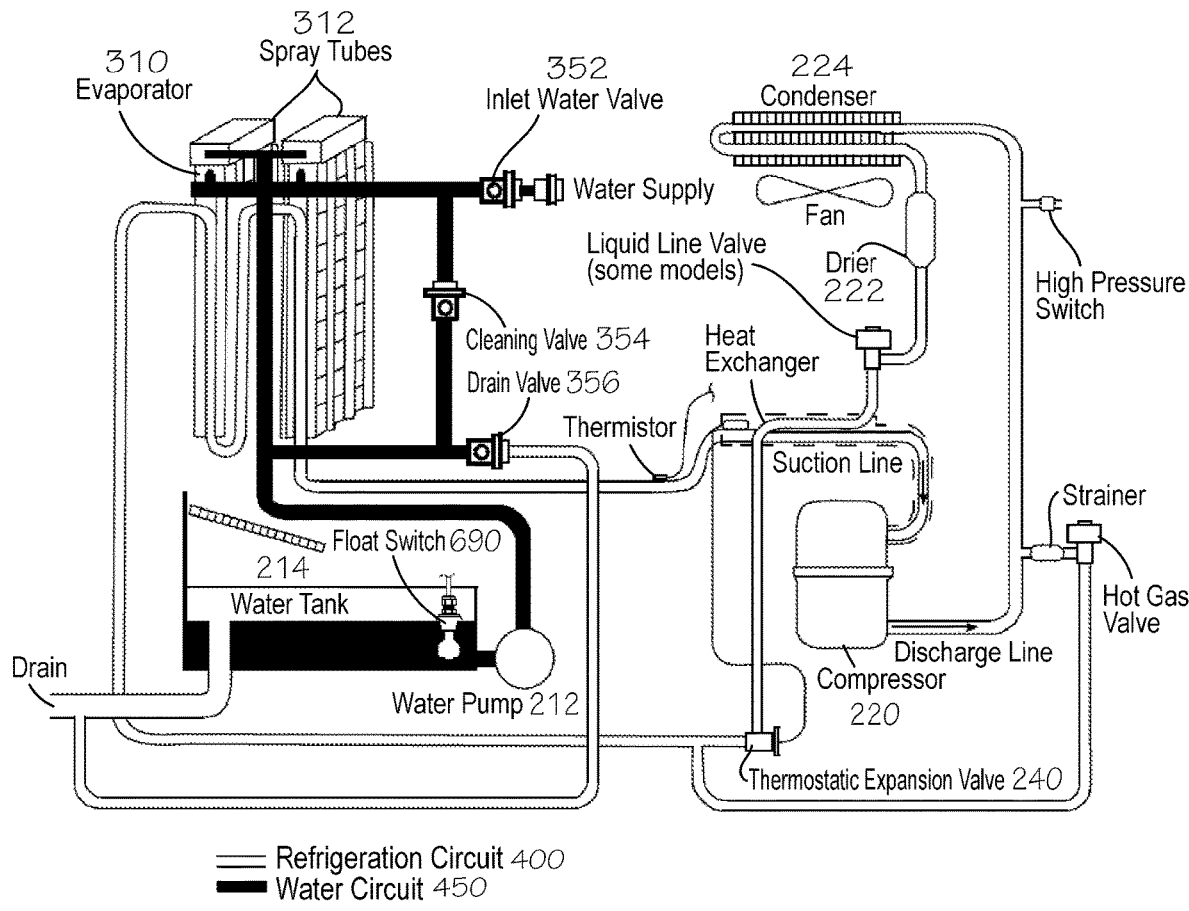
FIG. 3 is a circuit diagram showing a refrigeration circuit and the water circuit of the ice maker of FIG. 1.

FIG. 3 is a circuit diagram showing the interaction and interconnections between each of various components of the refrigeration circuit 400 and each of various components of the water circuit 450 of the ice maker 110 of FIG. 1.

Figure 4:
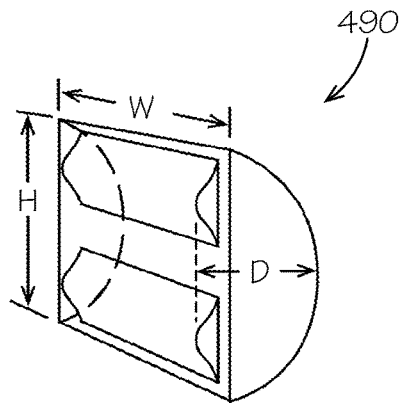
FIG. 4 is a perspective view of an exemplary ice cube produced by the ice maker of FIG. 1.

FIG. 4 shows a perspective view of the ice cube 490 in one exemplary aspect. In some aspects, as shown, the ice cube 490 can define a crescent shape, at least in part. In some aspects, the ice cube 490 can define a non-crescent shape. The ice cube 490 can define a height H, a width W, and a depth D. In some aspects, the height H can measure approximately 1.5 inches (approximately 38.1 millimeters), the width W can measure approximately 1.125 inches (approximately 28.6 mm), and the depth D can measure approximately 0.5 inches (approximately 12.7 mm). In other aspects, the ice cube 490 can measure smaller or larger in any dimension and can have a variable shape such that the ice cubes 490 are not identical.

Figure 5A:
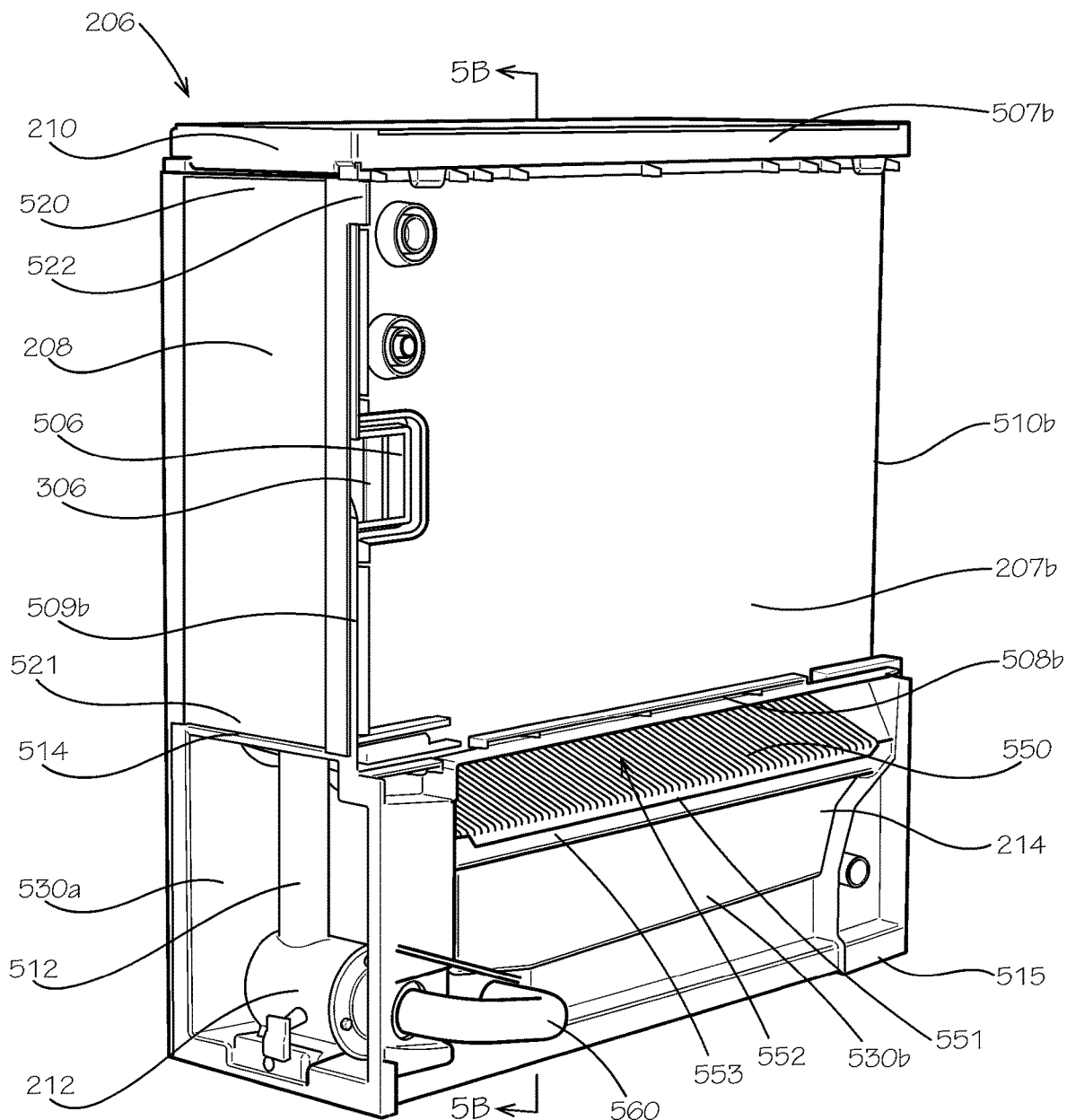
FIG. 5A is a front perspective view of the evaporator case of FIG. 2B.

FIG. 5A is a front perspective view of the evaporator case 206 of FIG. 2. As shown, the evaporator wall 207b can define a refrigeration port 506, which can be defined in and extend through the evaporator wall 207b to the evaporator compartment 306. The refrigerator port 506 can provide access for lines of the refrigeration circuit 400 (shown in FIG. 3) to reach the evaporator 310 (shown in FIG. 2B). The evaporator wall 207b can define a top wall end 507b and a bottom wall end 508b disposed opposite from the top wall end 507b. The tank 214 can define a top tank end 514 and a bottom tank end 515 disposed opposite from the top tank end 514. The top tank end 514 can be attached to the bottom wall end 508b by a snap or snap-fit connection, as shown and further described below with respect to FIGS. 32-37B. The top insulation 210 can rest upon the top wall end 507b, and the top insulation 210 can horizontally slide inwards and outwards from between the evaporator walls 207a,b (207a shown in FIG. 2B).

The tank 214 can define an outer tank side 530a and an inner tank side 530b disposed opposite from the outer tank side 530a. The inner tank side 530b can be substantially aligned with the evaporator wall 207b. The tank 214 can comprise or can be at least partly covered or enclosed by a removable cube guide 550 disposed proximate to the top tank end 514. The cube guide 550 can slope downwards from the outer tank side 530a to the inner tank side 530b. The cube guide 550 can lead to the cube opening 552 defined by the inner tank side 530b. The cube guide 550 can be slid into the tank 214 by slipping the cube guide 550 through the cube opening 552 until the cube guide 550 sets behind or below a lip 553 of the cube opening 552. To remove the cube guide 550, the cube guide 550 can be lifted over the lip 553 and slid outwards from the tank 214 through the cube opening 552. The cube guide 550 can define a hole 551, which can facilitate removal of the cube guide 550. A user, for example, can slip a finger through the hole 551 to aid in lifting the cube guide 550 over the lip 553.

The cube guide 550 can be configured to guide the ice cubes 490 coming out of the evaporator case 206 downwards under the force of gravity and out of the cube opening 552. The ice cubes 490 coming through the cube opening 552 can be ejected underneath the compressor base 226 (shown in FIG. 2A) and through the bottom opening 3814 (shown in FIG. 38). The ice maker 110 (shown in FIG. 1) can be positioned over the storage bin 190 (shown in FIG. 1) so that an opening (not shown) of the storage bin 190 can be aligned underneath the compressor base 226 and with the bottom opening 3814. The ice cubes 490 falling from the cube opening 552 can fall out underneath the compressor base 226, through the bottom opening 3814, and into the opening of the storage bin 190 to fill the storage bin 190.

A water reservoir 614 (shown in FIG. 5B) can be defined below the cube guide 550 and between the outer tank side 530a and the inner tank side 530b. A suction hose 560 can be in fluid communication with the water reservoir 614 through the inner tank side 530b and in fluid communication with the water pump 212 to provide water to the water pump 212. The water pump 212 can then discharge the water upwards through the top tank end 514 and into the evaporator compartment 306 via an insulated tubing 512.

The evaporator wall 207b can define a front wall end 509b and a rear wall end 510b disposed opposite from the front wall end 509b. The front insulation 208 can be disposed at the front wall end 509b between the evaporator walls 207a,b. The front insulation 208 can define a top insulation end 520 and a bottom insulation end 521 disposed opposite from the top insulation end 520. The top insulation end 520 can define a lip 620 (shown in FIG. 5B), which can engage the top insulation 210, and the bottom insulation end 521 can define a lip 621 (shown in FIG. 5B), which can engage the top tank end 514 to secure the front insulation 208 to the evaporator case 206. To remove the front insulation 208, the top insulation 210 can be removed, and then the top insulation end 520 can be rotated away from the front wall end 509b while the bottom insulation end 521 pivots about the top tank end 514 until the front insulation 208 is free. The front insulation 208 can define a pull tab 522 configured to provide a gripping surface to rotate the top insulation end 520 away from the front wall end 509b. By forward movement of the pull tab 522 with the top insulation 210 fully installed, the lip 620 can catch on, push, and thereby facilitate removal of the top insulation 210. Engagement between the front insulation 208, the top tank end 514, and the top insulation 210 is further shown with respect to FIG. 5B, including the lips 620,621.

Figure 5B:
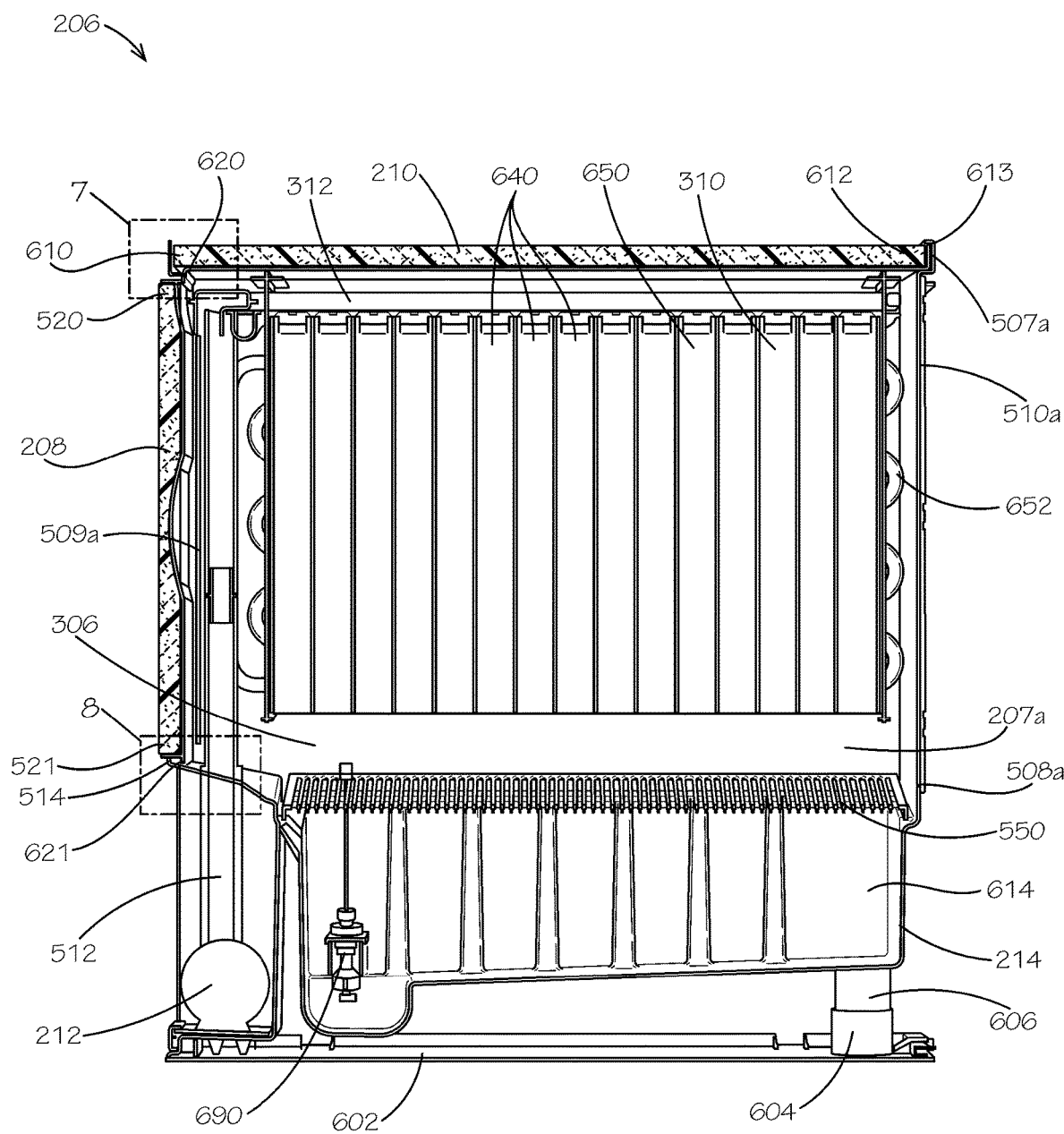
FIG. 5B is a sectional side view of the evaporator case of FIG. 2B taken along line 5B-5B shown in FIG. 5A.

FIG. 5B is a sectional side view of the evaporator case 206 of FIG. 2B taken along line 5B-5B shown in FIG. 5A. The cross-sectional plane can substantially bisect the insulated tubing 512. The top insulation 210 can define a front insulation end 610 and a rear insulation end 612 disposed opposite from the front insulation end 610. The rear insulation end 612 can be vertically captured by a lip 613 defined by a top wall end 507a of the evaporator wall 207a and the top wall end 507b of the evaporator wall 207b (shown in FIG. 5A). The evaporator wall 207a can further define a front wall end 509a, a rear wall end 510a, and a bottom wall end 508a, which can correspond to the front wall end 509b, the rear wall end 510b, and the bottom wall end 508b of the evaporator wall 207b, each shown in FIG. 5A. The front insulation end 610 can be secured to the evaporator walls 207a,b as shown and described below with respect to FIGS. 10-12.

The insulated tubing 512 can carry water from the water pump 212 to the spray tube 312. The spray tube 312 can extend from the front wall end 509a to the rear wall end 510a, and the spray tube 312 can be configured to spray water downwards from various points along its length into a series of channels 640 defined by an evaporator plate 650 of the evaporator 310. The evaporator 310 can further comprise tubing 652, which can weave forward and rearward in a serpentine path between the evaporator plate 650 and an adjacent evaporator plate 650 to facilitate heat exchange between the tubing 652 and the adjacent and opposing evaporator plates 650. As liquid refrigerant running through the evaporator 310 begins to evaporate to a gaseous state, the refrigerant absorbs heat from the water sprayed by the spray tube 312 against the outside of the evaporator plates 650, which can cause the ice cubes 490 (shown in FIG. 4) to form in the channels 640. Once the ice cubes 490 are sufficiently large, which can be determined by the passage of a predetermined ice production interval during an ice formation cycle, the ice cubes 490 can be removed from the evaporator by initiation of a harvest cycle. During heating of the evaporator 310 during the harvest cycle, the ice cubes 490 can fall downwards to be redirected by the cube guide 550. The cube guide 550 can define openings so that the ice cubes 490 are redirected by the cube guide 550 toward the cube opening 552 while unfrozen liquid water dripping down the evaporator plates 650 can pass through the cube guide 550 to return to the water reservoir 614.

The float switch 690 can be disposed within the water reservoir 614 of the tank 214. The float switch 690 can measure the water level of water within the water reservoir 614. Once the water level falls below a set minimum, the float switch 690 can send a signal to the controller 232 (shown in FIG. 2A) to supply more water to the tank 214.

As shown, the evaporator case 206 can further comprise a tank base 602. The tank base 602 can define a split collar 604 which can be configured to receive and frictionally engage a support column 606 defined by the tank 214. Frictional engagement between the support column 606 and the split collar 604 can facilitate assembly of the evaporator case 206 by providing a tool-less, push-together connection.

Figure 6A:
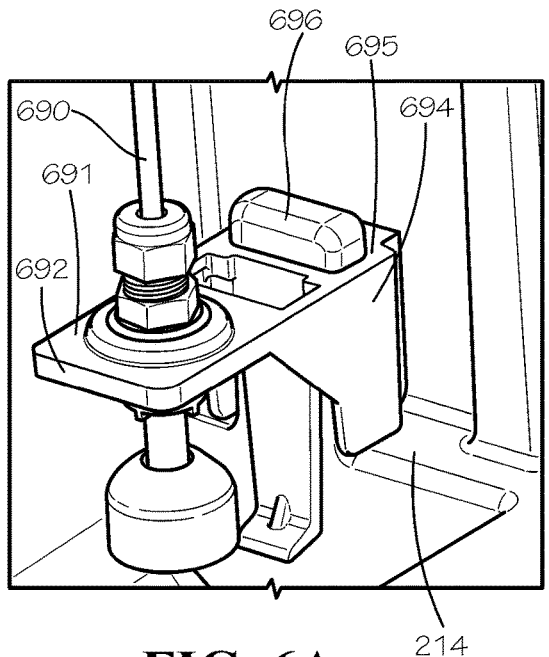
FIG. 6A is a perspective view of a float switch within a tank of the evaporator case of FIG. 5A.

FIG. 6A is a perspective view of the float switch 690 within the tank 214. The float switch 690 can be mounted to a float switch mount 691. The float switch mount 691 can comprise a support arm 692 and a mounting bracket 694. The support arm 692 can define an opening 693 (shown in FIG. 6B), and the float switch 690 can be secured through the opening 693, such as with a nut or other fastener. The mounting bracket 694 can define a mounting channel 695. The mounting channel 695 can receive a projection 696 defined by the tank 214. The tank 214 can be formed by an injection molding process, and one of the benefits of the injection molding process is the ability to integrally, i.e., monolithically, form detailed features, such as the projection 696, the boss 1050 (shown in FIG. 10), and other features of the evaporator case 206 as described herein, rather than attaching them as separate components. "Monolithic" means at least to be cast, molded, or otherwise formed as a single piece. More specifically, each monolithic component can be formed from a single material in a single operation and without any welds or mechanical connections such as threading, flanges, fasteners, interference fits, adhesives, brazing, soldering, or other mechanical methods of connection, at least to join the features described as being monolithic or formed monolithically. The projection 696 can taper slightly upwards, and the mounting channel 695 can define a complimentary shape to secure the float switch mount 691 firmly on the projection 696.

Figure 6B:
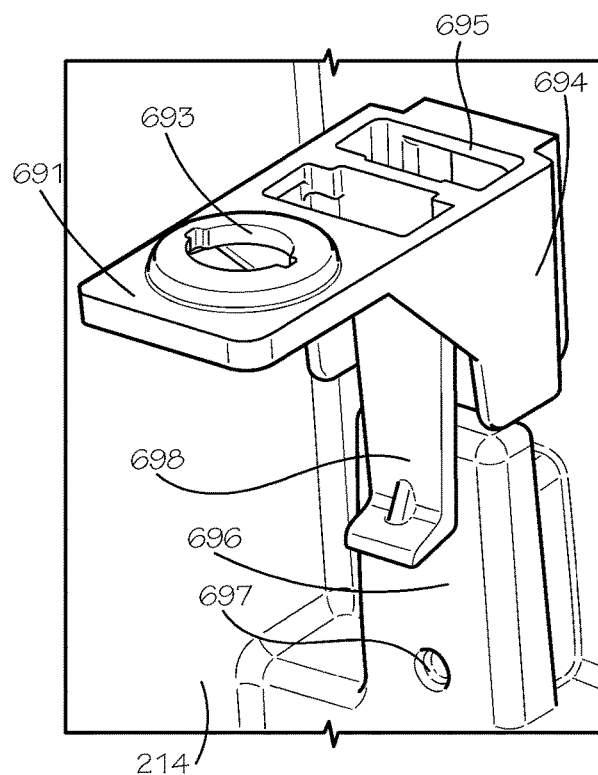
FIG. 6B is a perspective view of a float switch mount of FIG. 6A.

FIG. 6B is a perspective view of the float switch mount 691 within the tank 214. As shown, the mounting bracket 694 can be positioned over the projection 696, and the mounting channel 695 can be aligned with the projection 696 so that the mounting bracket 694 can be installed on the projection 696 by lowering the mounting bracket 694 onto the projection 696. As shown, the projection can define a pocket 697, and the mounting bracket 694 can define a latching arm 698 configured to engage the pocket 697, thereby securing the mounting bracket 694 on the projection 696.

Figure 6C:
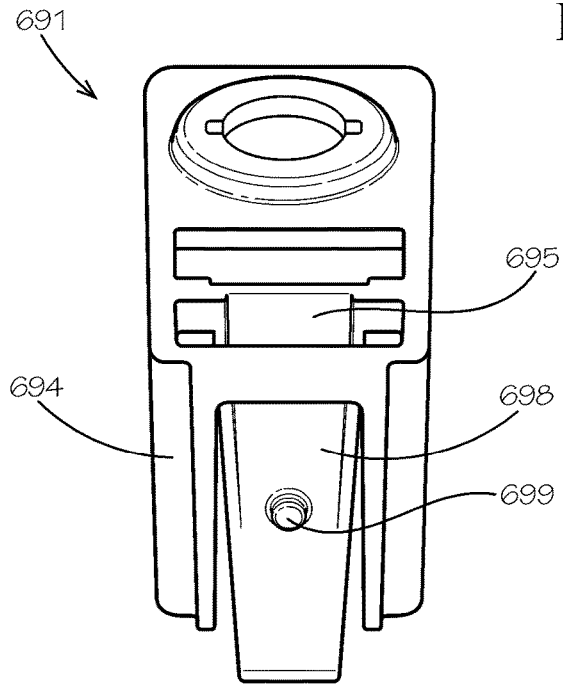
FIG. 6C is a rear view of the float switch mount of FIG. 6A.

FIG. 6C is a rear view of the float switch mount 691 facing the mounting bracket 694. As shown, the latching arm 698 can at least partially define the mounting channel 695. The latching arm 698 can also define a locator tab 699, which can extend into the mounting channel 695. The locator tab 699 can be configured to engage the pocket 697 (shown in FIG. 6B) to secure and fix a position of the mounting bracket 694 on top of the projection 696 (shown in FIG. 6B) in the horizontal and vertical directions.

Figure 7:
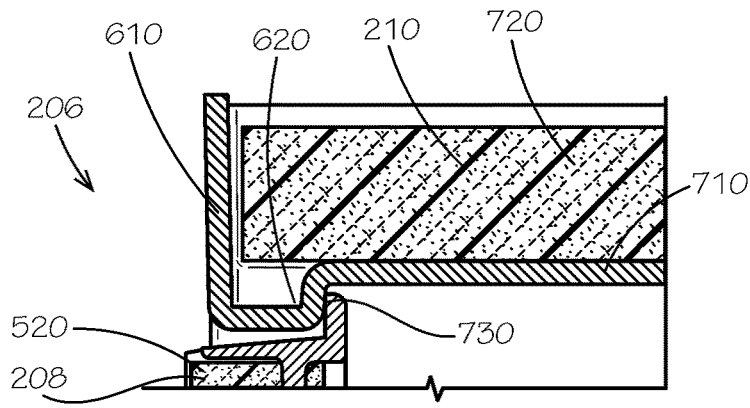
FIG. 7 is a detail sectional view of the evaporator case of FIG. 5A, with a lip of the front insulation engaging the top insulation.
Figure 8:
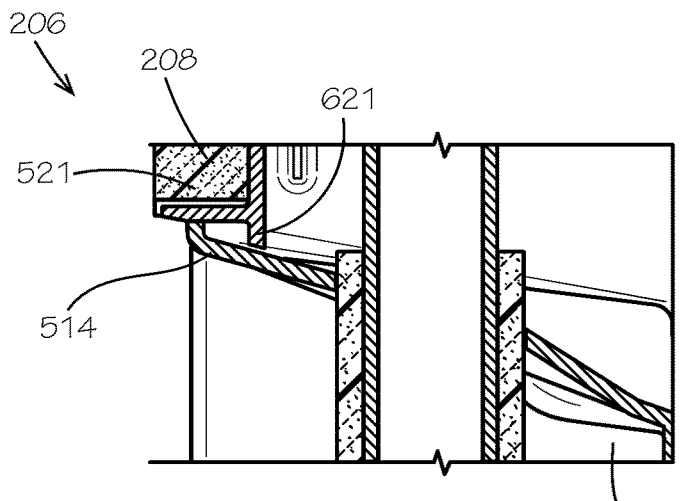
FIG. 8 is a detail sectional view of the evaporator case of FIG. 5A, with the lip of the front insulation engaging a top tank end of the tank.
Figure 9:
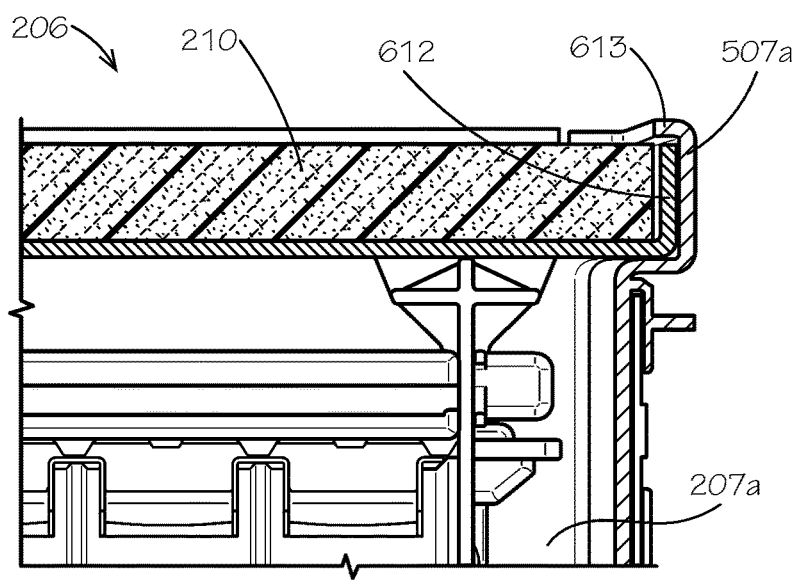
FIG. 9 is a detail sectional view of the evaporator case of FIG. 5A, with a lip of an evaporator wall of the evaporator case engaging a rear insulation end of the top insulation.

FIG. 7 is a detailed sectional view of the lip 620 of the front insulation 208 engaging the top insulation 210. While the lip 620 of the front insulation 208 as shown is interfering with the top insulation 210, in its final assembly location the lip 620 can be positioned between a step 730 of the top insulation 210. The top insulation 210 can comprise a top insulation liner 710 and a top insulation sheet 720. FIG. 8 is a detailed sectional view of the lip 621 of the front insulation 208 engaging the top tank end 514 of the tank 214. FIG. 9 is a detailed sectional view of the lip 613 of the evaporator wall 207a engaging the rear insulation end 612 of the top insulation 210.

Figure 10:
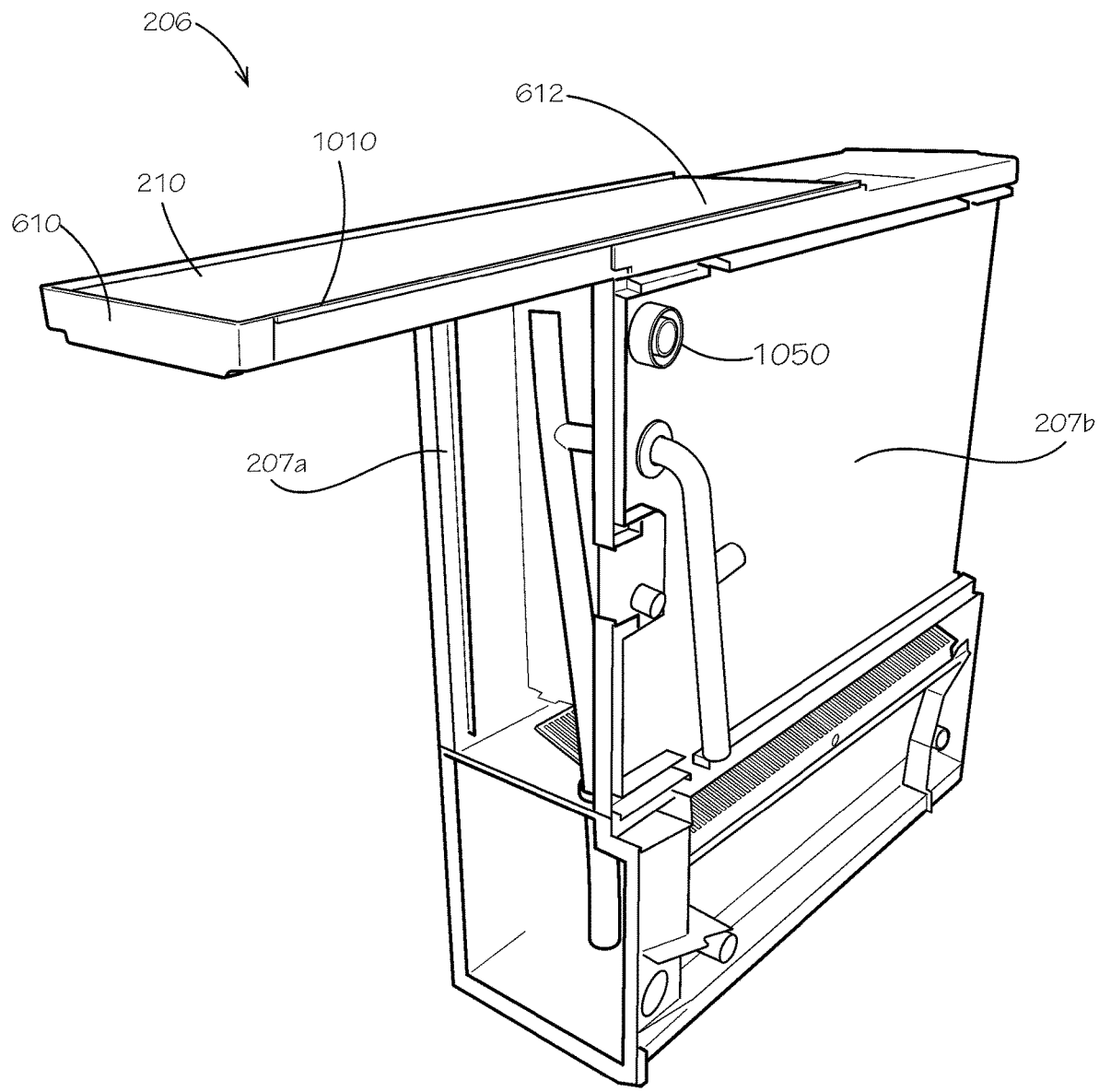
FIG. 10 is a front perspective view of the evaporator case of FIG. 5A in a partially assembled condition with the top insulation partially removed or disengaged.
Figure 11:
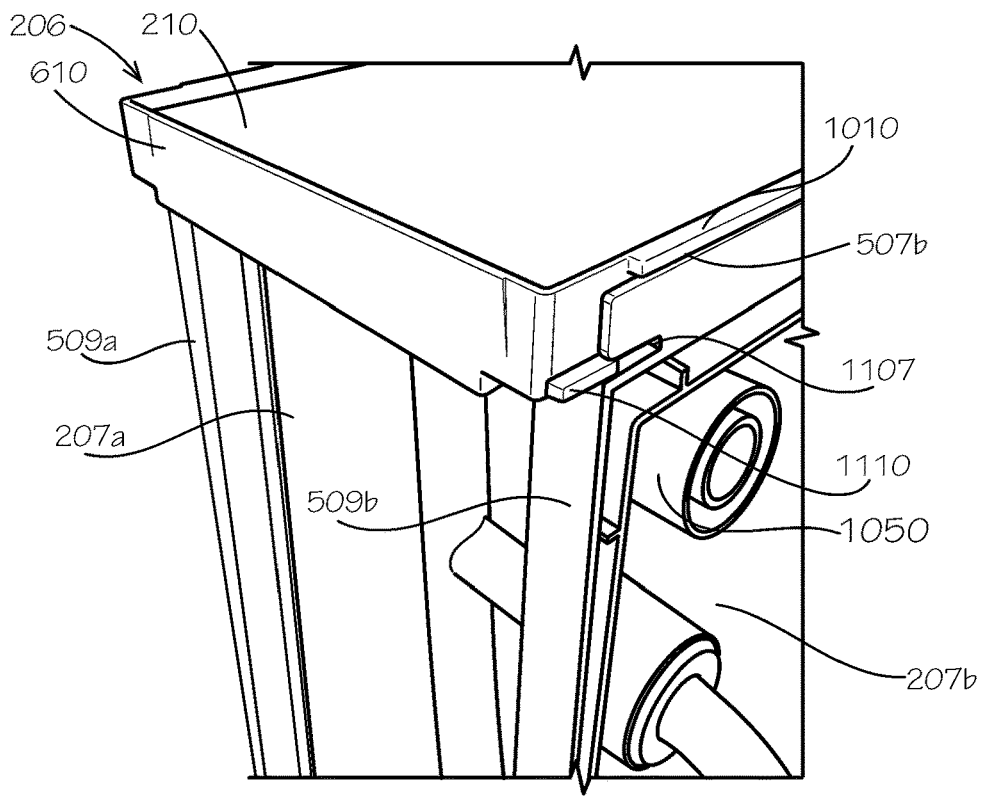
FIG. 11 is a front perspective view of the evaporator case of FIG. 5A with the top insulation seated nearly into position between the evaporator walls but not yet secured to the evaporator walls.
Figure 12:
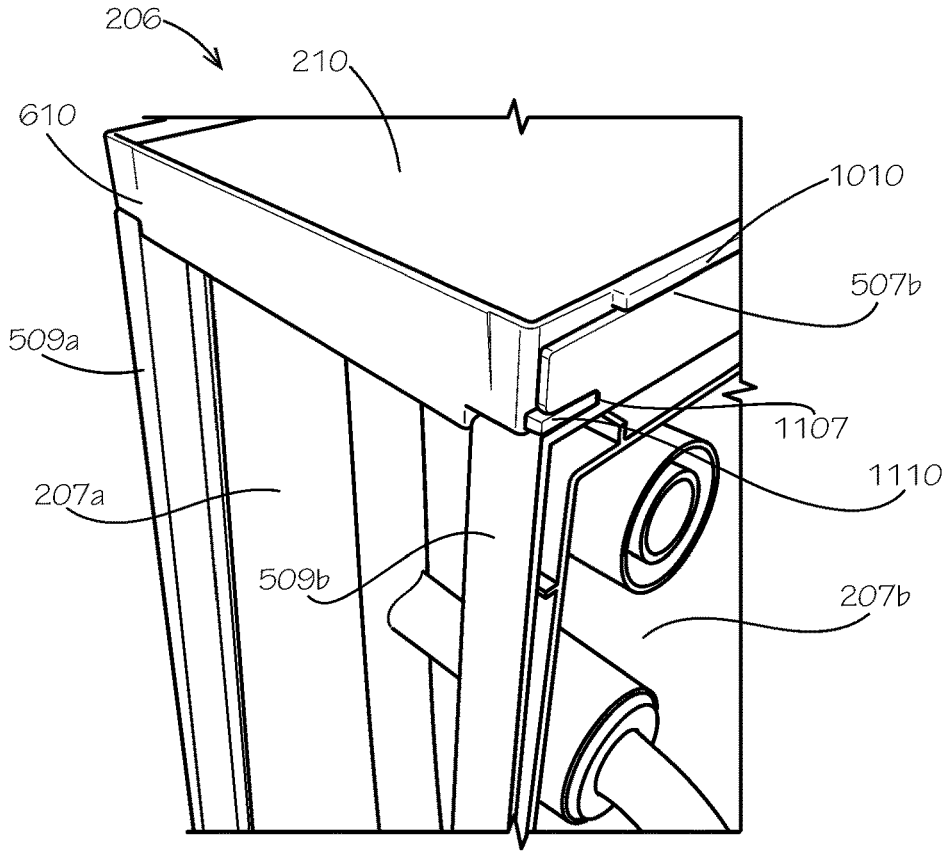
FIG. 12 is a detail front perspective view of the evaporator case of FIG. 5A with the top insulation fully seated.

FIGS. 10-12 demonstrate the top insulation 210 being slid into position between the evaporator walls 207a,b. In FIG. 10, the rear insulation end 612 of the top insulation 210 can be positioned between the evaporator walls 207a,b, and the front insulation end 610 can extend laterally outward from between the evaporator walls 207a,b. The top insulation 210 can define a pair of rails, as demonstrated by the rail 1010 on a one side of the top insulation 210, which can extend lengthwise along each side of the top insulation 210.

FIG. 11 shows the top insulation 210 seated nearly into position between the evaporator walls 207a,b, but not yet secured to the evaporator walls 207a,b. As demonstrated by the rail 1010, the pair of rails can ride along the top wall ends 507a,b (507a shown in FIG. 5B) of the evaporator walls 207a,b. As demonstrated by the evaporator wall 207b, the evaporator walls 207a,b can define notches 1107 (the notch defined by the evaporator wall 207a not shown) disposed near a corner of the top wall ends 507a,b (507a shown in FIG. 5B) and the front wall ends 509a,b. The notches 1107 can extend laterally inwards from and through a thickness of the front walls ends 509a,b. The top insulation 210 can define tabs 1110 on opposing sides of the front insulation end 610. In the present view, the tabs 1110 can be aligned with but disengaged from the notches 1107.

FIG. 12 is a detailed front perspective view of the evaporator case 206 showing the top insulation 210 in an installed and secured configuration. As shown, the top insulation 210 can be fully positioned between the evaporator walls 207a,b, and the tabs 1110 can be inserted into the notches 1107, thereby securing the front insulation end 610 to the evaporator walls 207a,b.

Figure 13:
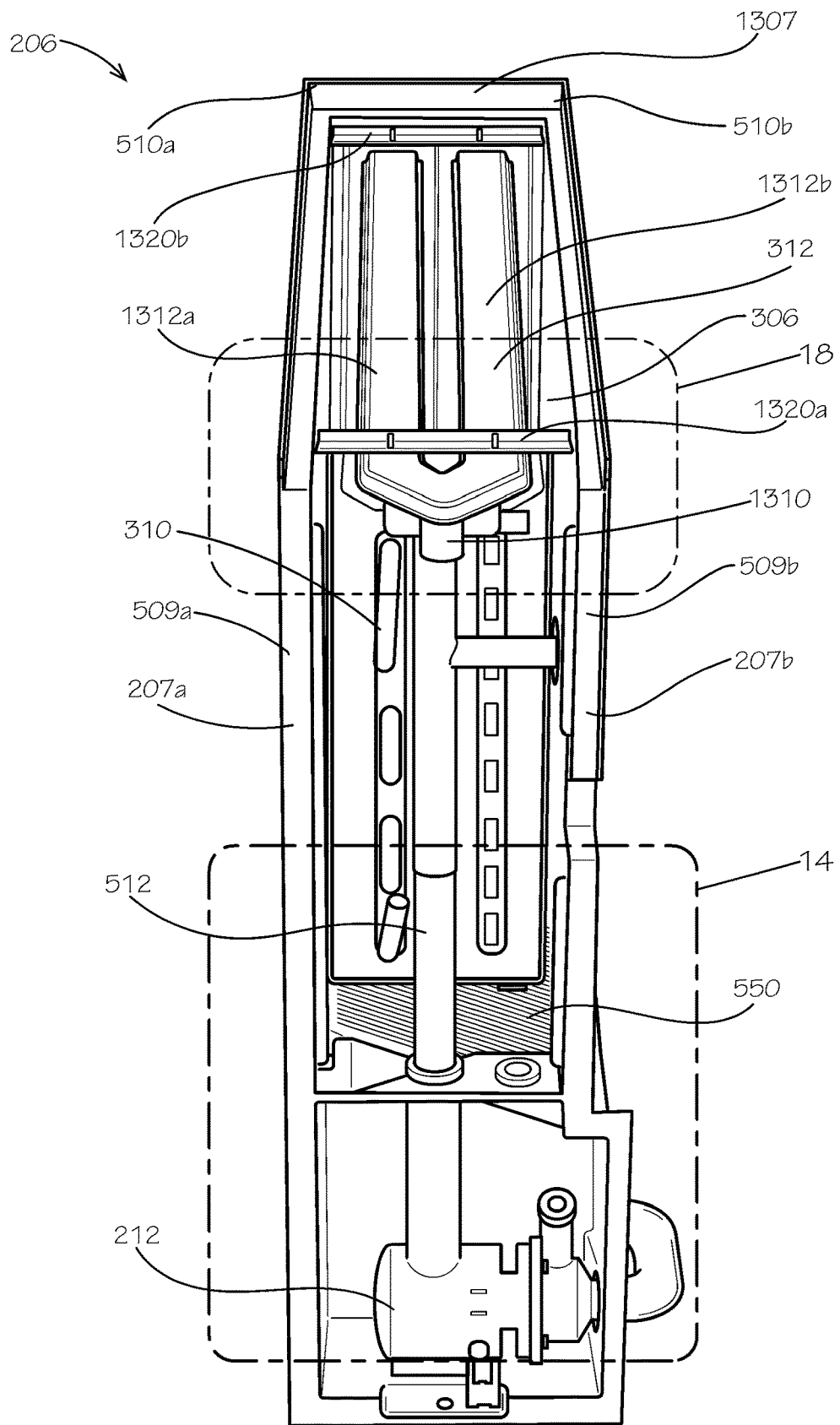
FIG. 13 is a front top perspective view of the evaporator case of FIG. 5A with the front insulation and the top insulation removed.

FIG. 13 is a front top perspective view of the evaporator case 206 of FIG. 2A with the front insulation 208 and the top insulation 210 removed. Each of the evaporator walls 207a,b can be substantially L-shaped, and the rear wall ends 510a,b can be connected together to form a back panel 1307 of the evaporator case 206. The evaporator case 206 can comprise a pair of evaporator brackets 1320a,b. The evaporator bracket 1320a can be disposed proximate to the front wall ends 509a,b, and the evaporator bracket 1320b can be disposed proximate to the rear wall ends 510a,b. The evaporator brackets 1320a,b can slide vertically downward between the evaporator walls 207a,b to secure the evaporator brackets 1320a,b within the evaporator compartment 306.

The evaporator brackets 1320a,b can support the spray tube 312 and the evaporator 310. The spray tube 312 can define a manifold end 1310 disposed between the evaporator bracket 1320a and the front wall ends 509a,b. The spray tube 312 can also define two tube portions 1312a,b which can split from the manifold end 1310 and extend between the evaporator brackets 1320a,b. The manifold end 1310 can be connected to the insulated tubing 512, and water pumped upwards from the water pump 212 can be redirected through the manifold end 1310 to the tube portions 1312a,b. The tube portions 1312a,b can spray the water down through the evaporator 310 when the ice maker 110 is producing ice. The supply tube 1930 (shown in FIG. 2C) can, in contrast, spray the water through the evaporator 310 (including through portions of the evaporator 310 not accessed by the water from the spray tube 312) when the ice maker 110 is cleaning itself during a cleaning cycle or a sanitizing cycle described below.

Figure 14:
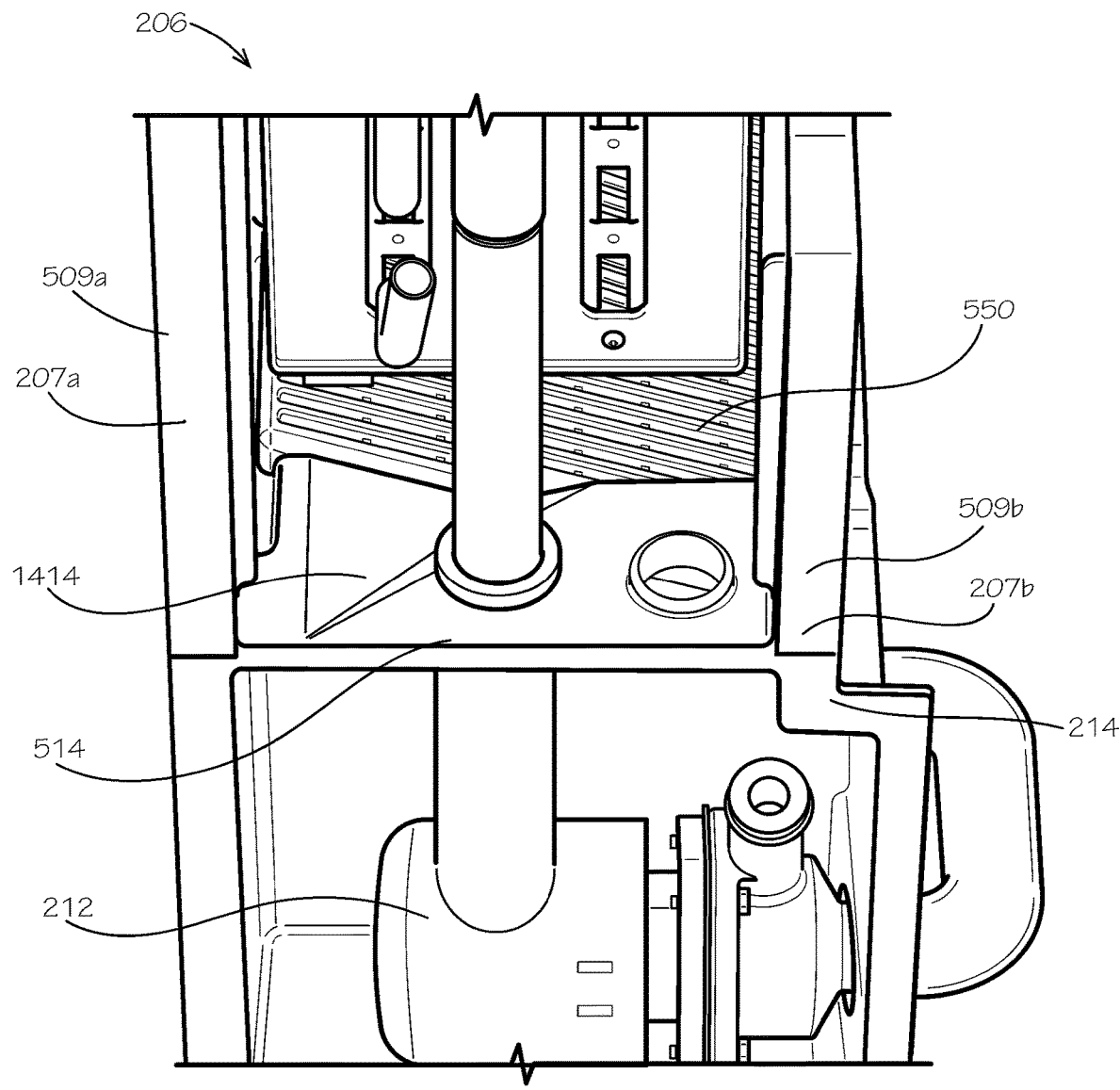
FIG. 14 a detail front top perspective view of the tank of the evaporator case of FIG. 5A taken from detail 14 of FIG. 13.

FIG. 14 is a detailed front top perspective view of the tank 214 of the evaporator case 206. The top tank end 514 can define a sloped spout 1414. The spout 1414 can slope downwards from a front end of the tank 214 disposed proximate to the front wall ends 509a,b of the evaporator walls 207a,b toward the cube guide 550. During cleaning of the ice maker 110 (shown in FIG. 1), the water reservoir 614 (shown in FIG. 5B) within the tank 214 can be drained and refilled with a cleaning solution, as described below in greater detail. The spout 1414 can aid in filling the water reservoir with the cleaning solution. The cleaning solution can be poured onto the spout 1414 and directed downwards along the spout 1414 and through the cube guide 550 to fill the water reservoir 614. The cleaning solution can then be circulated through the water circuit 450 (shown in FIG. 3) by the water pump 212.

Figure 15:
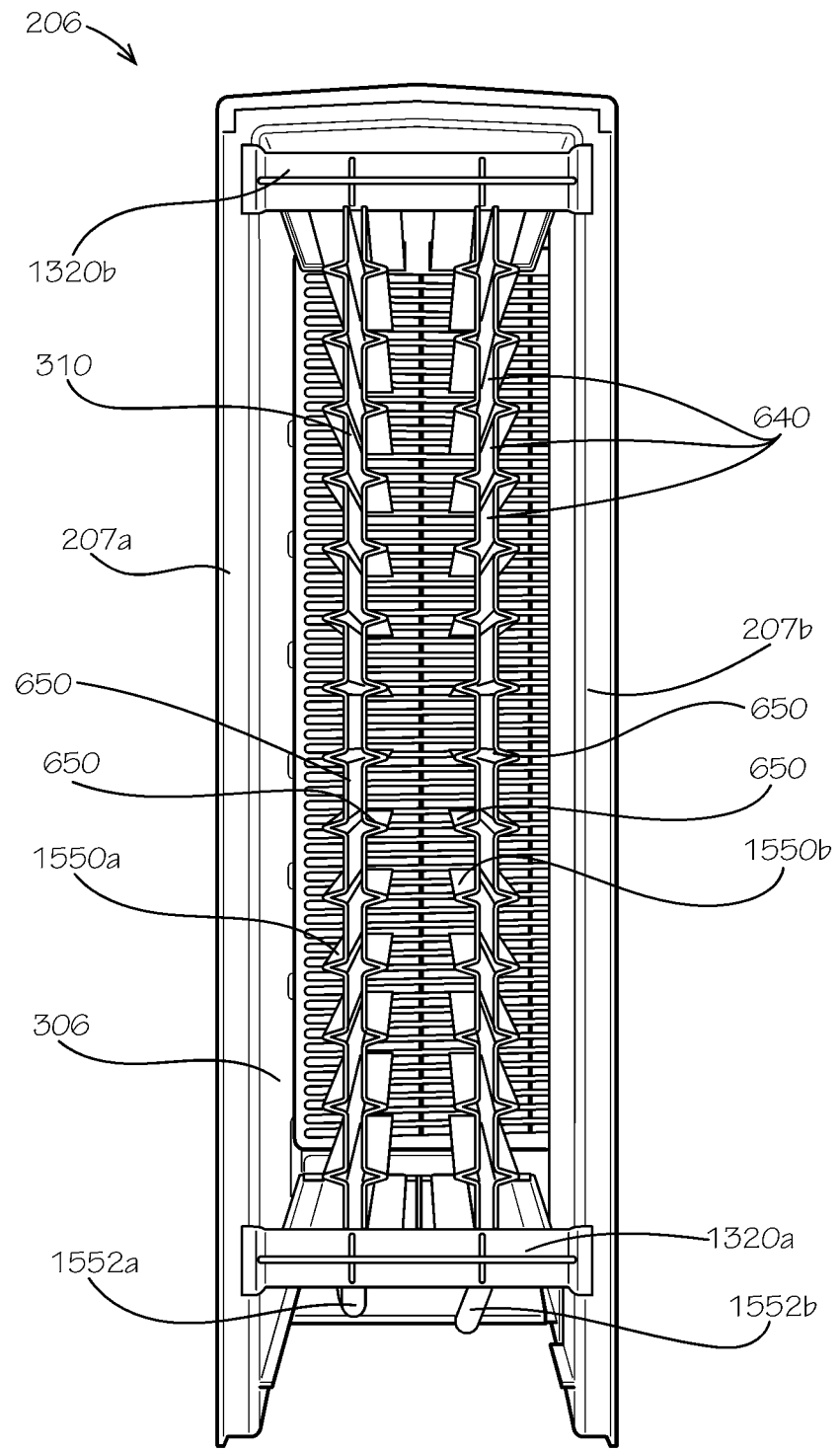
FIG. 15 is a top perspective view of the evaporator case of FIG. 5A with the spray tube removed.

FIG. 15 is a top perspective view of the evaporator case 206 with the spray tube 312 removed. As shown, the evaporator 310 can comprise four of the evaporator plates 650, which can be paired into two evaporator plate assemblies 1550a,b. The evaporator plate assemblies 1550a,b can extend between the evaporator brackets 1320a,b to secure the evaporator 310 within the evaporator compartment 306. Two tubing circuits 1552a,b can extend between the adjacent evaporator plates 650 of the respective evaporator plate assemblies 1550a,b. The tubing circuits 1552a,b can each be configured in a serpentine pattern extending backwards and frontwards between the evaporator brackets 1320a,b. The tubing circuits 1552a,b and evaporator plates 650 can each comprise a thermally conductive material, such as copper, stainless steel, aluminum, brass, or any other suitable material. For example and without limitation, the tubing circuits 1552a,b can comprise copper tubing, and the evaporator plates 650 can comprise stainless steel. Each evaporator plate assembly 1550a,b can operate as a heat exchanger. More specifically, heat from the evaporator plates 650 can be absorbed by evaporating refrigerant circulated through the tubing circuits 1552a,b to cool the evaporator 310 below the freezing point of water.

Each of the evaporator plates 650 can define a plurality of the channels 640. In operation, the two tube portions 1312a,b (shown in FIG. 13) of the spray tube 312 (shown in FIG. 13) can respectively align with the two evaporator plate assemblies 1550a,b of evaporator plates 650. The tube portions 1312a,b can each define a plurality of spray nozzles 1910 (shown in FIG. 19) which can respectively be aligned with the plurality of channels 640 defined by the evaporator plates 650 on each side of the respective evaporator plate assembly 1550a,b. The spray nozzles 1910 can spray water down the channels 640, where the ice cubes 490 can be individually formed.

Figure 16:
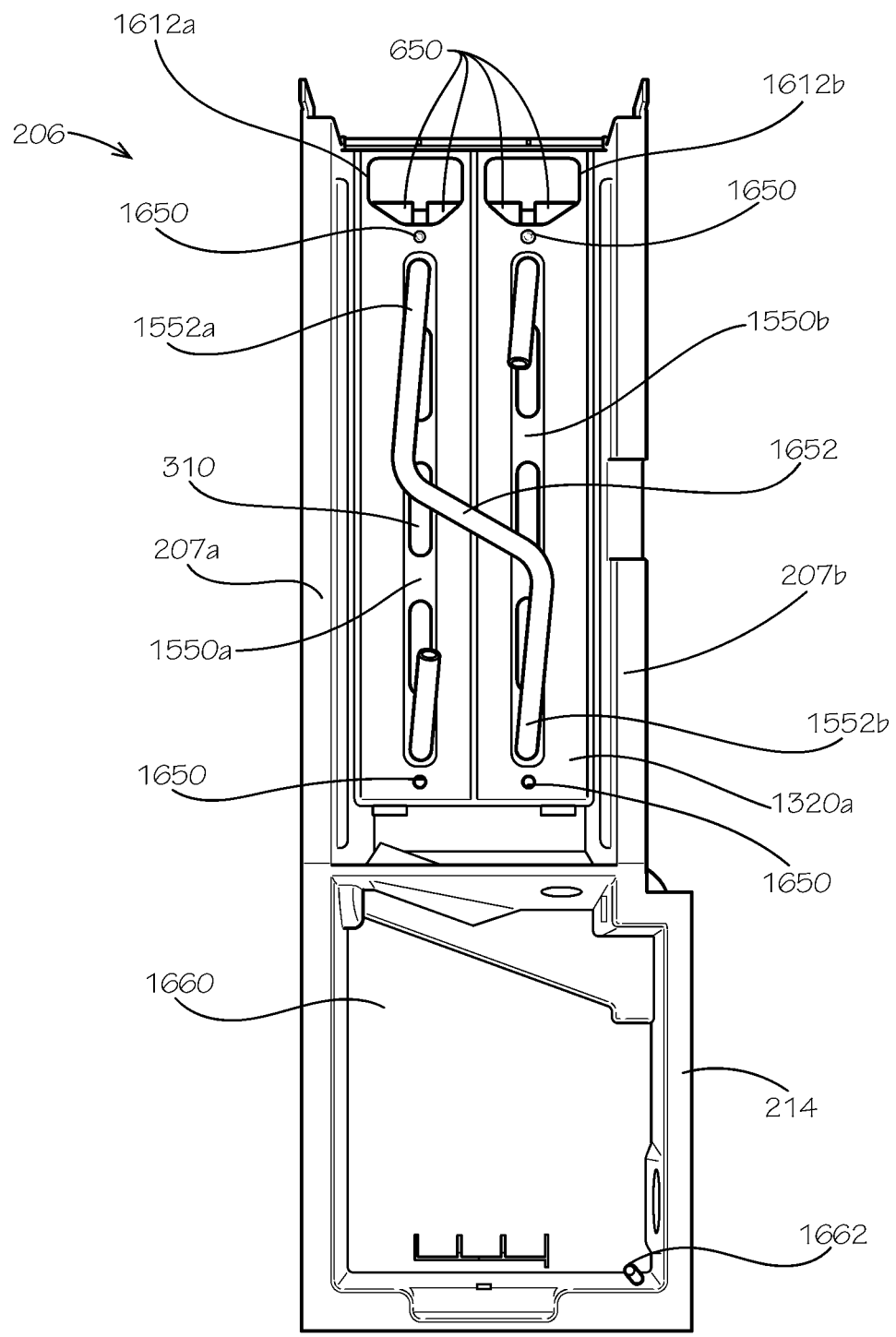
FIG. 16 is a front perspective view of the evaporator case of FIG. 5A with the spray tube, the water pump, and insulated tubing of the ice maker removed.

FIG. 16 is a front perspective view of the evaporator case 206 with the spray tube 312, the water pump 212, and the insulated tubing 512 removed. As shown, each of the evaporator plate assemblies 1550a,b of the evaporator plates 650 can be secured to the evaporator brackets 1320a,b (1320b shown in FIG. 15) by a plurality of fasteners 1650, as represented by the evaporator bracket 1320a. Additionally, the tubing circuits 1552a,b can be connected in fluid communication by a cross-over tube 1652 to form a single loop of the refrigerant circuit 400 (shown in FIG. 4). Additionally, as represented by the evaporator bracket 1320a, each one of the evaporator brackets 1320a,b can define a pair of tube openings 1612a,b. Each of the tube openings 1612a,b can be configured to respectively receive and support a different one of the tube portions 1312a,b (shown in FIG. 13) of the spray tube 312 (shown in FIG. 13).

With the water pump 212 removed from a pumping compartment 1660 of the tank 214, a drain port 1662 of the pumping compartment 1660 can be exposed. The drain port 1662 can lead to the tank base 602 (shown in FIG. 6) to drain any water that might otherwise collect in the pumping compartment 1660 from the pumping compartment 1660 to outside the ice maker 110.

Figure 17:
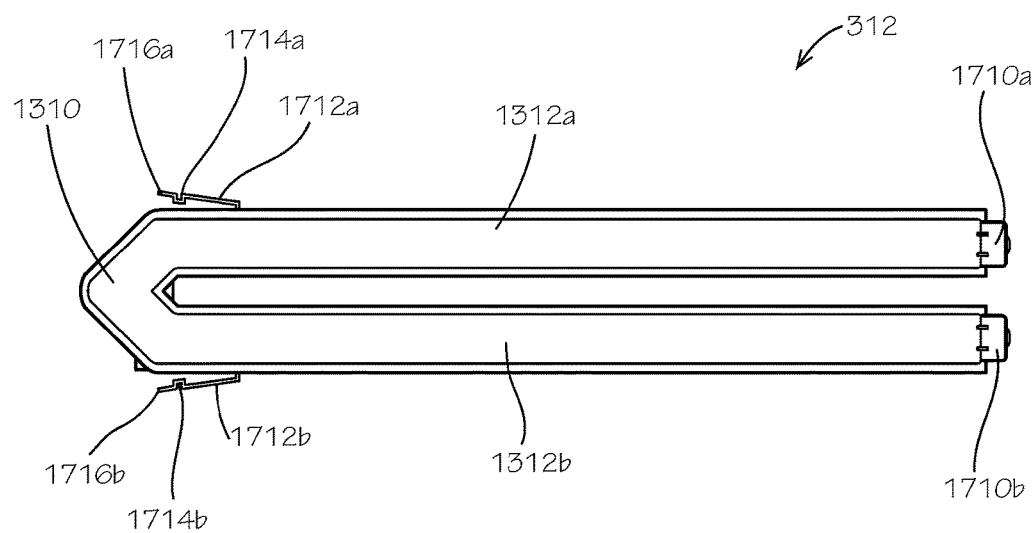
FIG. 17 is a top view of the spray tube of FIG. 2C.

FIG. 17 is a top view of the spray tube 312 of FIG. 3. The spray tube 312 can comprise a pair of lever arms 1712a,b, each of which can attach to a different one of the tube portions 1312a,b, opposite from one another. The lever arms 1712a,b can be resilient and flexible, and the lever arms 1712a,b can be biased to extend outwards from the respective tube portions 1312a,b and toward the manifold end 1310. Each lever arm 1712a,b can define an engagement notch 1714a,b and an end 1716a,b, respectively. The spray tube 312 can also comprise a pair of caps 1710a,b which can enclose the tube portions 1312a,b opposite from the manifold end 1310.

Figure 18:
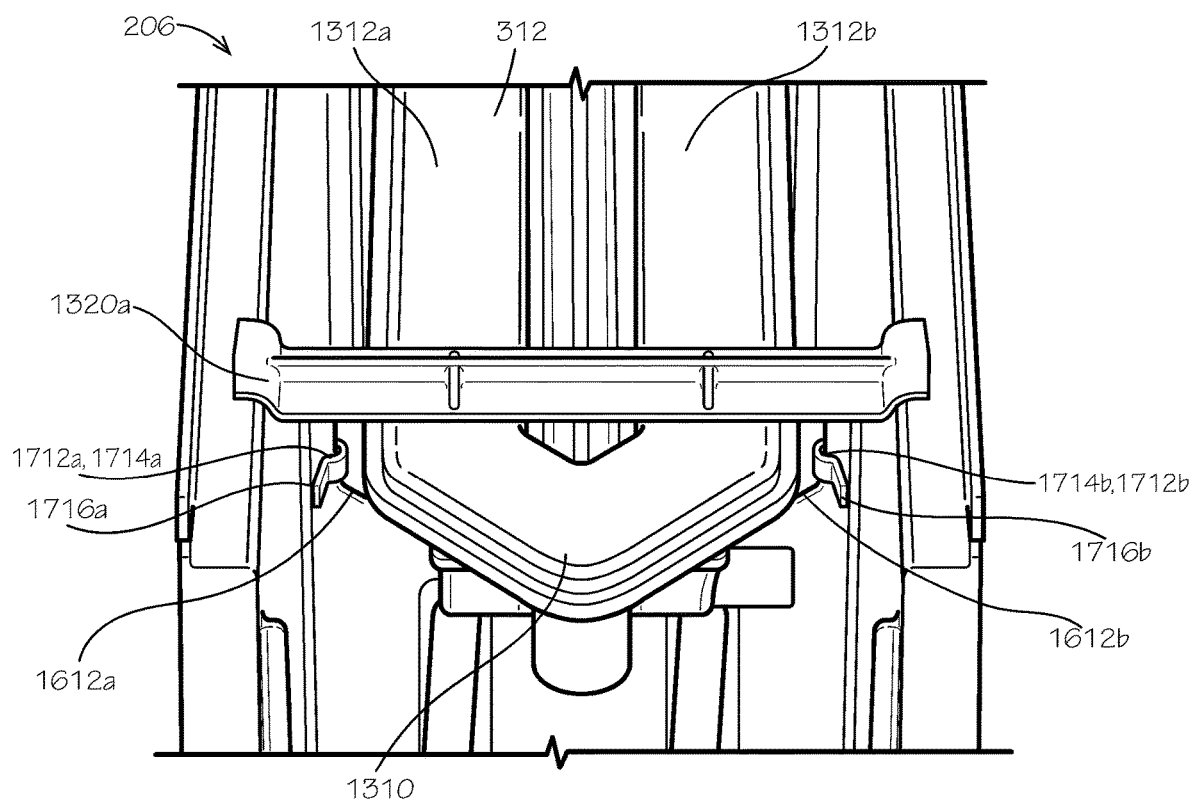
FIG. 18 is a detail front perspective view of the evaporator case of FIG. 5A taken from detail 18 of FIG. 13 and showing a manifold end of the spray tube of FIG. 17.

FIG. 18 is a detailed front perspective view of the evaporator case 206 focusing on the manifold end 1310 of the spray tube 312 of FIG. 3. As previously described, each of the tube portions 1312a,b can respectively extend through a different one of the tube openings 1612a,b, and the evaporator bracket 1310a can support the manifold end 1310 of the spray tube 312. The lever arms 1712a,b can also extend through the tube openings 1612a,b along with the respective attached tube portion 1312a,b. The engagement notches 1714a,b can each engage an edge of a different one of the tube openings 1612a,b, thereby laterally securing spray tube 312 to the evaporator bracket 1310a and preventing withdrawal of the tube portions 1312a,b from the tube openings 1612a,b. The lever arms 1712a,b can be disengaged from the tube openings 1612a,b by pressing the ends 1716a,b inwards toward the manifold end 1310. Once the lever arms 1712a,b are disengaged from the tube openings 1612a,b, the spray tube 312 can be pulled laterally outwards from the evaporator bracket 1310a, such as to facilitate cleaning or maintenance of the spray tube 312.

Figure 19:
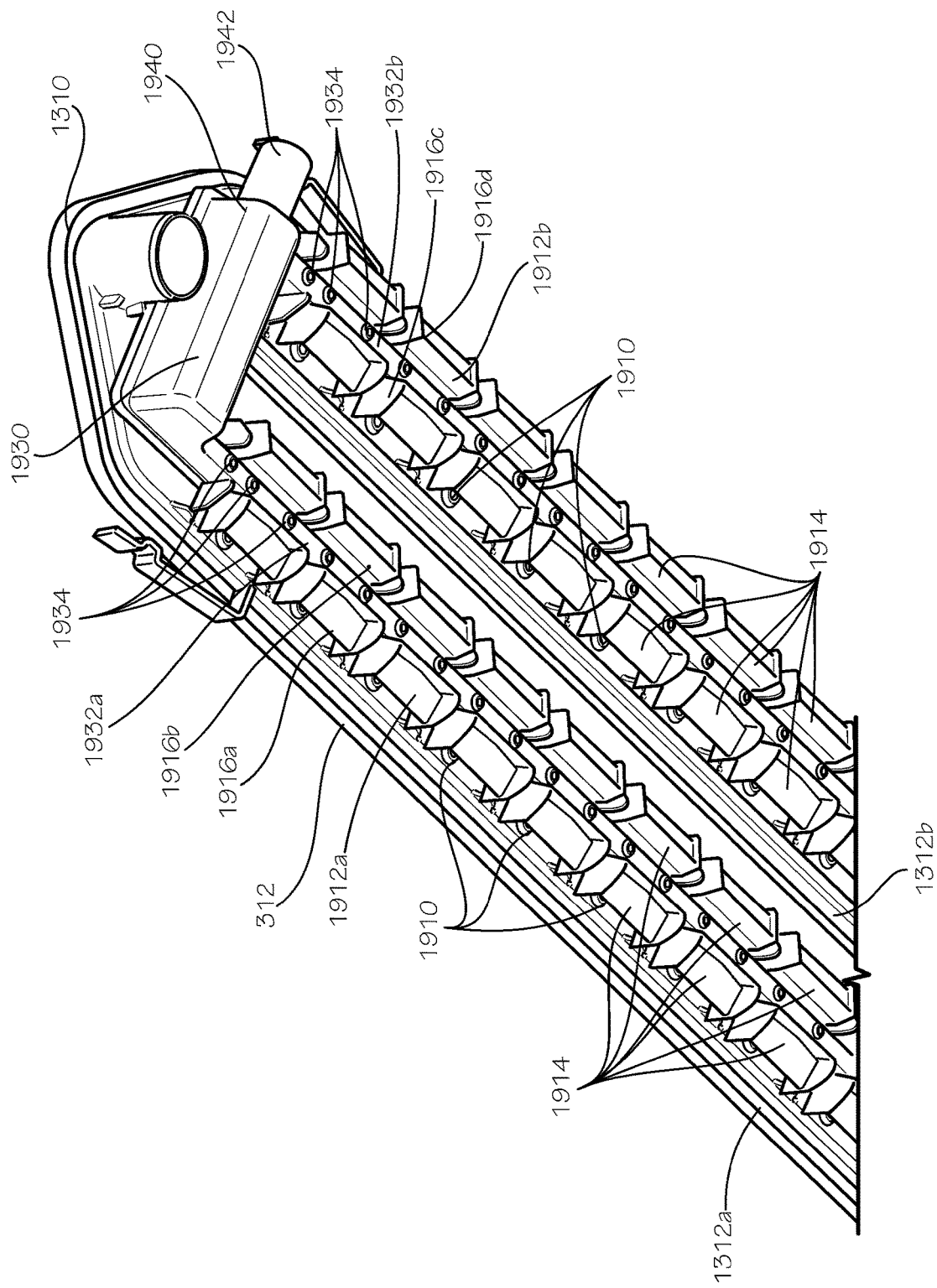
FIG. 19 is a detail bottom perspective view of the spray tube of FIG. 17 showing the manifold end and shown assembled with a supply tube of the water circuit.

FIG. 19 is a detailed bottom perspective view of the spray tube 312 of FIG. 3 focusing on the manifold end 1310. As shown, each of the tube portions 1312a,b can define a plurality of spray nozzles 1910. The spray nozzles 1910 can be configured to align with the channels 640 (shown in FIG. 15) defined by the evaporator plates 650 (shown in FIG. 15). A pair of spray guides 1912a,b can be positioned below the spray tube 312. The spray guides 1912a,b can respectively extend along a bottom surface of the tube portions 1312a,b. Each of the spray guides 1912a,b can define a plurality of channel guides 1914, which can align with a different one of the spray nozzles 1910. The channel guides 1914 can be configured to each align with a different one of the channels 640 to guide liquid water down the respective channel 640.

Each tube portion 1312a,b can define two rows of spray nozzles 1910, as better shown below with respect to FIG. 20, and each spray guide 1912a,b can define two rows 1916a-d of channel guides 1914, respectively. The supply tube 1930 can additionally be positioned below the spray tube 312. The supply tube 1930 can define a supply manifold end 1940 with a connection 1942. The supply tube 1930 can also comprise a pair of supply tube portions 1932a,b. Each of the supply tube portions 1932a,b can extend along a one of the tube portions 1312a,b between adjacent rows 1916a-d of the channel guides 1914. For example, the supply tube portion 1932a can extend between the adjacent rows 1916a,b of the channel guides 1914 along the tube portion 1312a. The supply tube portions 1932a,b can each define a plurality of supply nozzles 1934, which during cleaning and sanitizing of the ice maker can spray cleaning fluid, sanitizing fluid, and water between the evaporator plates 650 (shown in FIG. 15) of the evaporator plate assemblies 1550a,b (shown in FIG. 15) to respectively clean, sanitize, and rinse areas of the evaporator 310 that would otherwise be difficult to clean.

Figure 20:
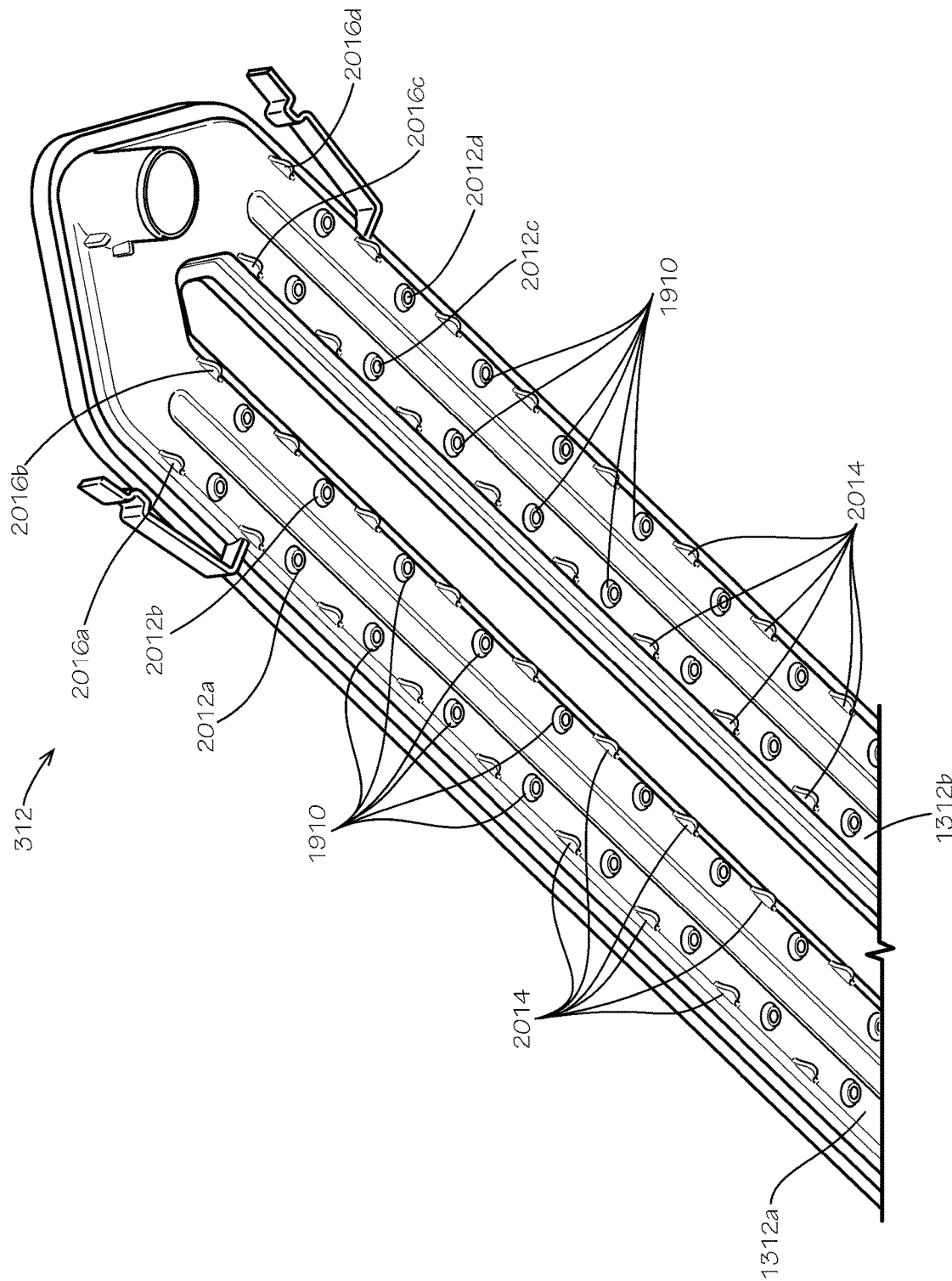
FIG. 20 is a detail bottom perspective view of the spray tube of FIG. 17 with the supply tube removed.

FIG. 20 is a detailed bottom perspective view of the spray tube 312 of FIG. 19 shown apart from the supply tube 1930 and the spray guides 1912a,b. As previously described, the spray nozzles 1910 can be arranged into two rows 2012a-d along each respective tube portion 1312a,b. For example, two rows 2012a,b of spray nozzles 1910 can extend down the tube portion 1312a. Additionally, two rows 2016a-d of guide tabs 2014 can extend along each tube portion 1312a,b, and the guide tabs 2014 can be spaced between the spray nozzles 1910. The guide tabs 2014 can aid in aligning the spray guides 1912a,b (shown in FIG. 19) with the spray nozzles 1910.

Figure 21:
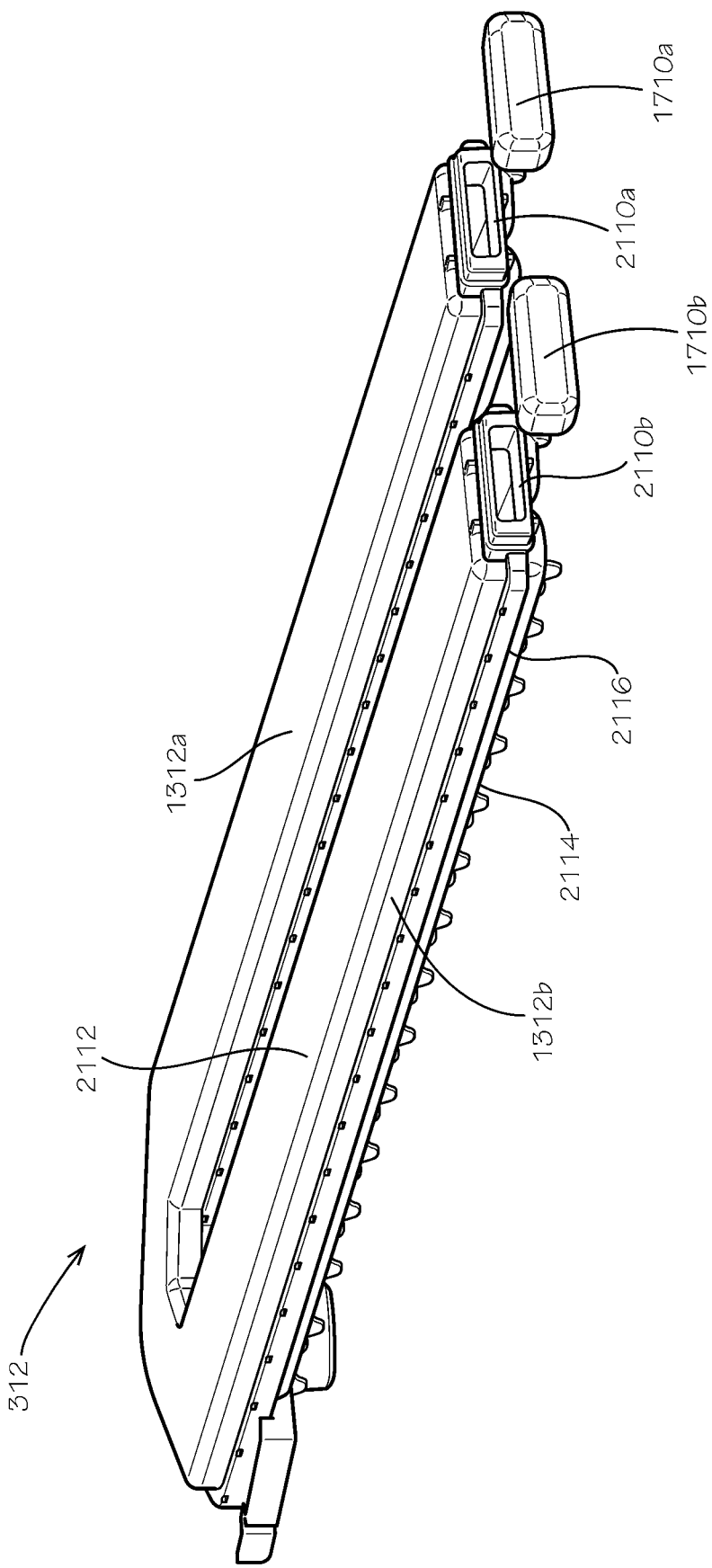
FIG. 21 is a side perspective view of the spray tube of FIG. 17.

FIG. 21 is a side perspective view of the spray tube 312 of FIG. 19 shown apart from the supply tube 1930 and the spray guides 1912a,b. As has been typically done in the past, the spray tube 312 can be formed integrally or monolithically from a single piece using a method such as blowmolding. In contrast, the spray tube 312 can comprise a top panel 2112 and a bottom panel 2114. The top panel 2112 and the bottom panel 2114 can be separately formed pieces, such as through injection molding, for example and without limitation. The top panel 2112 and the bottom panel 2114 can be attached together by a seam 2116, such as through a technique like vibration welding, for example and without limitation. Vibration welding is a fast and chemical-less technique that can melt the parts together. The top panel 2112 and the bottom panel 2114 can be rubbed together under pressure with a vibration forming tool to form friction, which can melt the base material of the panels 2112,2114 together. The weld can then cool.

In the present aspect, the caps 1710a,b can also be removed from the respective tube portions 1312a,b to reveal end openings 2110a,b. In contrast to a blow-molded spray tube with typically a small, rough-edged hole defining each of the end openings 2110a,b, the end openings 2110a,b of the spray tube 312 formed from the panels 2112,2114 can be wide, open slots configured to allow easy access for cleaning, such as with a brush or high-pressure spray stream. In the present aspects, the caps 1710a,b can be configured to securely snap over the end openings 2110a,b without tools to facilitate assembly and maintenance.

Figure 22:
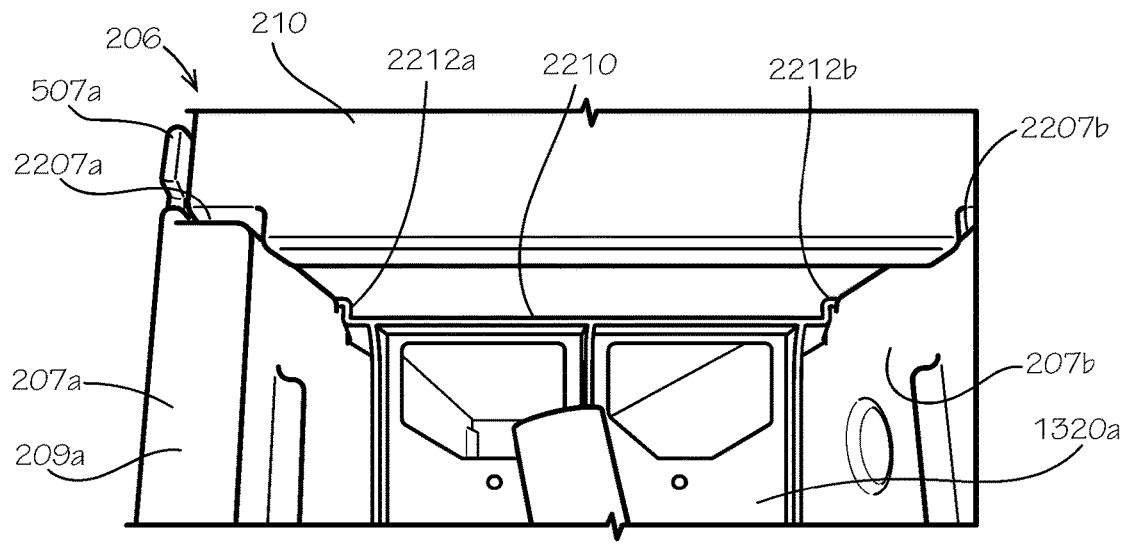
FIG. 22 is a detail front perspective view of the evaporator case of FIG. 5A showing the top insulation, an evaporator bracket, and the evaporator walls.

FIG. 22 is a detailed front view of top insulation 210, the evaporator bracket 1310a, and the evaporator walls 207a,b of the evaporator case 206. As shown, the evaporator bracket 1310a can define a top flange 2210. The top flange 2210 can define a pair of wings 2212a,b at opposite sides of the top flange 2210. The evaporator walls 207a,b can each define an inner ledge 2207a,b, and the top insulation 210 can rest upon the inner ledges 2207a,b. As shown by evaporator wall 207a, the inner ledge 2207a can be defined below the top wall end 507a. The evaporator brackets 1310a, (evaporator bracket 1310b shown in FIG. 13) can be configured to be lifted vertically upward to remove the evaporator brackets 1310a,b from between the evaporator walls 207a,b. With the top insulation 210 in place, the evaporator bracket 1310a,b can be blocked such that the evaporator bracket 1310a,b cannot be lifted vertically.

Figure 23:
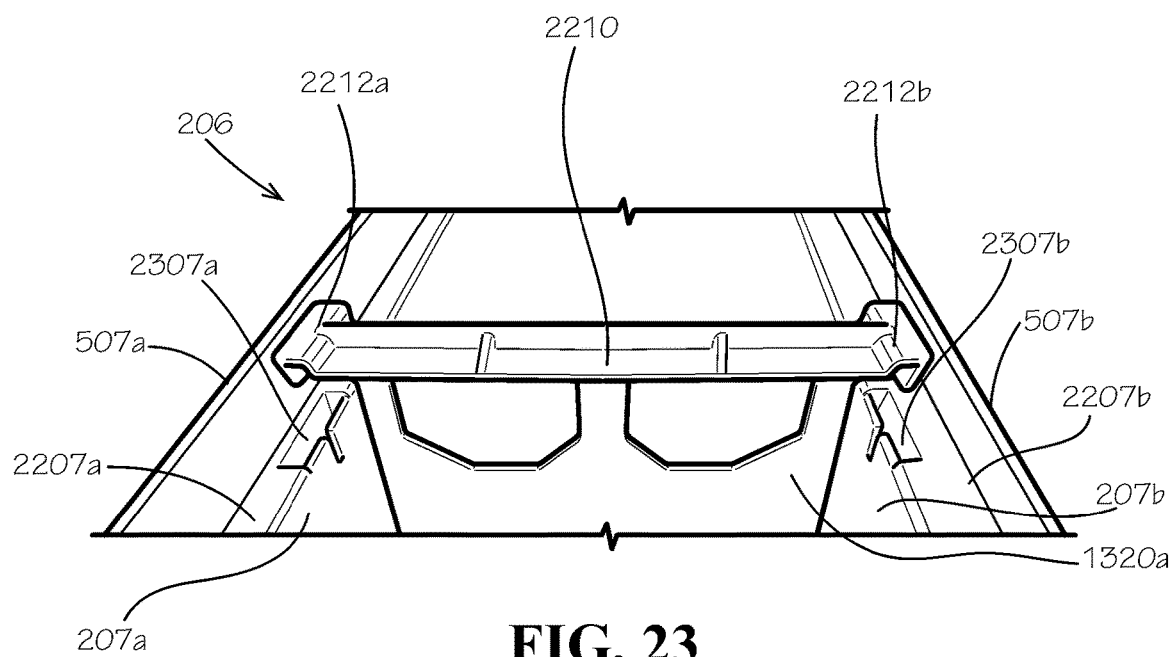
FIG. 23 is a detail front perspective view of the evaporator case of FIG. 5A showing the evaporator bracket partially removed or disengaged from the evaporator walls.

FIG. 23 is a detailed front perspective view of the evaporator bracket 1310a and the evaporator walls 207a,b of the evaporator case 206 with the evaporator bracket 1310a partially removed from the evaporator walls 207a,b. With the evaporator bracket 1310a vertically lifted upwards, the wings 2212a,b can disengage from a pair of watertight pockets 2307a,b respectively defined extending into the inner ledges 2207a,b of the evaporator walls 207a,b. In contrast to when the evaporator walls 207a,b are formed using a vacuum-forming process, as has been typically done in the past, the pockets 2307a,b can be formed without exposing any blown foam or other insulation present behind the evaporator walls 207a,b.

Figure 24:
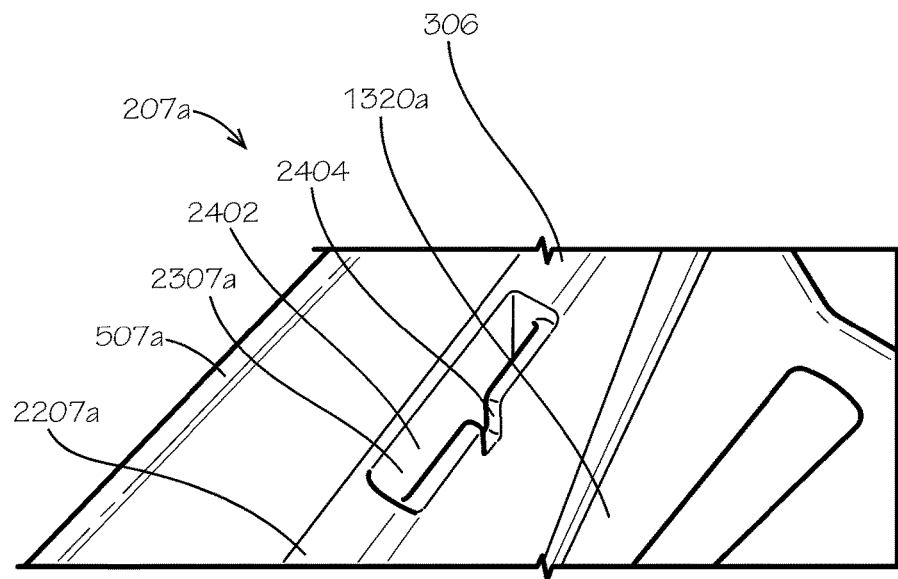
FIG. 24 is a detail perspective view of the evaporator case of FIG. 5A showing a first pocket of the evaporator wall of FIG. 23.

FIG. 24 is a detailed perspective view of the pocket 2307a of the evaporator wall 207a. As shown, the pocket 2307a can define a groove 2402 extending lengthwise along the inner ledge 2207a and a perpendicular notch 2404 extending inwards from the groove 2402 and through to the evaporator compartment 306. In the present aspect, the evaporator walls 207a,b (207b shown in FIG. 23) can be formed by injection molding, and the pocket 2307a can be integrally formed within the evaporator wall 207a. In the present aspect, as suggested above, the pocket 2307a does not extend through the evaporator wall 207a, thereby providing watertight protection of the foam insulation from the pocket 2307a.

Figure 25:
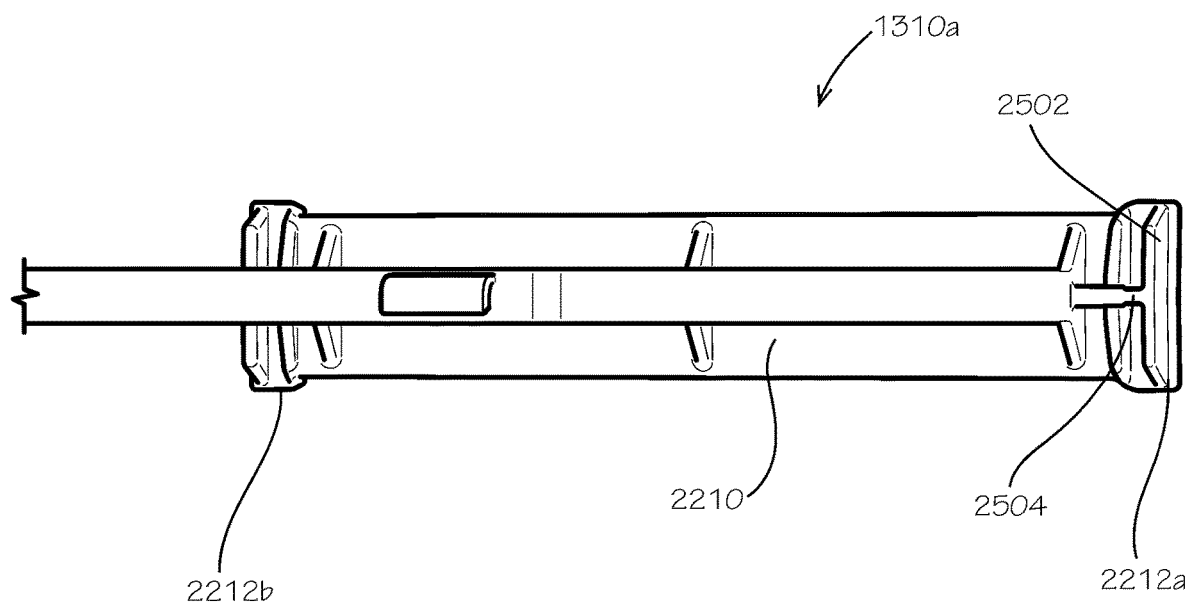
FIG. 25 is an upward-looking bottom perspective view of the evaporator bracket of FIG. 22.

FIG. 25 is an upward-looking bottom perspective view of the evaporator bracket 1310a of FIG. 13. As shown, the wing 2212a can define a lengthwise tab 2502 which can be configured to engage the groove 2402 (shown in FIG. 24) and a perpendicular ridge 2504 configured to engage the perpendicular notch 2404 (shown in FIG. 24).

As noted above, the evaporator walls 207a,b have traditionally been formed using a vacuum-forming process from a polymer material such as acrylonitrile butadiene styrene (ABS). A vacuum-formed part, however, can and inevitably will vary in thickness to varying degrees across the part and because of variable shrinkage in variable manufacturing conditions can vary in size from part to part to a greater degree than parts formed using an injection-molding process. After forming of the individual vacuum-formed parts, the parts are typically joined using a solvent-welding process. During solvent welding, a solvent such as acetone or a monomer mixture comprising a solvent such as acetone and a mixture of ground (i.e., reduced to small fragments) raw material forming the parts (e.g., ground ABS), for example and without limitation, can be used to soften the material of the panels 2112,2114, and the panels 2112,2114 can be pressed together until the material re-hardens and cures. While the monomer used in solvent welding can solidify within minutes, a cure time of 24 hours is typically required, and the quality of the joints joined by solvent welding can vary greatly depending on the skill of an operator assembling the parts, such as the evaporator walls 207a,b and the tank 214. Moreover, solvent welding often involves chemicals, which can produce an unpleasant vapor during use.

In contrast, as also noted above, the evaporator walls 207a,b as well as the tank 214 of the evaporator case 206 can be individually formed using a molding process such as injection molding from a material such as ABS or any other desirable and moldable material. As will be described, each of the parts of the evaporator case 206 can then be joined together very tightly without any fasteners or even any solvent welding processes to form an evaporator case 206 that is water-tight and resistant to leakage of blown foam (i.e., foam-tight) through the joints during the manufacturing process and in particular during the process of forming the evaporator case 206. Water-blown insulation in particular can have a low viscosity and after being sprayed into an insulated assembly such as the evaporator case 206 can remain in a water-like state for as long as 10 seconds or more, making water-tight and foam-tight joints even more beneficial—and not only against water intrusion during operation of the ice maker 110 but water leakage from seams of insulated assemblies such as the evaporator case 206 during the foaming process.

Figure 26:
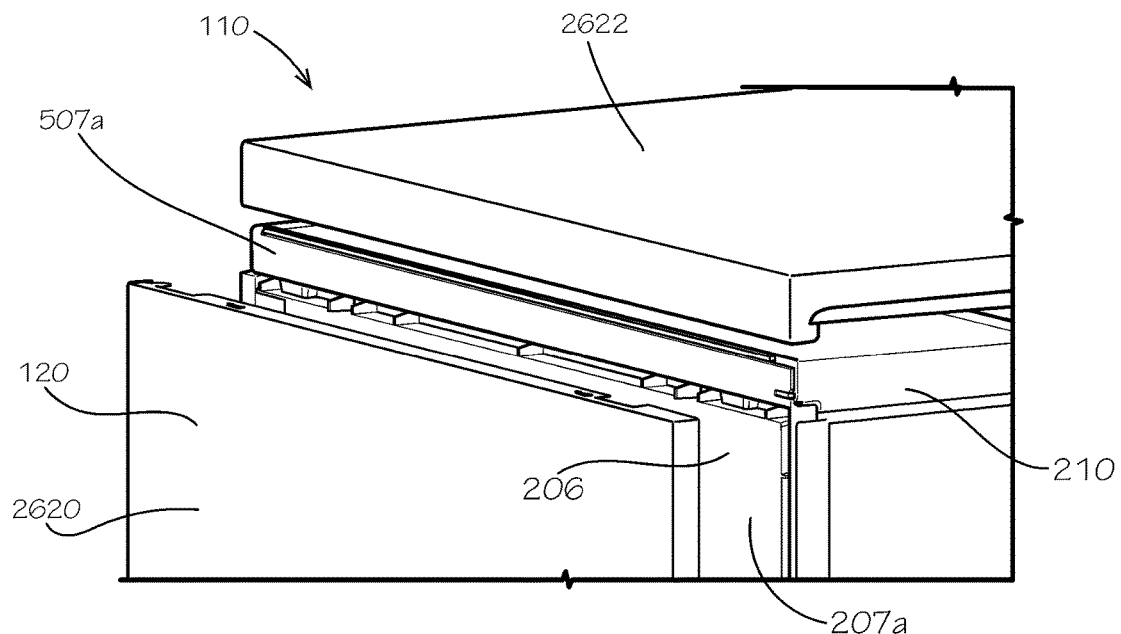
FIG. 26 is a detail front corner perspective view of the ice maker of FIG. 1 with the front panel assembly of the outer casing removed and before assembly of the evaporator case.

FIG. 26 is a detailed front corner perspective view of the ice maker 110 of FIG. 1 with the front panel assembly 122 (shown in FIG. 1) of the outer casing 120 removed and before assembly of the evaporator case 206. As shown, a left side panel 2620 of the outer casing 120 is offset outward from the evaporator wall 207a of the evaporator case 206, and a top panel assembly 2622 of the outer casing 120 is offset above the top insulation 210. The left side panel and any other panel forming a portion of an exterior of the evaporator case 206 or the base case 205 can be an exterior panel.

Figure 27:
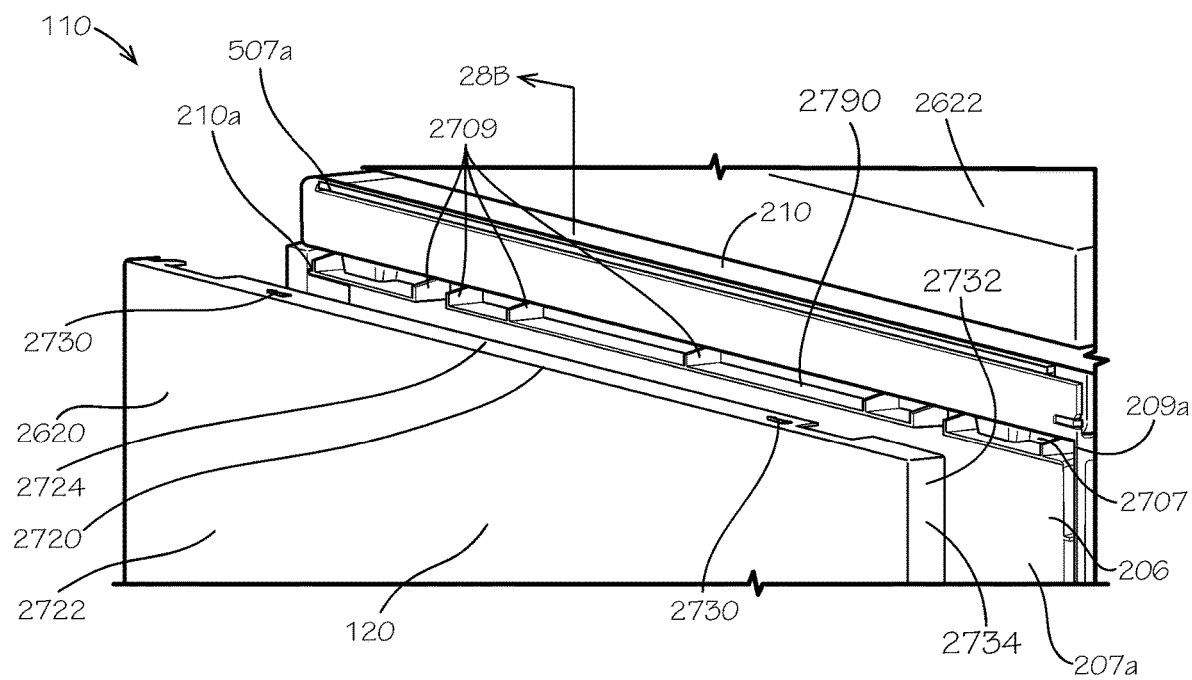
FIG. 27 is a detail perspective view of the ice maker of FIG. 26 focusing on a top panel end of a left side panel of the evaporator case.

FIG. 27 is a detailed perspective view of the portion of the ice maker 110 shown in FIG. 26 focusing on a top panel end 2720 of the left side panel 2620. The left side panel 2620 can define a vertical portion 2722, a lip 2724—which can be a top lip—disposed at the top panel end 2720, and a lip 2734—which can be a side lip—disposed at a front panel end 2732. The lip 2724 can extend inwards toward the evaporator case 206. The evaporator wall 207a can define a groove 2707 extending from the front wall end 209a to the rear wall end 210a. The groove 2707 can be defined below the top wall end 507a. Within the groove 2707, the evaporator wall 207a can define a plurality of inclined projections 2709 extending into the groove 2707 and can be sloped projections. The inclined projections 2709 can slope upwards and inwards into the groove 2707. As shown, the inclined projections 2709 and a bottom groove wall 2790, which can extend between the inclined projections 2709, can extend toward the left side panel 2620 by the same distance to contact and form a seal against the left side panel 2620 during foaming of the assembly.

In some aspects, as shown and described, the groove 2707 can be oriented horizontally and the lip 2724 can be oriented horizontally. In other aspects, the groove 2707 can be oriented vertically and the lip 2724 can be oriented vertically such as, for example and without limitation, proximate to the front wall ends 509a,b (shown in FIG. 11) of the evaporator walls 207a,b (207b shown in FIG. 11). The groove 2707 can thereby be a horizontal groove or a vertical groove of any portion of the evaporator case 206 and the lip 2724 can be a horizontal lip or a vertical lip of any panel. Similarly, other portions of the evaporator case can define grooves 2707, which can be oriented horizontally, vertically, or at any other desired orientation between the horizontal and the vertical orientations.

The groove 2707 can be configured to receive the lip 2724 to attach the left side panel 2620 to the evaporator wall 207a. The lip 2724 can be inserted into the groove 2707. The lip 2724 can slide over the inclined projections 2709 into a fully seated position and thereby form a slide joint. Additionally, the left side panel 2620 can define a pair of tabs 2730. In the present aspect, the tabs 2730 can be cut out of the lip 2724 and plastically deflected upwards and away from the lip 2724 at an incline. Each of the tabs 2730 can engage a watertight pocket 2830 defined within the groove 2707, as shown below in FIG. 28. Each of the tabs 2730 can be a lance tab, which can elastically deform during assembly, at least together with the lip 2724 if not also toward the surrounding portion of the lip 2724 to allow insertion of the lip 2724. The tab 2730, with or without the surrounding portion of the lip 2724, can then elastically deform back to its original position to engage in or with the pocket 2830.

Figure 28A:
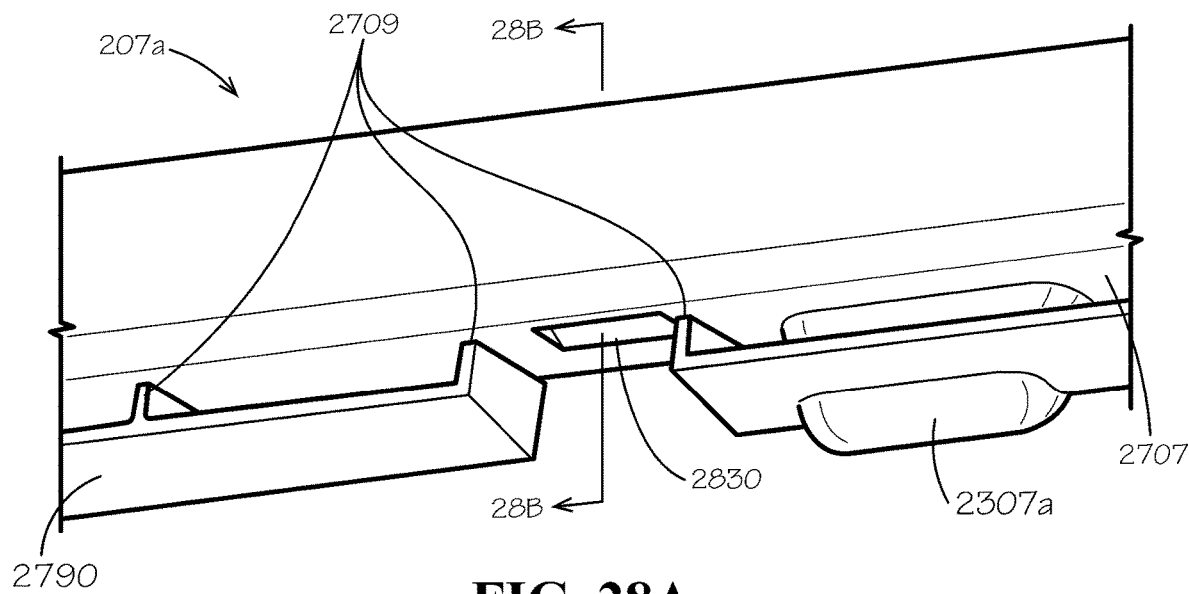
FIG. 28A is a perspective view of a second pocket of the evaporator wall of the evaporator case of FIG. 5A.

FIG. 28A is a perspective view of the pocket 2830 of the evaporator wall 207*a* of FIG. 2. The pocket 2830 can be defined by an upper surface of the groove 2707, opposite from the inclined projections 2709. The inclined projections 2709 can press the lip 2724 (shown in FIG. 27) and the tabs 2730 (shown in FIG. 27) up into engagement with the pockets 2830 to secure the top panel end 2720 of the left side panel 2620 to the evaporator wall 207*a*. This attachment mechanism can provide a simple, snap-together assembly that does not require any tools.

Figure 28B:
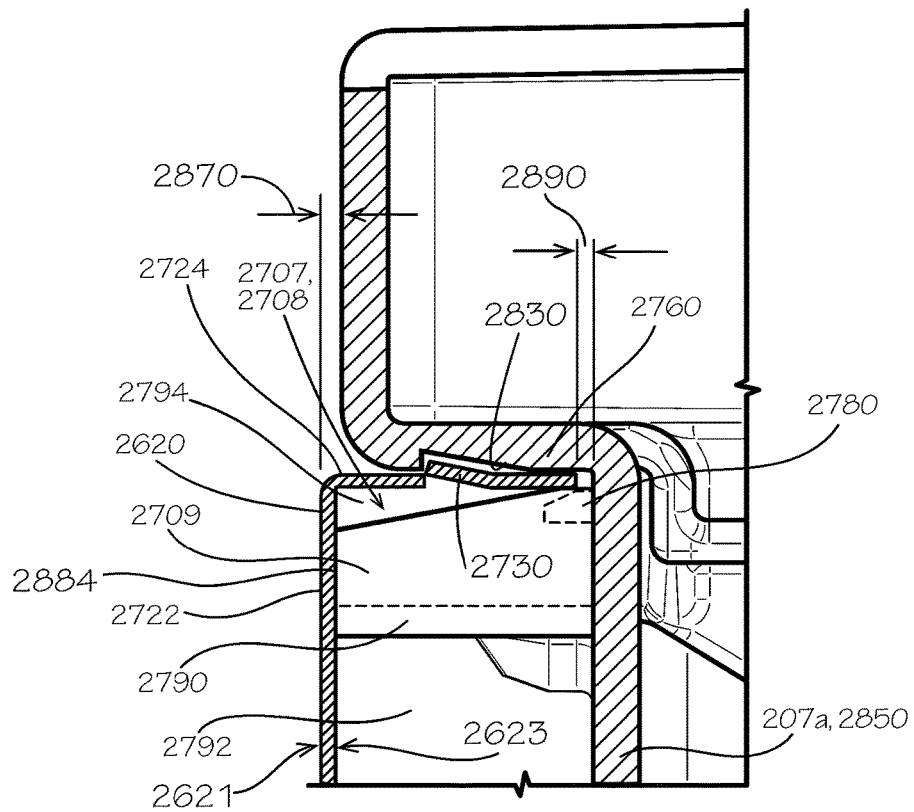
FIG. 28B is a detail sectional view of the evaporator case of FIG. 5A taken from line 28B-28B of FIG. 28A showing a top panel end of the left side panel assembled to the evaporator wall of the evaporator case.

FIG. 28B shows a detailed sectional view of the top panel end 2720 of the left side panel 2620 assembled to the evaporator wall 207*a* of the evaporator case 206 in the aforementioned slide joint. The groove 2707 can be defined between a top groove wall 2760 and the bottom groove wall 2790. As shown, the bottom groove wall 2790 can extend outwards from the evaporator wall 207*a* to contact the vertical portion 2722 of the left side panel 2620, and the bottom groove wall 2790 can serve as a standoff—defining even part of a standing rib 2884, similarly as a standing rib 2984 (shown in FIG. 29B) described below—between the evaporator wall 207*a* and the left side panel 2620. An insulation cavity 2792 can be defined below the bottom groove wall 2790 and between the vertical portion 2722 of the left side panel 2620 and the evaporator wall 207*a*. An overflow insulation cavity 2794 can be defined above the bottom groove wall 2790, below the lip 2724, and between the vertical portion 2722 of the left side panel 2620 and the evaporator wall 207*a*.

The tab 2730 can be formed by shearing and bending a portion of the lip 2724 only partially into the lip 2724 such that a water-tight and foam-tight closed lance is formed. As shown, the shearing and bending of the lip 2724 to form the tab 130 can stop short of a full material thickness of the lip 2724. Even if an open lance is used, the opening in the tab 2730 can be sized such that the excess foam reaching the overflow insulation cavity 2794 will not easily pass through the opening.

As previously described, liquid foam can be sprayed or injected into the insulation cavity 2792, and the liquid foam can expand and harden as it cures. In order to fully insulate the evaporator case 206 (shown in FIG. 2), the insulation cavity 2792 can be fully filled with liquid foam under pressure. It can be difficult to fill the insulation cavity 2792 precisely without slightly under-filling the insulation cavity 2792, thereby leaving voids in the insulation, or slightly over-filling the insulation cavity 2792, in which case excess insulation can leak out from the insulation cavity 2792. The overflow insulation cavity 2794 can provide for a space in which over-filled foam can slowly leak into and expand—but only inside the wall as will be explained below—without compromising the aesthetics of the ice machine 100 (shown in FIG. 1), such as by exposing foam insulation coming through the outer casing 120 (shown in FIG. 1). For example, the insulation cavity 2792, where desirable, can be intentionally over-filled under pressure to prevent voids in the insulation, or a foaming agent such as, for example and without limitation, the aforementioned water-blown foam, can have a low viscosity and yet still not readily leak out of the assembly during foaming. The excess foam can partially leak between the vertical portion 2722 and the bottom groove wall 2790, and the insulation can expand and harden within the overflow insulation cavity 2794. The left side panel 2620 can conceal the overflow insulation cavity 2794 so foam which leaks into the overflow insulation cavity 2794 cannot be viewed by a user. The improvements described herein can also reduce or eliminate typical assembly processes (e.g., taping of joints, caulking of seams, and/or application of putty at corners) and structures (e.g., tape, caulk, and putty) and the amount of time required before foaming to prepare the foamed portion of the ice maker 110 for foaming or after foaming to clean up leaked foam.

Such movement of the excess foam into the overflow insulation activity 2794 can be limited through resistance against foam leakage into the overflow insulation cavity 2794 provided by a narrow gap 2708 defined specifically between the lip 2724 and the inclined projection 2709. The gap 2708 can be described as an entrance to the overflow insulation cavity 2794. Resistance against foam leakage into the overflow insulation cavity 2794 can also be provided by a seal between an inner surface 2623 of the left side panel 2620 and each of the bottom groove walls 2790 and the inclined projections 2709 along the width of the left side panel 2620. Under pressure by walls of a foaming jig sufficient to hold the left side panel 2620 against each of the bottom groove walls 2790 and the inclined projections 2709, the excess foam can only travel through the gap 2708. Moreover, an offset 2870 between an outer surface 2621 of the left side panel 2620 and an adjacent outer surface of the evaporator wall 207*a* and also an offset 2890 between an end of the lip 2724 of the left side panel 2620 and the evaporator wall 207*a* in an insertion direction of the lip 2724 can ensure consistent pressure between the left side panel 2620 and each of the bottom groove walls 2790 and the inclined projections 2709—even with variations due to, for example, manufacturing tolerances in a width of the lip 2724 or in any dimension of the other parts, which variations can be absorbed by the offset 2890 or the offset 2870.

Expanding insulation that enters the overflow insulation cavity 2794 can be prevented from leaking out from between the lip 2724 of the left side panel 2620 and the top groove wall 2760 of the evaporator wall 207*a* by positioning the lip 2724 in close proximity to the top groove wall 2760 with the inclined projections 2709. Additionally, the interface between the lip 2724 and an inner sealing lip 2780 can provide additional protection to prevent foam from leaking outward between the lip 2724 and the top groove wall 2760. The inner sealing lip 2780 can extend between adjacent inclined projections 2709, and the lip 2724 can be positioned at least partially between the inner sealing lip 2780 and the top groove wall 2760. These features eliminate the need for assemblers to tape, seal, or putty seams between the left side panel 2620 and the evaporator wall 207*a*—measures which in any case can be ineffective at preventing low-viscosity water-blown foam from leaking from seams defined between the left side panel 2620 and the evaporator wall 207*a* but can be at least partially effective with some blown foams. Eliminating the need for taping, sealing, or puttying seams can save significant time during assembly and foaming of the insulation cavity 2794.

Figure 29A:
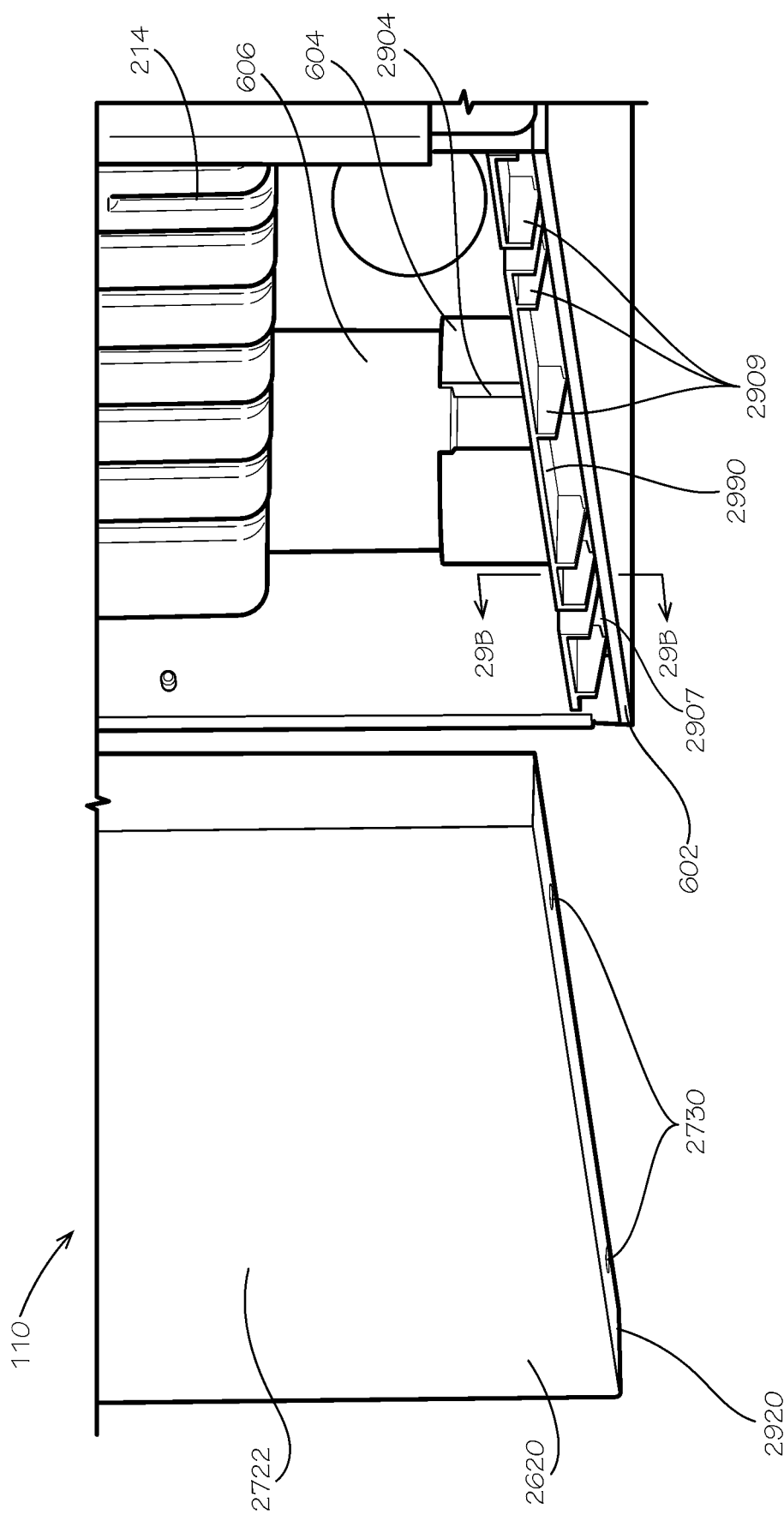
FIG. 29A is a detail perspective view of the evaporator case of FIG. 5A showing a bottom horizontal lip of the left side panel of the evaporator case and a groove defined by the tank base.

FIG. 29A is a detailed perspective view of a bottom lip 2920 of the left side panel 2620 and a groove 2907 defined by the tank base 602. Similar to the groove 2707 (shown in FIG. 27), the tank base 602 can define a plurality of declined projections 2909 which slope downward and inward into the groove 2907 and can be sloped projections. The declined projections 2909 can guide the bottom lip 2920 into a fully seated position inside the groove 2907. Additionally, the bottom lip 2920 can define tabs 2730, which can engage watertight pockets 3030 (shown in FIG. 30) shown facing the groove 2907 which are similar to the pockets 2830 (shown in FIG. 28A). As shown, the declined projections 2909 and a top groove wall 2990, which can extend between the inclined projections 2909, can extend toward the left side panel 2620 by the same distance to contact and form a seal against the left side panel 2620 during foaming of the assembly.

As previously described, at least in connection with FIG. 5B, the tank base 602 can define the split collar 604 which can be configured to receive and frictionally engage a support column 606 defined by the tank 214. The split collar 604 can define a split 2904, and the split collar 604 can be configured to elastically deflect radially outward to receive and frictionally engage the support column 606.

Figure 29B:
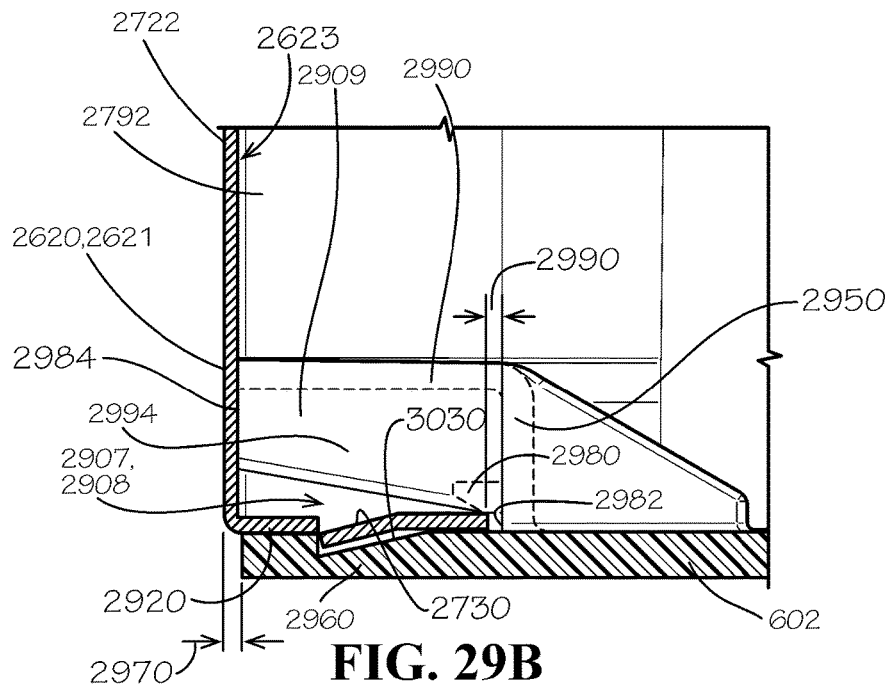
FIG. 29B is a detail sectional view of the evaporator case of FIG. 5A taken from line 29B-29B of FIG. 29A showing a bottom panel end of the left side panel assembled to the evaporator wall of the evaporator case.

FIG. 29B shows a detailed cross-sectional view of a bottom panel end of the left side panel 2620 assembled to the tank base 602 in another of the aforementioned slide joints. Similar to the aspect of FIG. 28B, in the present aspect, an overflow insulation cavity 2994 can be defined between the left side panel 2620 and the tank base 602. The groove 2907 can be defined between a top groove wall 2990 and a bottom groove wall 2960. As shown, the top groove wall 2990 can extend outwards from the tank base 602 to contact the vertical portion 2722 of the left side panel 2620. The insulation cavity 2792 can be defined above the top groove wall 2990 and inward from the vertical portion 2722 of the left side panel 2620. An overflow insulation cavity 2994 can be defined below the top groove wall 2990, above the bottom lip 2920, and between the vertical portion 2722 of the left side panel 2620 and the tank base 602. The overflow insulation cavity 2994 (positioned in FIG. 29B behind the declined projection 2909) can be configured to allow controlled overflow of excess foam insulation sprayed into the insulation cavity 2994, similar to the insulation cavity 2792 (shown in FIG. 28B). The tab 2730 is shown engaged with the pocket 3030.

The declined projections 2909 can position the bottom lip 2920 in close proximity to the bottom groove wall 2960 to prevent expanding insulation from leaking out from between the bottom lip 2920 of the left side panel 2620 and the bottom groove wall 2960 of the tank base 602. An inner sealing lip 2980 can provide additional protection to prevent foam from leaking outward between the bottom lip 2920 and the bottom groove wall 2960, similar to the inner sealing lip 2780 of FIG. 28B. Similarly as with other portions of the evaporator case 206 including the structure shown in FIG. 28B, movement of the excess foam into the overflow insulation activity 2994 can be limited through resistance against foam leakage into the overflow insulation cavity 2994 provided by a narrow gap 2908 defined specifically between the lip 2920 and the declined projection 2909. The gap 2908 can be described as an entrance to the overflow insulation cavity 2994. Resistance against foam leakage into the overflow insulation cavity 2794 can also be provided by a seal between the inner surface 2623 of the left side panel 2620 and each of the bottom groove walls 2990 and the inclined projections 2909 along the width of the left side panel 2620. Under pressure by walls of a foaming jig sufficient to hold the left side panel 2620 against each of the top groove walls 2990 and the declined projections 2909, the excess foam can only travel through the gap 2908. Moreover, an offset 2970 between the outer surface 2621 of the left side panel 2620 and the adjacent outer surface of the evaporator wall 207a and also an offset 2990 between an end of the bottom lip 2920 of the left side panel 2620 and the evaporator wall 207a in an insertion direction of the lip 2920 can ensure consistent pressure between the left side panel 2620 and each of the bottom groove walls 2990 and the declined projections 2909—even with variations due to, for example, manufacturing tolerances in a width of the lip 2920 or in any dimension of the other parts, which variations can be absorbed by the offset 2990 or the offset 2970.

Figure 29C:
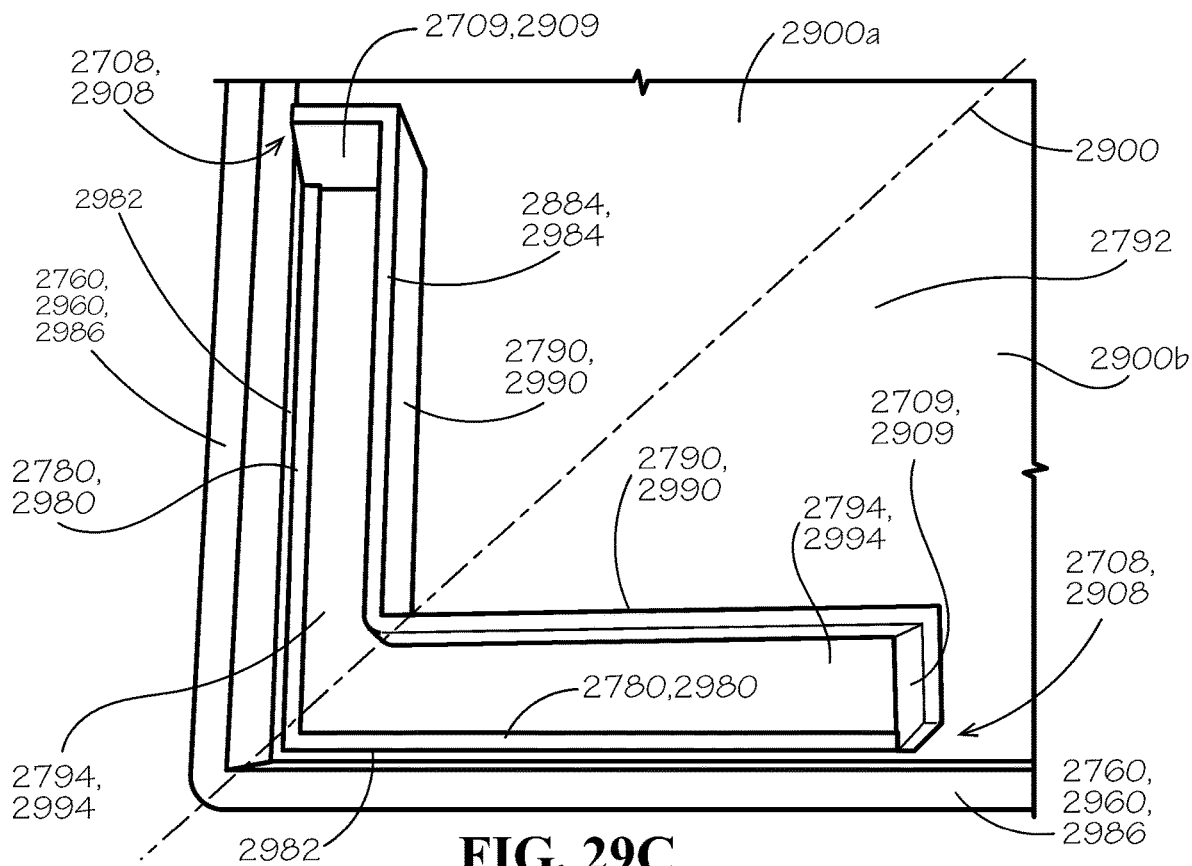
FIG. 29C is a detail perspective view of a portion of an inside of a generic aspect of an insulated wall of the ice maker of FIG. 1.

FIG. 29C is a detailed perspective view of a generic aspect of a corner of a one of the evaporator walls 207a,b or any other portion of the evaporator walls 207a,b, showing an inner sealing lip 2982, the inner standing ribs 2884,2984, and an outer rib 2986. The inner sealing lip 2982 can be configured to function similar to the inner sealing lip 2780 and the inner sealing lip 2980. The inner standing ribs 2884,2984 can be configured to function similar to the bottom groove wall 2790 and the top groove wall 2990. The outer rib 2986 can be configured to function similar to the top groove wall 2760 and the bottom groove wall 2960. The gaps 2708,2908 between the inner standing ribs 2884,2984 (and more specifically the sloped projections 2709,2909 at ends of the inner standing rib 2984) and the outer panel (e.g., the left side panel 2620 shown in FIG. 29A, which is removed in FIG. 29C but would be offset from each end of the inner standing ribs 2884,2984 when assembled to the evaporator wall 207a) can restrict foam flow from the insulation cavity 2792 into the overflow insulation cavities 2794,2994 as described above. In addition, at a corner of an interior panel such as the evaporator wall 207a, the aforementioned structures can prevent foam from escaping through gaps formed at intersections between the lips such as where a lower end of the lip 2734 (shown in FIG. 27) and a front end of the bottom lip 2920 (shown in FIG. 29B) meet. As shown, a dividing line 2900 can divide features 2900a and 2900b, which can be adjusted and positioned as needed on various interior panels or exterior panels throughout joints of the ice maker 110, only exemplary portions of which are explicitly shown.

Figure 29D:
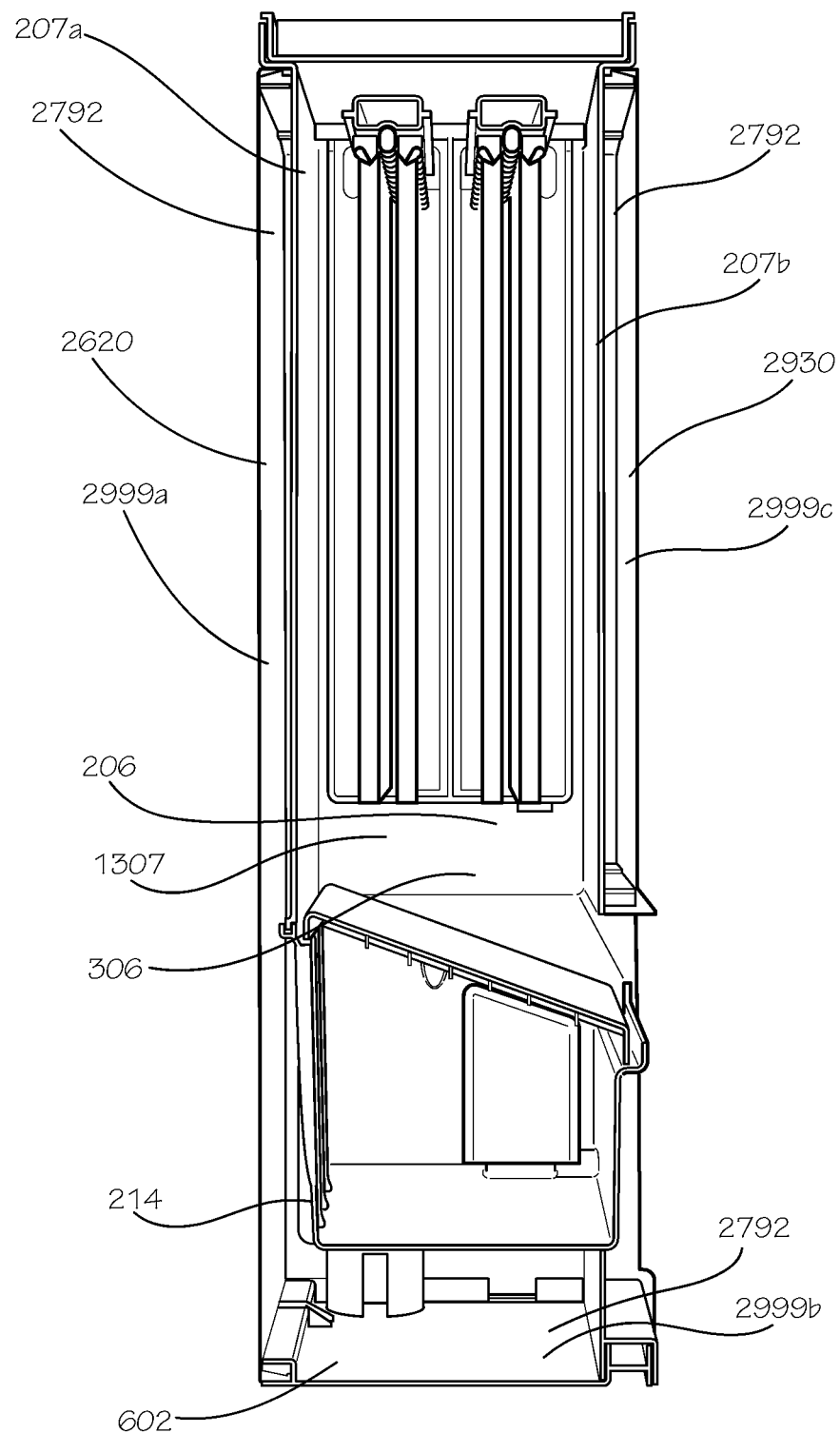
FIG. 29D is a sectional perspective view of an evaporator compartment of the evaporator case of FIG. 5A looking toward the back panel of the evaporator case.

FIG. 29D is a sectional perspective view of the evaporator compartment 306 looking toward the back panel 1307 of the evaporator case 206. As shown, the insulation cavity 2792 can extend around the evaporator walls 207a,b and the tank 214. A first portion 2999a of the insulation cavity 2792 can be defined between the evaporator wall 207a and the left side panel 2620. A second portion 2999b of the insulation cavity 2792 can be defined between the tank 214 and the tank base 602. A third portion 2999c of the insulation cavity 2792 can be defined between the evaporator wall 207b and an interior side panel 2930. The right side panel or interior side panel 2930 can be attached to the evaporator wall 207b similarly to the attachment of the left side panel 2620 to the evaporator wall 207a, as described with respect to FIGS. 26-29B. Each of the portions 2999a-c can be connected in fluid communication and can be fully filled with foam insulation in a single foaming operation.

Figure 29E:
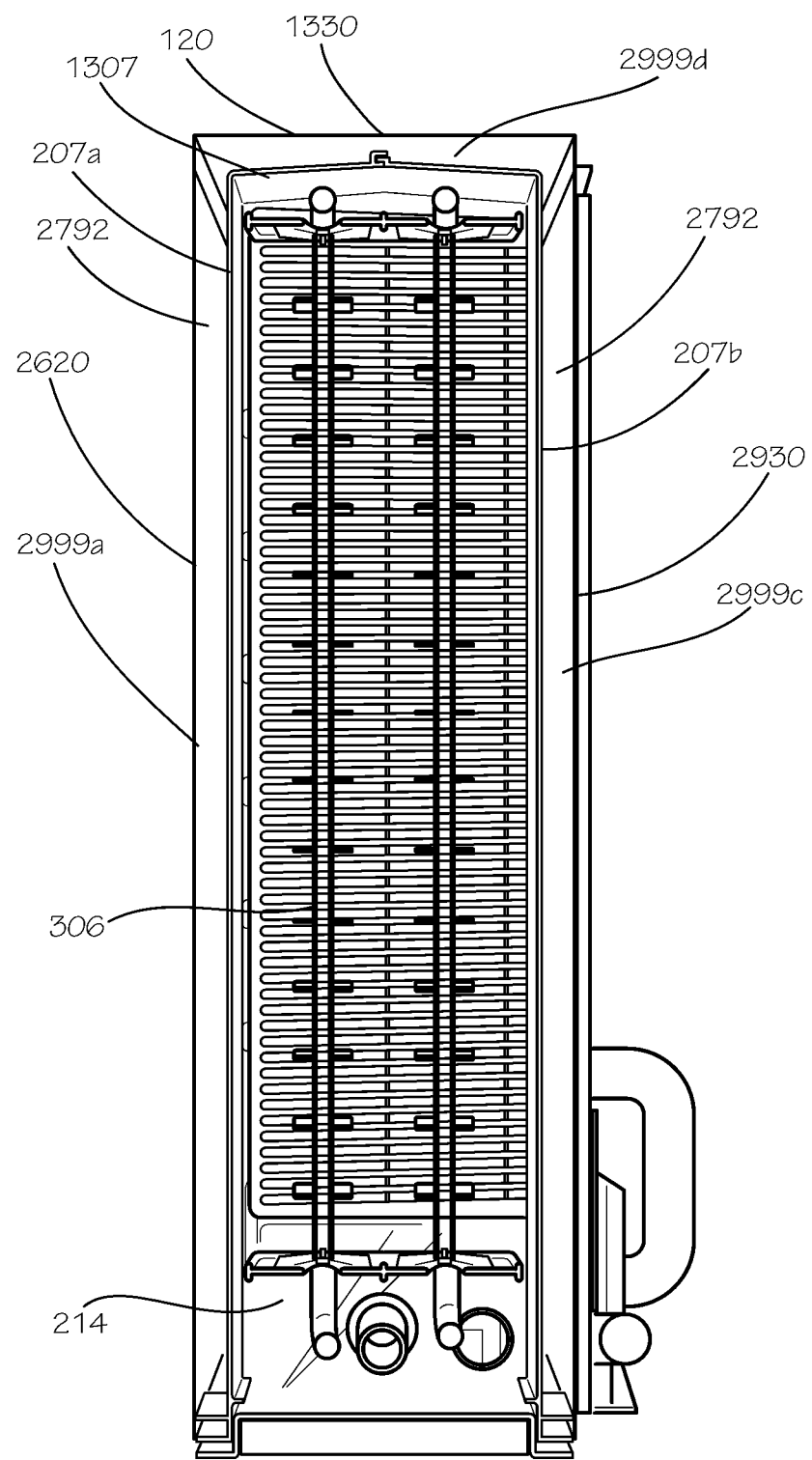
FIG. 29E is a top sectional perspective view of the evaporator compartment looking downwards toward the tank.

FIG. 29E is a top sectional perspective view of the evaporator compartment 306 looking downwards toward the tank 214. As shown, a fourth portion 2999d of the insulation cavity 2792 can be defined between the back panel 1307 and a rear panel 3120 of the outer casing 120. The rear panel 3120 can extend between the interior side panel 2930 and the left side panel 2620 to enclose the insulation cavity 2792. The fourth portion 2999d can join the first portion 2999a to the third portion 2999c.

Figure 30:
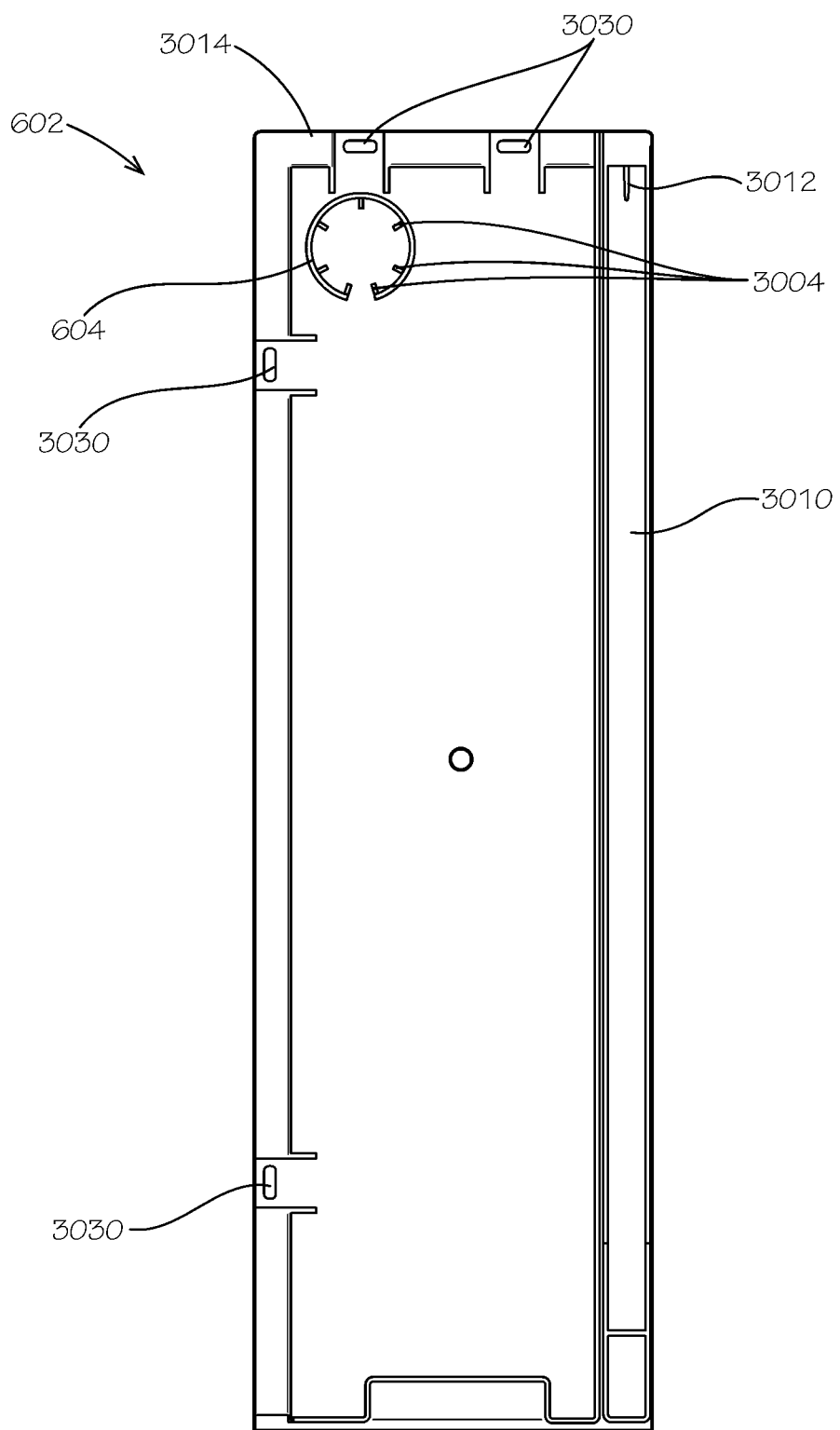
FIG. 30 is a top view of a tank base of the evaporator case of FIG. 5A.

FIG. 30 is a top view of the tank base 602 of FIG. 6. The split collar 604 can define a plurality of radial projections 3004 within the split collar 604. Each of the radial projections 3004 can define a horizontal ledge by which the support column 606 (shown in FIG. 29) can be supported in all three dimensions (X, Y, and Z) when it is inserted into the split collar 604. A sufficiently wide stance or diameter of the split collar 604 can support and maintain the position of the tank 214 under significant mechanical and foam pressure, which can be encountered during the foaming process while the evaporator case 206 and other portions of the ice maker 110 are inside the foaming jig. Forming the plurality of radial projections 3004 in a vertical orientation can not only facilitate manufacturing—and in particular molding—of the tank base 602 and an opening shown in the split collar 604 can allow foam to flow into the split collar 604 to ensure insulation throughout the area between the tank base 602 and the tank 214.

As previously described, the tank base 602 can define the pockets 3030. The tank base 602 can additionally define the pockets 3030 proximate to a rear end 3014 of the base 602, which can be configured to receive the rear panel 3120 (shown in FIG. 31) through a similar attachment mechanism as described above for the left side panel 2620 (shown in FIG. 26) with respect to the description of FIGS. 26-29. As desired, any sheetmetal or similar thin-walled panel of the evaporator case 206 can be similarly attached to any evaporator wall of the evaporator case 206.

The tank base 602 can also define a drainage channel 3010 and a drain port 3012 leading through the rear end 3014 of the tank base 602. The drainage channel 3010 can be configured to collect water from the drain port 1662 (shown in FIG. 16) of the pumping compartment 1660 (shown in FIG. 16) where the water pump 212 (shown in FIG. 2) can be positioned.

Figure 31:
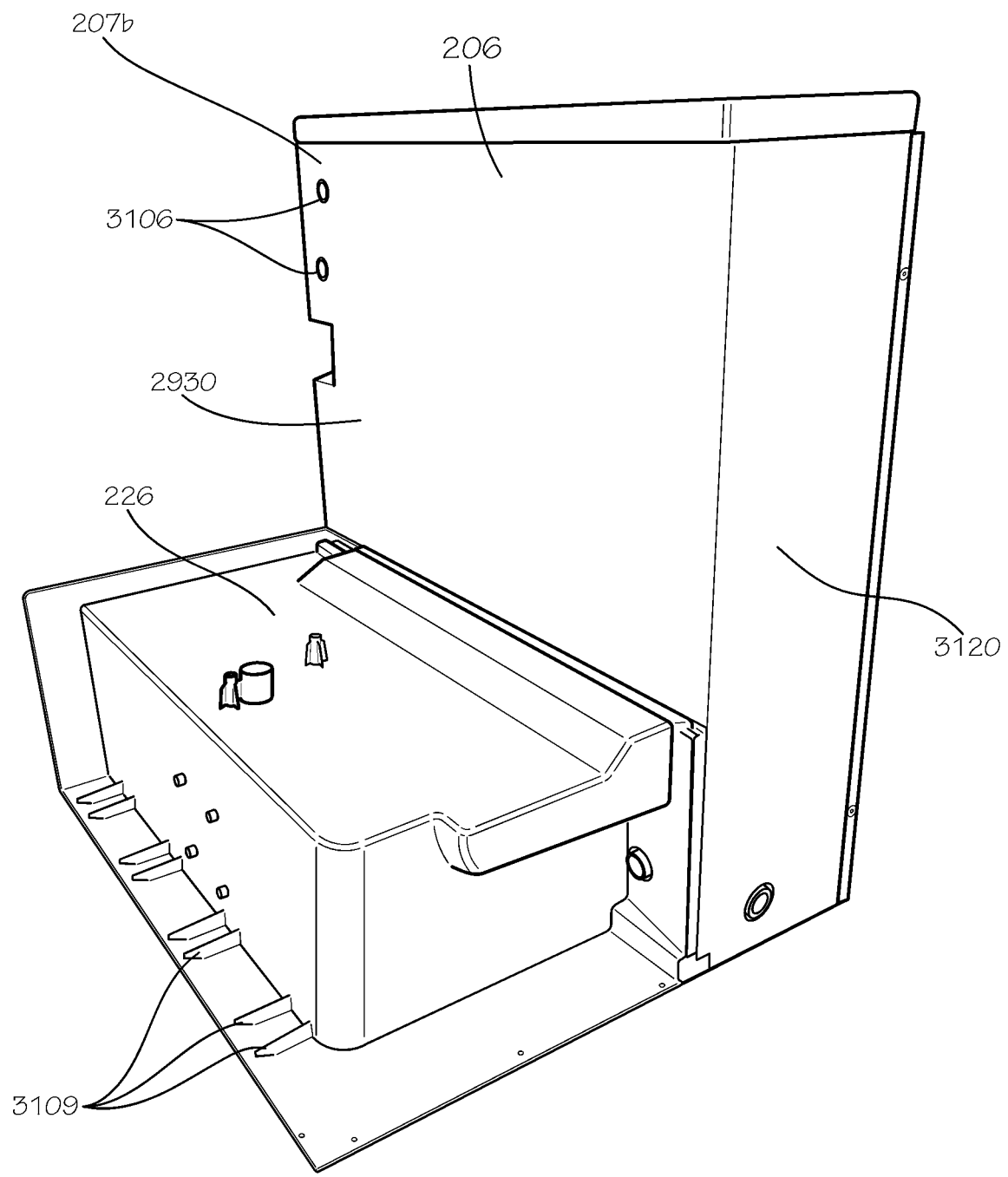
FIG. 31 is a rear perspective view of the evaporator case of the evaporator case of FIG. 5A and a liner of the compressor base of FIG. 2B with the rear panel and an interior side panel shown attached to the evaporator case.

FIG. 31 is a rear perspective view of the evaporator case 206 and a liner of the compressor base 226 with the rear panel 3120 and the interior side panel 2930 shown attached to the evaporator case 206. The rear panel 3120 and the interior side panel 2930 can attach to the evaporator case 206 as similarly described for the left side panel 2620 (shown in FIG. 26) with respect to the description of FIGS. 26-29. As shown, a pair of bosses 3106 of the evaporator wall 207b can extend through the interior side panel 2930. As shown, the compressor base 226 can define a plurality of declined projections 3109, similar to the declined projections 2909, which can slope downward and inward. The declined projections 2909 can be configured to frictionally engage a right side panel (not shown) of the outer casing 120 (shown in FIG. 1).

A plurality of exterior panels such as the left side panel 2620 (shown in FIG. 28B) and a plurality of interior panels such as the evaporator wall 207a (shown in FIG. 28B) can together define a plurality of overflow insulation cavities 2794,2994 (2794 shown in FIG. 28B, 2994 shown in FIG. 29B). The standing rib 2884,2984 (shown in FIG. 28B) and a wall body 2850,2950 (2850 shown in FIG. 28B, 2950 shown in FIG. 29B) of the interior panel and an inner surface 2623 (shown in FIG. 28B) of the exterior panel can define each of the plurality of overflow insulation cavities 2794, 2994. At each overflow insulation cavity 2794,2994, the inner surface 2623 of the exterior panel can contact with the standing rib 2884,2984 of an interior panel such as the evaporator wall 207a to define a seal therebetween. Flow of the blown foam insulation from the insulation cavity 2792 into each of the overflow insulation cavities 2794,2994 can be restricted by isolating the overflow insulation cavities 2794,2994 from the insulation cavity 2792 except through a pair of the gaps 2708,2908. The first gap 2708 of the pair of gaps 2708,2908 can be defined at a first end of the standing rib 2884,2984 at least partly by a first sloped projection 2709,2909. The second gap 2908 of the pair of gaps 2708, 2908 can be defined at a second end of the standing rib 2884,2984 at least partly by a second sloped projection 2709,2909. A transverse cross-sectional surface area of the overflow insulation cavity 2794,2994 at each of the first gap 2708 and the second gap 2908 can be less than a transverse cross-sectional surface area of the overflow insulation cavity 2794,2994 at a position offset from each of the first gap 2708 and the second gap 2908.

Figure 32:
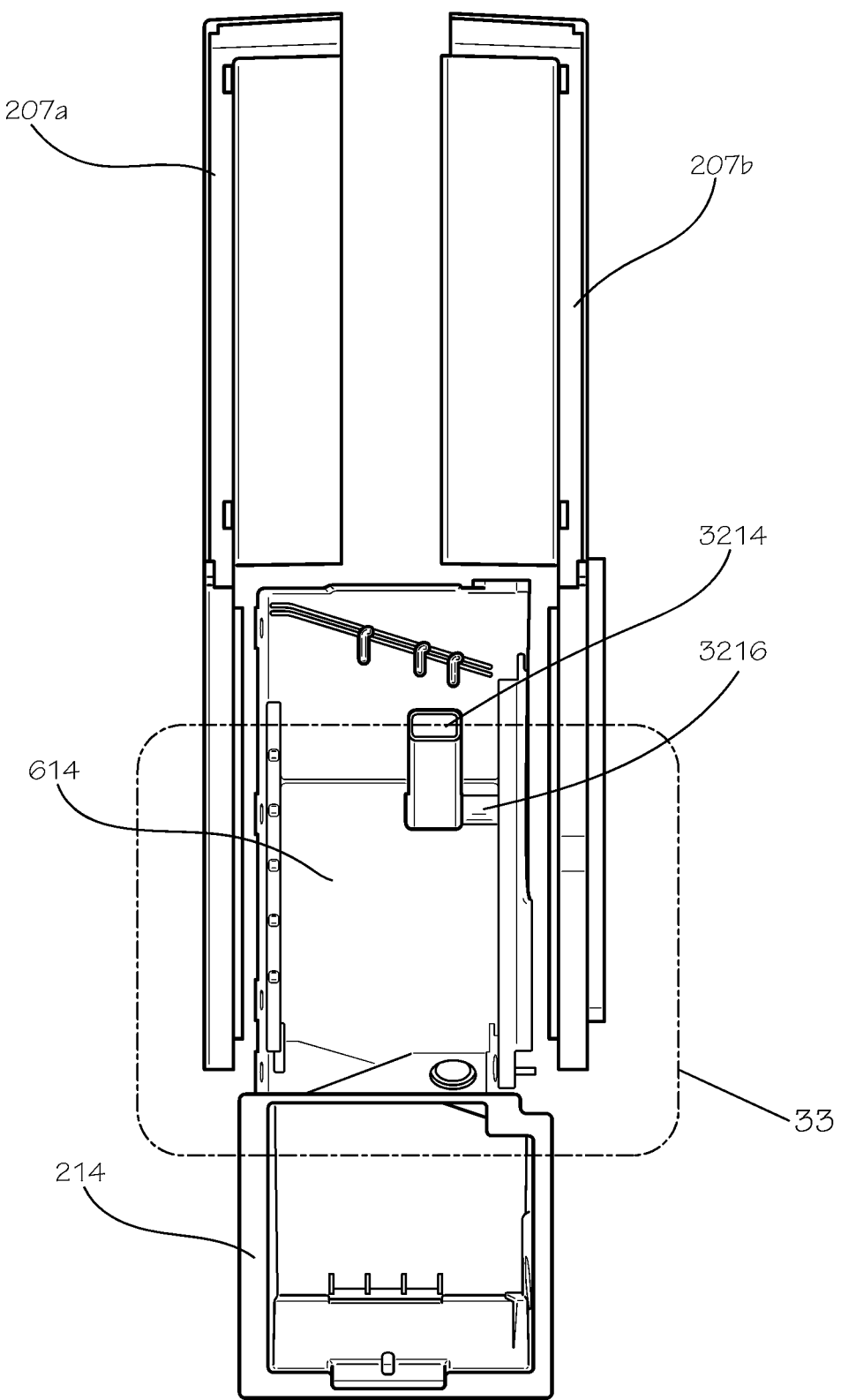
FIG. 32 is a front top exploded perspective view of the evaporator walls and the tank of the evaporator case of FIG. 5A.

FIG. 32 is an front top exploded perspective view of the evaporator walls 207a,b and the tank 214, each of FIG. 2. The tank 214 can define an overflow drain 3214 disposed within the water reservoir 614. The tank 214 can further define a drainage passage 3216 in fluid communication with the overflow drain 3214 which can lead to the drainage channel 3010 (shown in FIG. 30) of the tank base 602 (shown in FIG. 6). In order to prevent an overflow of the tank 214, the overflow drain 3214 can be configured to drain water from the water reservoir 614 if the water level rises above a top end of the overflow drain 3214.

Figure 33:
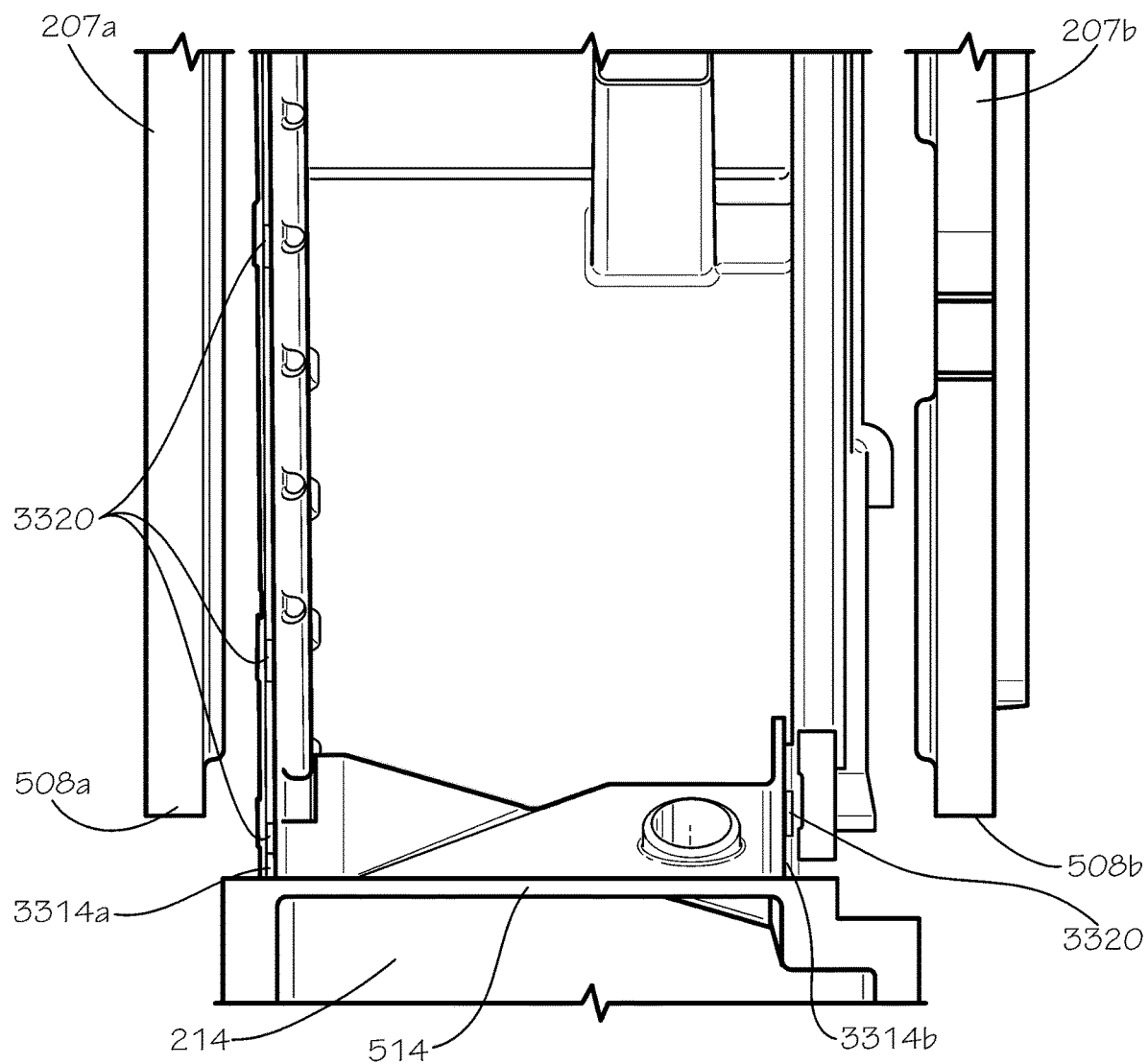
FIG. 33 is a detail front exploded perspective view of the tank and the bottom wall ends of the evaporator walls taken from detail 33 of FIG. 32.

FIG. 33 is a detailed front top exploded perspective view of the tank 214 and the bottom wall ends 508a,b of the evaporator walls 207a,b, respectively. The top tank end 514 can define a pair of grooves 3314a,b, which can respectively be configured to receive the bottom wall ends 508a,b of the respective evaporator walls 207a,b to attach the tank 214 to the evaporator walls 207a,b. Each of the grooves 3314a,b can define one of more slots 3320, which can extend through the respective groove 3314a,b.

Figure 34:
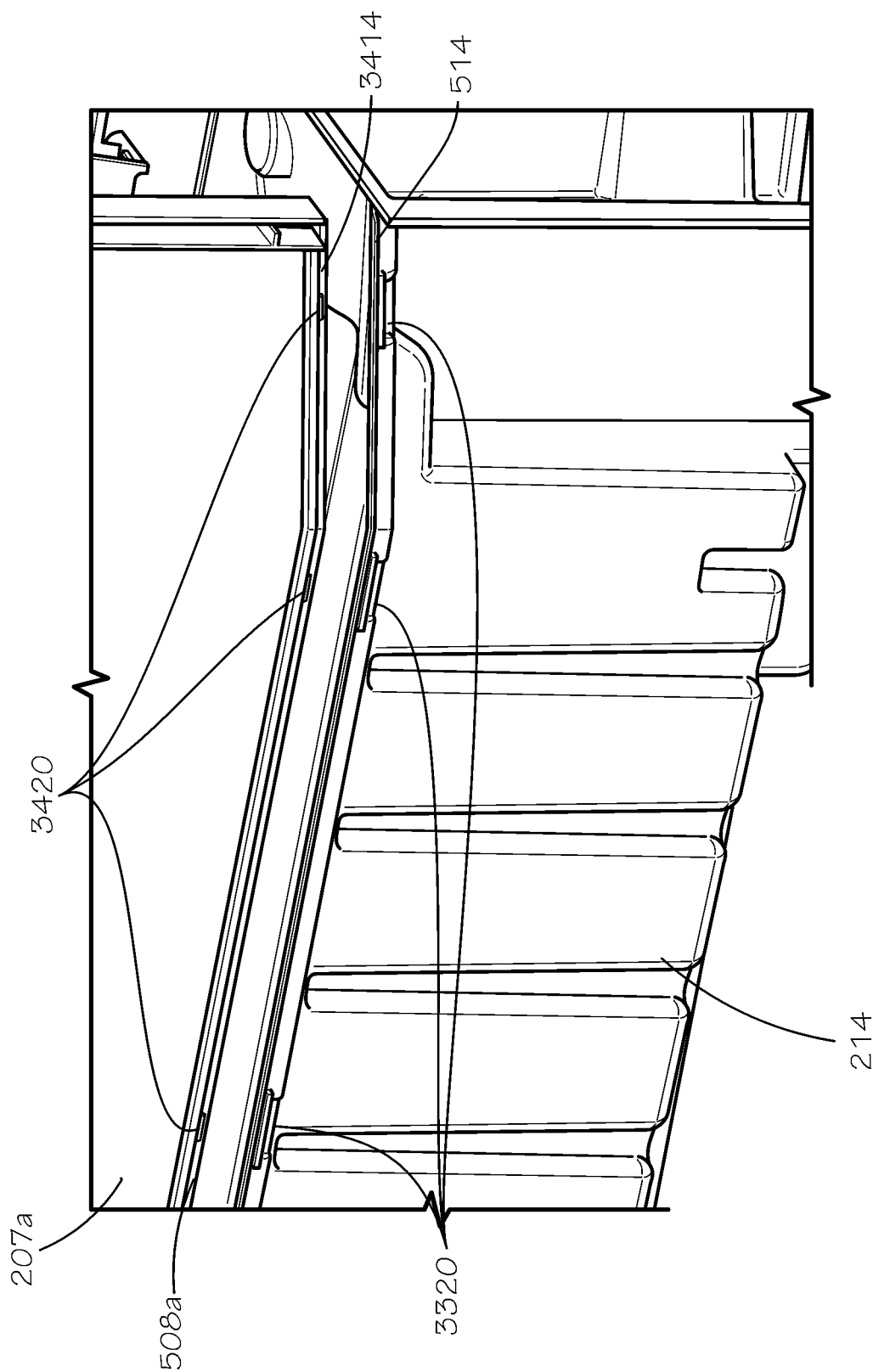
FIG. 34 a detailed exploded perspective view of the tank and the bottom wall end of the evaporator wall of the evaporator case of FIG. 5A.

FIG. 34 is a detailed exploded perspective view of the tank 214 and the bottom wall end 508a of the evaporator wall 207a. The bottom wall end 508a can define a lip 3414, which can be configured to be received by the top tank end 514 within the groove 3314a (shown in FIG. 33). The lip 3414 can define tabs 3420, which can be configured to engage the slots 3320 defined by the tank 214 with a barb as shown. The evaporator wall 207b (shown in FIG. 33) can define a similar lip and tabs configured to engage the groove 3314b (shown in FIG. 33) and the slot 3320 (shown in FIG. 33) defined within the groove 3314b.

Figure 35:
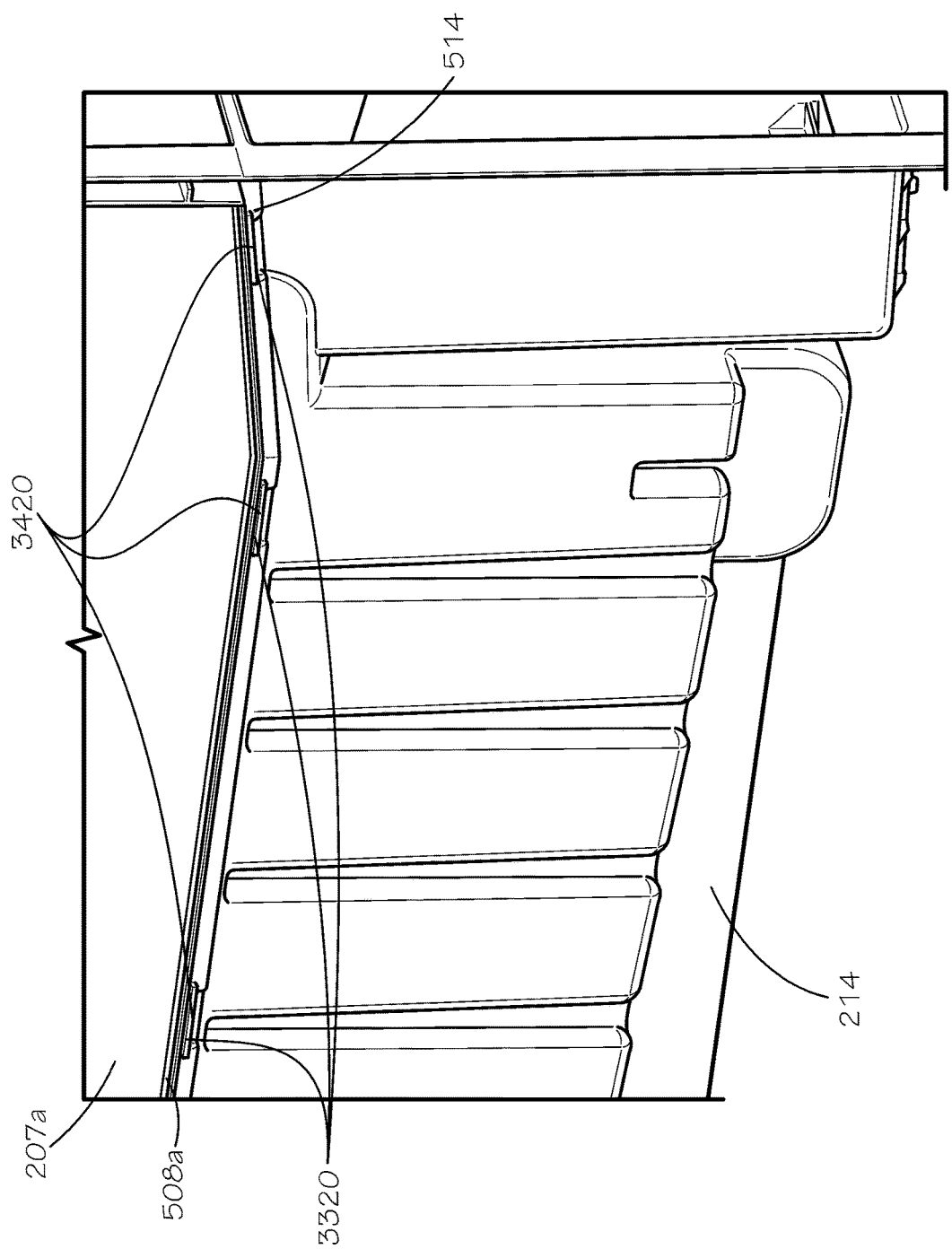
FIG. 35 is a detail perspective view of the bottom wall end of the evaporator wall and the top tank end of the tank secured together.

FIG. 35 is a detailed perspective view of the bottom wall end 508a of the evaporator wall 207a and the top tank end 514 of the tank 214 secured together. In the present aspect, the lip 3414 (shown in FIG. 34) can be received within the groove 3314a (shown in FIG. 33). With the lip 3414 received within the groove 3314a, the tabs 3420 can engage the slots 3320, thereby securing the evaporator wall 207a to the tank 214. The evaporator wall 207b (shown in FIG. 33) can be similarly attached to the tank 214. Engagement of the tabs 3420 with the slots 3320 can provide for a snap-together, tool-free assembly, which can save time during the assembly process.

FIG. 36A is a rear exploded perspective view of the evaporator walls 207a,b and the tank 214 of FIG. 2A. As previously described with respect to FIG. 13, each of the evaporator walls 207a,b can be substantially L-shaped, and the rear wall ends 510a,b can be connected together at a rear seam to form a back panel 1307 (shown in FIG. 36B) of the evaporator case 206 (shown in FIG. 36B). Similar to the grooves 3314a,b (shown in FIG. 33), the evaporator wall 207a can define slots 3622, which can be similar to the slots 3320 (shown in FIG. 33). The evaporator wall 207b can define a lip 3614, similar to the lip 3414 (shown in FIG. 34) which can define tabs 3620, similar to the tabs 3420 (shown in FIG. 34). As shown, the groove 3314a can extend around the back end of the top tank end 514, and the groove 3314a can be configured to receive the bottom wall ends 508a,b.

FIG. 36B is a perspective rear view of the back panel 1307 of the evaporator case 206 attached to the tank 214. The groove (not shown) of the evaporator wall 207a can receive the lip 3614 (shown in FIG. 36A) of the evaporator wall 207b.

Figure 37A:
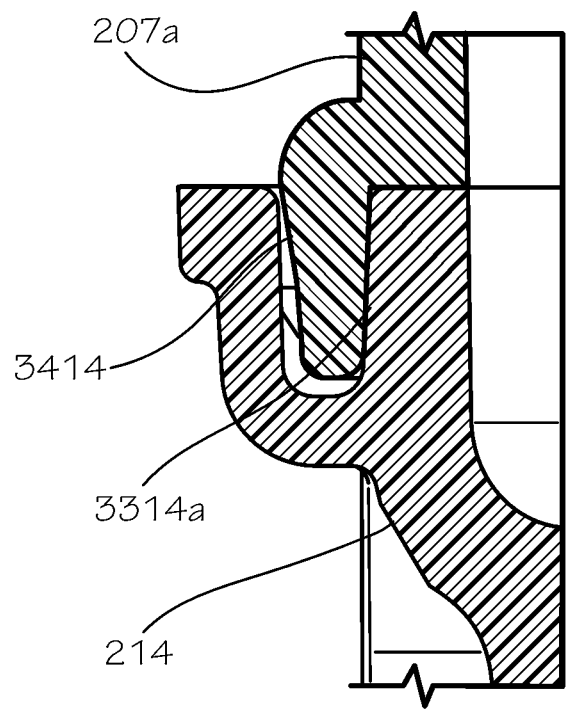
FIG. 37A is a detail sectional view of a lip of a bottom wall end of the evaporator wall engaged with a groove of a top tank end of the tank of FIG. 34 at a position between a tab-slot combination.
Figure 37B:
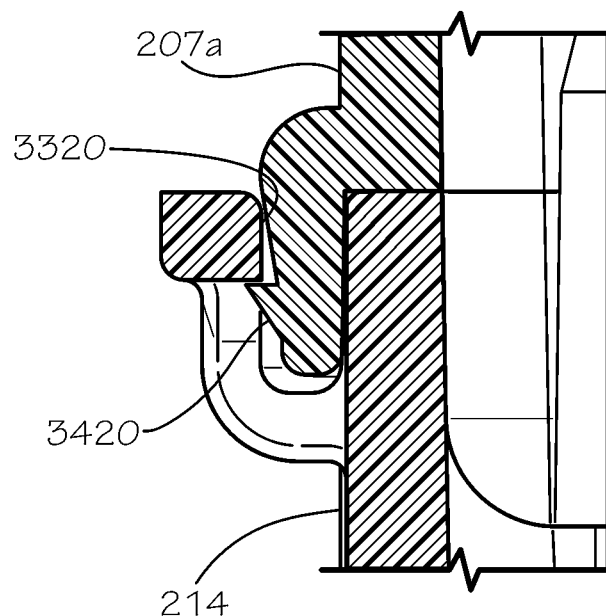
FIG. 37B is a detail sectional view of the structure shown in FIG. 37A at a position of the tab-slot combination.

FIG. 37A shows the lip 3414 of the evaporator wall 207a received within the groove 3314a defined in the tank 214, and FIG. 37B shows the tab 3420 of the lip 3414 engaged with the slot 3320 of the groove 3314a (shown in FIG. 37A). As shown in FIG. 36B, the tabs 3620 can similarly engage the slots 3622 to secure the rear wall ends 510a,b together to form the back panel 1307 of the evaporator case 206. Once assembled, the evaporator case 206 can be seated atop the top tank end 514 of the tank 214 as previously described to attach the tank 214 to the evaporator case 206. As desired, any two thicker-walled portions of the evaporator case 206 such as, for example and without limitation, any portions of the evaporator walls 207a,b of the evaporator case 206 or, more generally, the ice maker 110, can be similarly constructed and joined.

Figure 38:
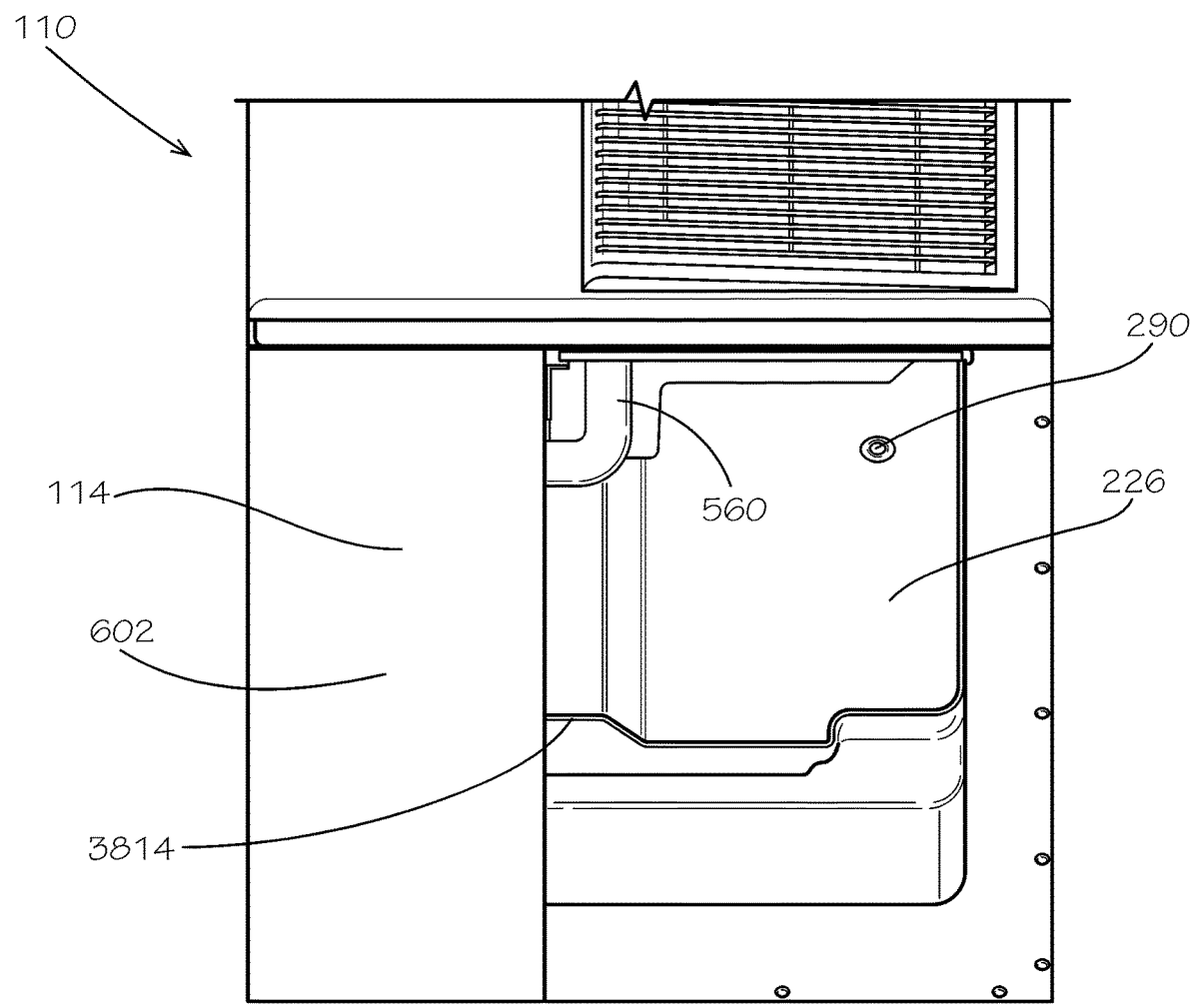
FIG. 38 is a bottom perspective view of the bottom maker end of the ice maker of FIG. 1.

FIG. 38 is a bottom perspective view of the bottom maker end 114 of the ice maker 110 of FIG. 1. As shown, the tank base 602 and the base case 205 can together define the bottom maker end 114 and the bottom opening 3814. The bottom opening 3814 can be aligned with an opening (not shown) in the top bin end 192 (shown in FIG. 1) of the storage bin 190 (shown in FIG. 1). The ice cubes 490 produced by the ice maker 110 can fall through the bottom opening 3814 and into storage bin 190. The ultrasonic bin sensor 290 can extend through the compressor base 226 and be positioned above the bottom opening 3814. The ultrasonic bin sensor 290 can transmit ultrasonic waves downwards through the bottom opening 3814 and into the storage bin 190 in order to measure the level of the ice cubes 490 within the storage bin 190, as previously discussed.

Figure 39:
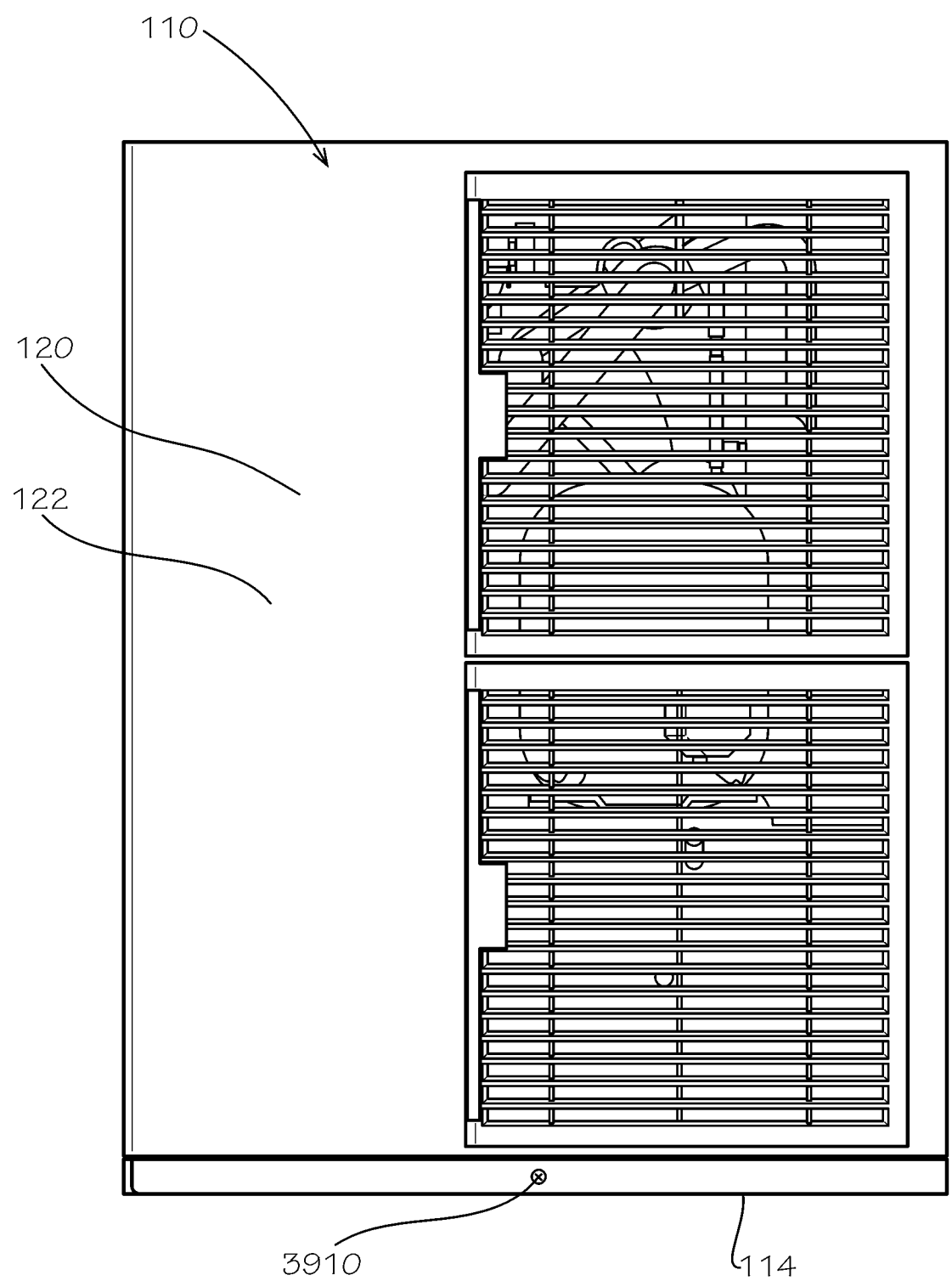
FIG. 39 is a front view of the ice maker of FIG. 1.

FIG. 39 is a front view of the ice maker 110 of FIG. 1. The front panel assembly 122 can be retained on the ice maker 110 by a fastener 3910, such as a screw, located near the bottom maker end 114. Once the fastener 3910 is loosened, the front panel assembly 122 can be lifted off and removed from the ice maker 110 to provide access for maintenance, cleaning, or any other purpose. As described elsewhere herein and shown in the figures, removal of the single fastener 3910 can facilitate access by a user to an interior of the evaporator case including the spout 1414 from a front of the ice maker without tools.

Figure 40:
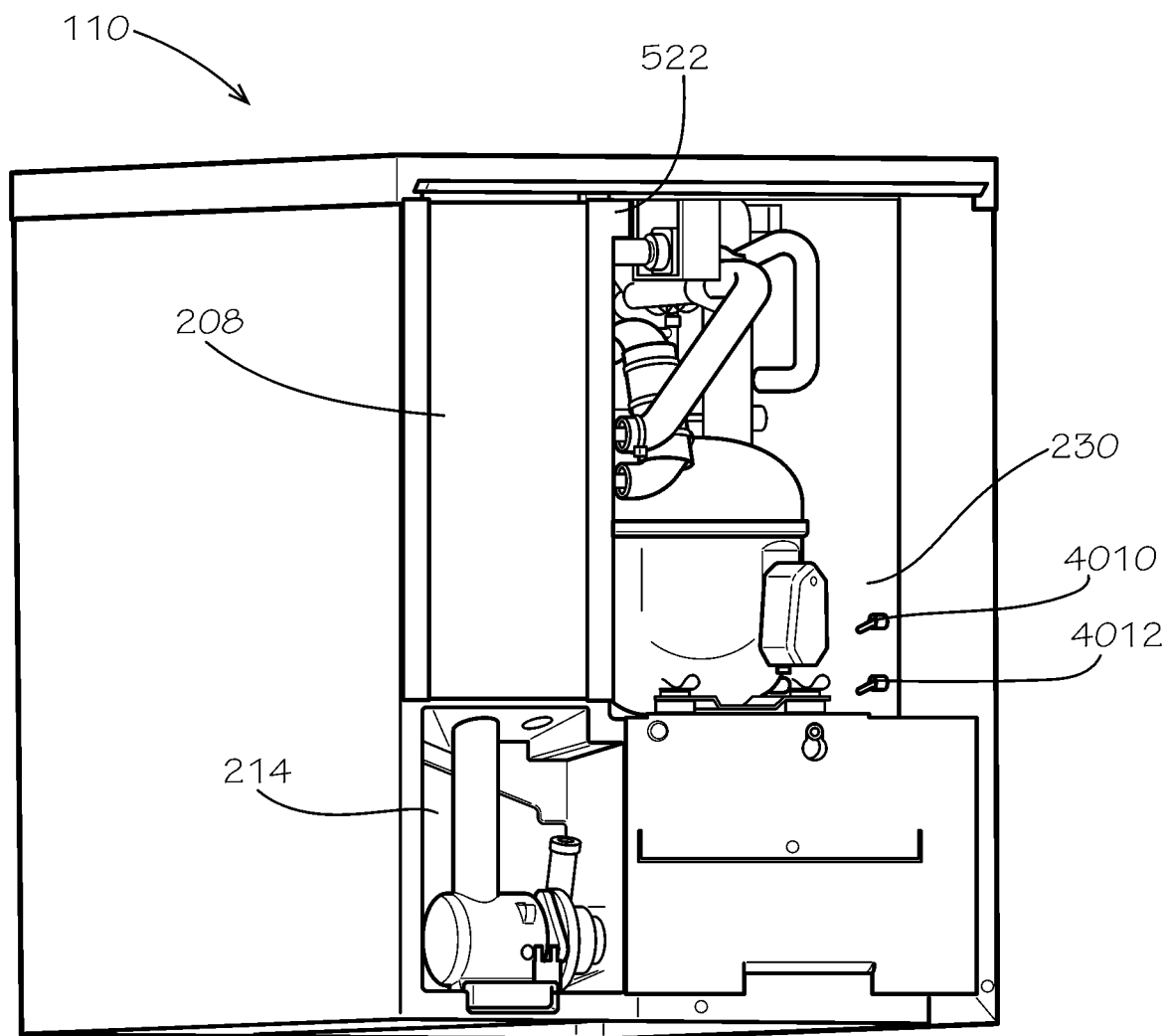
FIG. 40 is a front side perspective view of the ice maker of FIG. 1 with the front panel assembly removed, exposing the control box.

FIG. 40 is a perspective view of the ice maker 110 with the front panel assembly 122 removed, exposing the control box 230, the front insulation 208, and the tank 214. By pulling the pull tab 522 of the front insulation 208, an inside portion of the wet compartment 202 (shown in FIG. 2A) can be accessed, such as for cleaning. The control box 230 can comprise a first switch 4010 and a second switch 4012, both of which can be hidden behind the front panel assembly 122 to discourage tampering by unauthorized personnel. Either of the switches 4010,4012 can be a toggle switch. The first switch 4010 can be a control switch 4010, and the second switch 4012 can be a mode switch 4012.

In order to clean and sanitize the ice maker 110, the front panel assembly 122 (shown in FIG. 39) can first be removed as shown. Unless otherwise specified, this step and any of the manual steps below can be performed by a user or technician of the ice machine 100. The control switch can then be switched to the "OFF" position for 3 minutes while the mode switch 4012 is in the "ICE" position. The control switch 4010 can then be moved to the "ON" position, and the front panel assembly 122 can be replaced. After 3 minutes, the front panel assembly 122 can be removed again, and the control switch 4010 can be switched to the "OFF" position. The storage bin 190 (shown in FIG. 1) can then be emptied of ice and, where applicable, turned off in preparation for cleaning.

Next, the mode switch 4012 can be switched to the "CLEAN" position, and the control switch 4010 can then be moved to the "ON" position. At this time, automatic confirmation of the control switch 4010 being switched to the "ON" position can come by way of 1 short beep followed 3 seconds later by 1 long beep. The front panel assembly 122 can then be replaced. During this time, the water reservoir 614 (shown in FIG. 6) of the tank 214 can be drained and filled automatically by the ice maker 110. The controller 232 of the control box 230 can next emit a beeping noise (which can be in the form of a 2-beep sequence, i.e., beep, beep, pause and then repeat), at which time the front panel assembly 122 can be removed, and the control switch 4010 can be switched to the "OFF" position. The front insulation 208 can be removed, and then a quantity of cleaning fluid, such as 10.4 fl. oz. of Hoshizaki SCALE AWAY cleaning fluid, for example and without limitation, can be poured into the water reservoir 614 via the spout 1414 (shown in FIG. 14). In some aspects, the cleaning fluid can comprise 5.4 ounces of cleaner per gallon. The control switch 4010 can then be switched to the "ON" position, at which time automatic confirmation can again come by way of the aforementioned 1 short beep followed 3 seconds later by 1 long beep, and the front panel assembly 122 can be replaced. At this time, the cleaning fluid and water mixture ("cleaning solution") can be recirculated through the water circuit 450 (shown in FIG. 4). Before each cycle, a 1-minute delay can be automatically initiated to avoid excessive foaming of the cleaning solution. After automatically circulating the cleaning solution through the water circuit 450 for 30 minutes, the ice maker 110 can automatically perform 3 rinse cycles in succession. Once the controller 232 starts beeping again (which can be in the form of a 5-beep sequence), the front panel assembly 122 can be removed, and the control switch 4010 can be switched to the "OFF" position. In uses wherein the ice maker 110 is exposed to bad or severe water conditions, the power supply can be turned off to the ice maker 110, and the cube guide 550 (shown in FIG. 5), the float switch 690 (shown in FIG. 6), the water supply tubes, the spray tube 312 (shown in FIG. 3), and the spray guides 1912a,b (shown in FIG. 19) can be removed, cleaned, rinsed, and reinstalled. For example and without limitation, the components can be cleaned in a solution of warm water and Hoshizaki SCALE AWAY cleaning fluid added to the water at a rate of 5 oz. of cleaning solution to 1 gallon of warm water.

To sanitize the ice maker 110, the mode switch 4012 can be placed in the "CLEAN" position, and the control switch 4010 can then be moved to the "ON" position, at which time automatic confirmation can again come by way of the aforementioned 1 short beep followed 3 seconds later by 1 long beep. The front panel assembly 122 can then be replaced. During this time, the water reservoir 614 of the tank 214 can automatically drain and refill. Once the control box 230 starts beeping (which can be in the form of the aforementioned 2-beep sequence), the front panel assembly 122 can be removed, and the control switch 4010 can be moved to the "OFF" position. The front insulation 208 can be removed, and then as sanitizing fluid, such as 0.6 fl. oz. of 8.25% sodium hypochlorite solution (chlorine bleach), for example and without limitation, can be added into the water reservoir 614 of the tank 214 via the spout 1414. In some aspects, the sanitizing fluid can comprise 200 parts per million of sodium hypochlorite solution based on tank size and the strength of the active ingredient in the solution. The front insulation 208 can be replaced, and the control switch 4010 can be moved to the "ON" position, at which time automatic confirmation can come one more time by way of the aforementioned 1 short beep followed 3 seconds later by 1 long beep. Next, the front panel assembly 122 can be replaced on the ice maker 110. There can be an automatic 1-minute delay between cycles to avoid excessive foaming. After automatically circulating the sanitizing solution through the water circuit 450 for approximately 30 minutes, the ice maker 110 can then automatically perform 3 rinse cycles in succession. Once the controller 232 starts beeping (which can again be in the form of the aforementioned 5-beep sequence), the front panel assembly 122 can be removed, and the control switch 4010 can be moved to the "OFF" position. The ice storage bin 190 can then be cleaned with a neutral cleaner and rinsed thoroughly. The mode switch 4012 can then be switched back to the "ICE" position, and the control switch 4010 can then be switched back to the "ON" position to resume ice production. The front panel assembly 122 can then be reinstalled on the ice maker 110.

Figure 41:
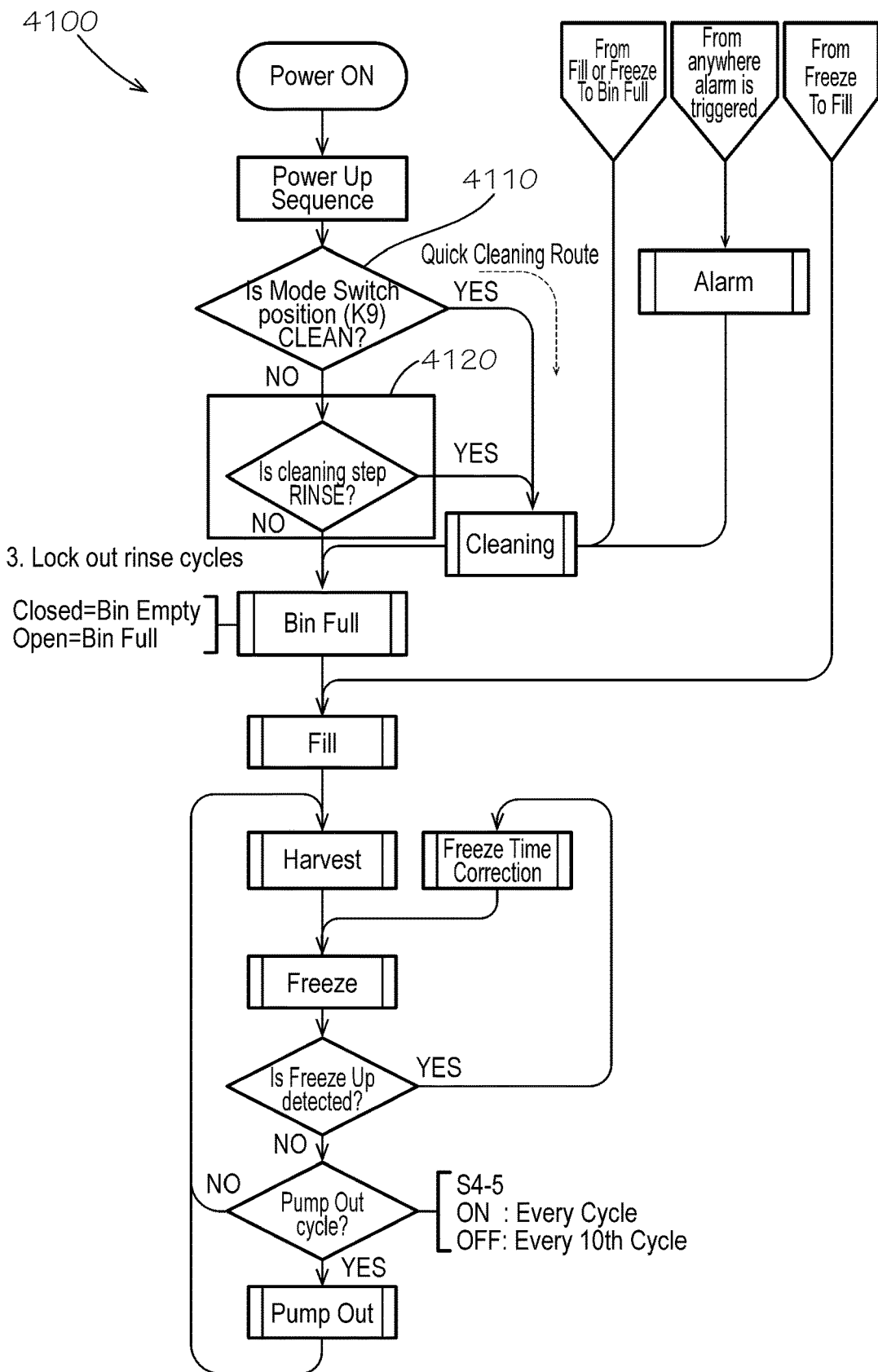
FIG. 41 is an operational flowchart showing the overall operation of a controller of the ice maker of FIG. 1.
Figure 42:
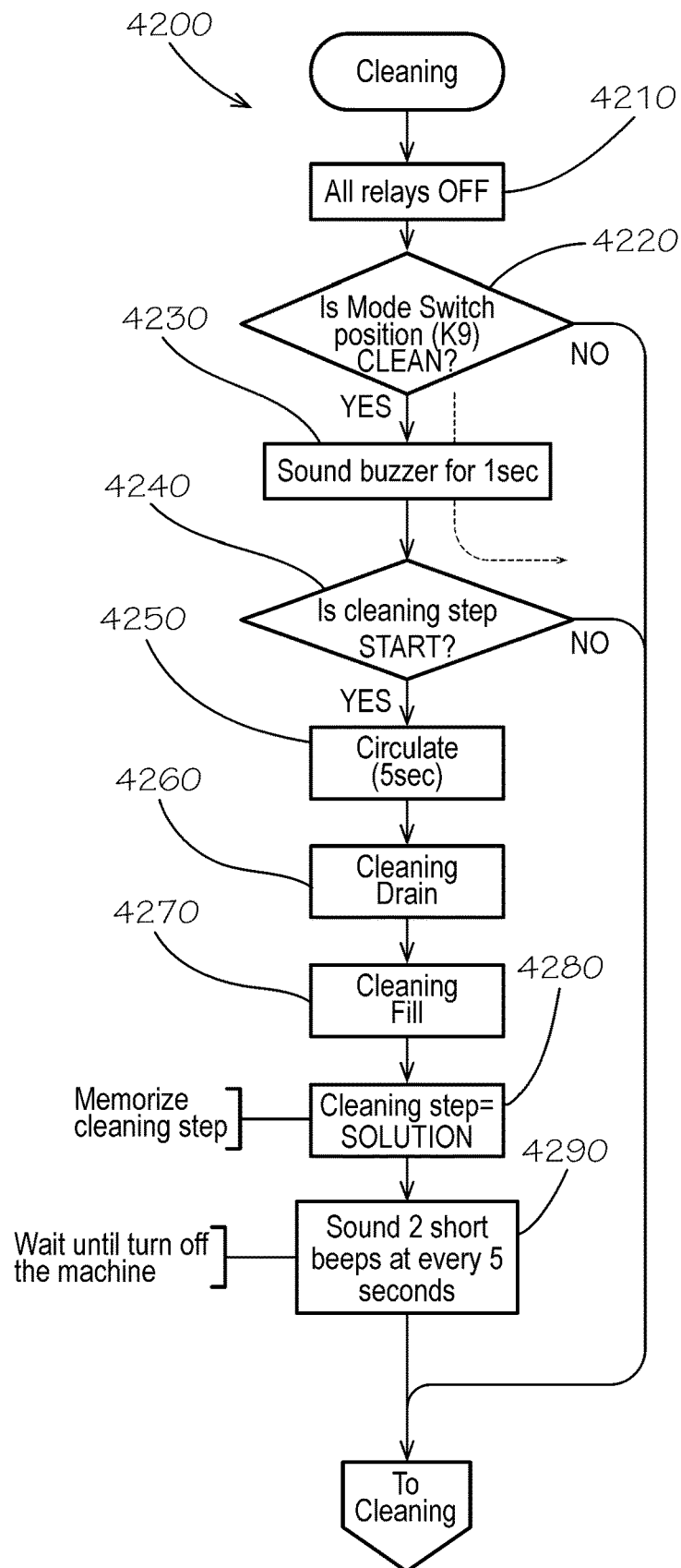
FIG. 42 is a first cleaning flowchart showing a first stage in a process of either cleaning or sanitizing the ice maker of FIG. 1.
Figure 43:
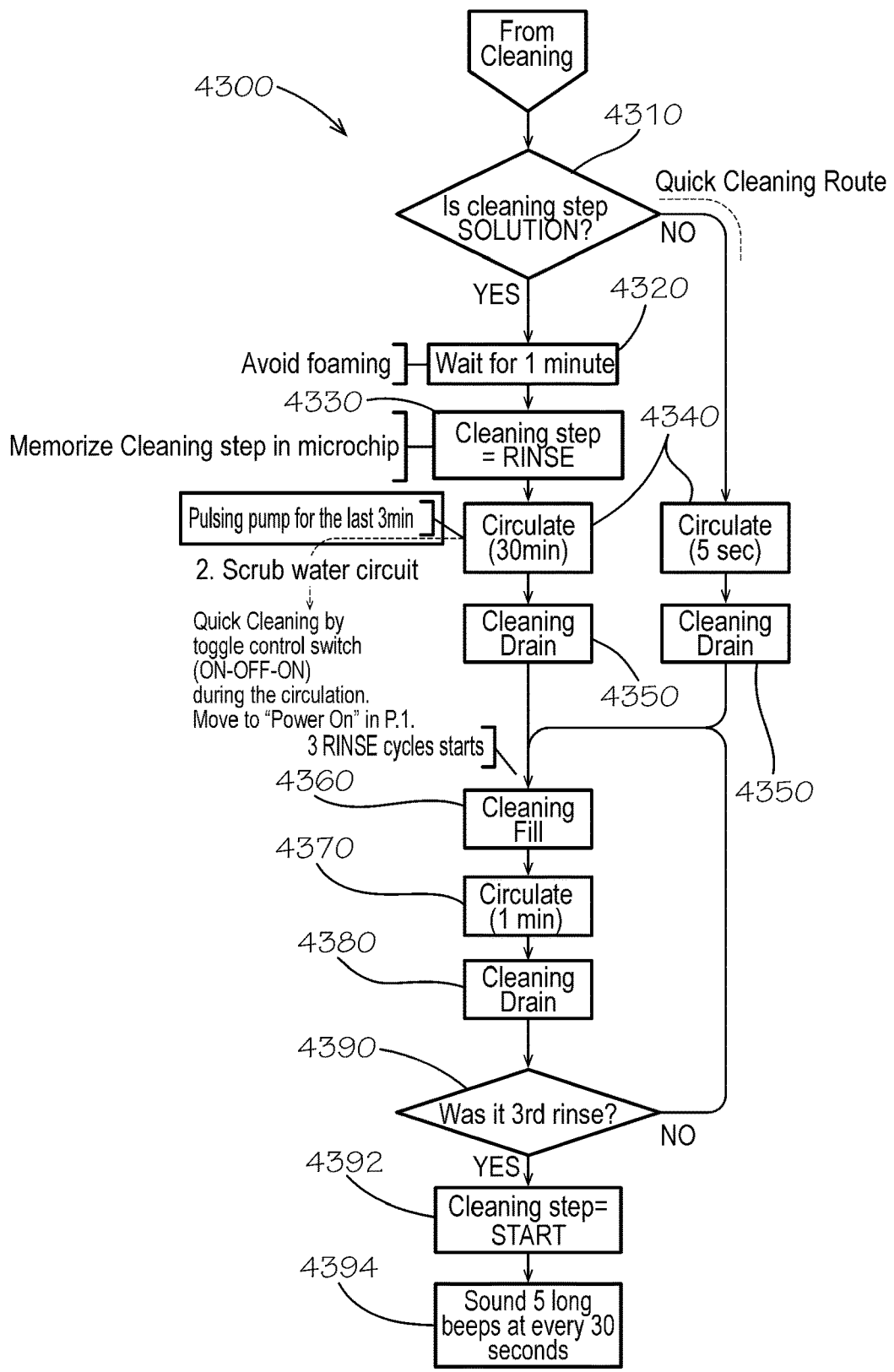
FIG. 43 is a second cleaning flowchart showing a second stage in the process of either cleaning or sanitizing the ice maker of FIG. 1.

FIGS. 41 through 43 show flowcharts representing the operation of the controller 232 of the control box 230 with respect to at least the cleaning and sanitizing functions of an overall cleaning procedure of the ice maker. A full cycle through each of the flowcharts described below can represent either a cleaning cycle or a sanitizing cycle. As shown in FIG. 41, an overall operational flowchart 4100 can comprise steps 4110 and 4120 pertaining to cleaning and sanitizing. The step 4110 can comprise the controller 232 determining whether the mode switch 4012 is in the "CLEAN" position. If the answer is NO, the step 4120 can comprise the controller 232 determining whether the cleaning step is RINSE. In addition, if the answer is NO, no cleaning cycle will be initiated by the controller 232. If the answer at either of the step 4110 or the step 4120 is YES, a cleaning cycle will be initiated starting with the steps shown in a first cleaning flowchart 4200 (shown in FIG. 42).

As shown in FIG. 42, the first cleaning flowchart 4200 can comprise steps 4210-4290. The step 4210 can comprise the controller 232 turning all relays in the control box 230 OFF. The step 4220 can comprise determining whether the mode switch 4012 is (still) in the CLEAN position. If the answer is NO, any subsequent steps in the first cleaning flowchart 4200 can be bypassed and the controller 232 can skip to the steps in a second cleaning flowchart 4300. If the answer is YES, a step 4230 can comprise sounding a buzzer for 1 second. A step 4240 can comprise the controller 232 determining whether the cleaning step is START. If the answer is NO, again, any subsequent steps in the first cleaning flowchart 4200 can be bypassed and the controller 232 can skip to the steps in a second cleaning flowchart 4300. If the answer is YES, a step 4250 can comprise circulating water through the water circuit 450 as exemplarily described in the flowchart or above. More specifically, the step 4250 can comprise turning the cleaning valve 354 (shown in FIG. 3) ON and turning the inlet water valve 352 (shown in FIG. 3) and the drain valve 356 (shown in FIG. 3) OFF. A step 4260 can comprise draining the water reservoir 614 as exemplarily described in the flowchart or above. More specifically, the step 4260 can comprise turning the drain valve 356 ON and turning the inlet water valve 352 and the cleaning valve 354 OFF. A step 4270 can comprise filling the water reservoir 614 as exemplarily described in the flowchart or above. More specifically, the step 4270 can comprise turning the inlet water valve 352 ON and turning the cleaning valve 354 and the drain valve 356 OFF. A step 4280 can comprise the controller 232 setting the cleaning step to SOLUTION. A step 4290 can comprise the controller 232 sounding 2 short beeps every 5 seconds as a signal to a user to proceed to the next step—pouring in the cleaning fluid (if a cleaning cycle) or pouring in the sanitizing fluid (if a sanitizing cycle). In fact, until and including the signal to the user to pour in the cleaning fluid or the sanitizing fluid, any subset or all of the steps 4220-4290 can be automated such that no user intervention is required. The first cleaning flowchart 4200 can then transition into the second cleaning flowchart 4300.

As shown in FIG. 43, the second cleaning flowchart 4300 can comprise steps 4310-4390, which can follow the user's pouring in of the cleaning fluid. The step 4310 can comprise the controller 232 determining whether the cleaning step is SOLUTION. If the answer is YES, a step 4320 can comprise the controller 232 initiating a 1-minute delay timer. A step 4330 can comprise the controller 232 setting the cleaning step to RINSE. A step 4340 can comprise the controller 232 causing the water circuit 450 to circulate the cleaning solution for a period of time such as 30 minutes. During a final 3 minutes of the 30-minute period—or during any other desired proportion of a similar circulating period—the controller 232 can cause the water pump to pulsate or pulse, which can help more aggressively clean the surfaces of the water circuit 450 by in effect using a rapid pressure tap to knock off scale, calcium deposits, and other contaminants from surfaces of the water circuit. A step 4350 can comprise the controller 232 draining the water reservoir 614. If the answer at the step 4310 is NO, the controller 232 can skip directly to the step 4340 and the step 4350 (i.e., the controller 232 can bypass the rinsing step). Steps 4360-4380 can comprise a single rinse cycle. More specifically, a step 4360 can comprise the controller 232 causing the water circuit 450 to fill the water reservoir 614; a step 4370 can comprise the controller 232 causing the water pump to circulate water through the water circuit 450; and a step 4380 can comprise the controller 232 causing the water pump to drain the water reservoir 614. A step 4390 can comprise the controller 232 repeating the steps 4360-4380 until a third rinse cycle is complete. A step 4392 can comprise the controller 232 setting the cleaning step back to START (to prepare for the next full cleaning cycle in the future). A step 4394 can comprise the controller 232 sounding 5 long beeps every 10 seconds to signal to the user that the cleaning cycle is complete. Moreover, any subset or all of the steps 4310-4394 can be automated such that no user intervention is required. The aforementioned steps of the first cleaning flowchart 4200 and the second cleaning flowchart 4300 can be repeated to perform a sanitizing cycle.

The process of cleaning and sanitizing the ice maker 110 can be helpful in maintaining the quality (e.g., size, hardness, and clarity) of the ice cubes 490 and can also be helpful in removing bacteria such as *Pseudomonas aeruginosa* bacteria from the system. Internal and regulatory testing (such as for the National Sanitation Foundation or NSF) has found that the processes described herein are capable of not only meeting regulatory requirements for hygiene but also maintaining a desirable pH level in the water in the water circuit 450 (which can be, for example, a pH value of 7 plus or minus 0.5) after cleaning and sanitizing.

Several advantages can be realized in the cleaning and sanitizing processes described herein. While in some aspects some manual interaction by the user can be required, as noted already many steps that were manually timed and/or initiated in previously implemented processes have now become automatic. In the cleaning stage, for example, 9 basic steps have become 5 steps, and all timing steps have been incorporated into the controller 232 (as manifested in various beeping signals to the user). In the sanitizing stage, 14 basic steps have become the same 5 steps followed in the cleaning stage, and again all timing steps have been incorporated into the controller 232 (as manifested in various beeping signals to the user). In previously implemented processes, a water pump hose was required to be disconnected and reconnected multiple times during each stage, and a cleaning valve was also required to be closed and opened multiple times during each stage, leading to an overall cleaning and sanitizing process that could take several hours of constant supervision, whereas with the method described herein even a two-hour long cleaning process need not be constantly supervised, as the user can walk away and return upon prompting by the beeping of the control board. The complexity of the water circuit 450 has also been significantly reduced. What previously required over 50 parts now requires only about 22 parts, a parts reduction of over 50%. This is possible by replacing the manual cleaning valve in previous implementations with the valves 352,354,356 such as shown in FIG. 2C and controlling the valves 352,354,356 with the controller 232.

One should note that conditional language, such as, among others, "can," "could," "might," or "may" unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of using an ice maker, the method comprising:
    forming ice on an evaporator of the ice maker, the evaporator housed inside an evaporator case of the ice maker;
    harvesting the ice from the evaporator; and
    performing an overall cleaning procedure on the ice maker, the overall cleaning procedure comprising:
        a first manual intervention comprising activating a switch of the ice maker, activating the switch of the ice maker comprising initiating the overall cleaning procedure;
        a first automatic step comprising signaling to a user that a second manual intervention comprising pouring one of a cleaning fluid and a sanitizing fluid into a tank of the evaporator case is required;
        the second manual intervention comprising pouring the one of the cleaning fluid and the sanitizing fluid into the tank; and
        a second automatic step comprising automatically initiating and completing at least one of a cleaning stage and a sanitizing stage upon completion of the second manual intervention, automatically initiating the at least one of the cleaning stage and the sanitizing stage comprising operating a cleaning valve of a water circuit of the ice maker by a main controller of the ice maker.

2. The method of claim 1, wherein signaling to the user that the second manual intervention is required comprises sounding an audible alarm.

3. The method of claim 1, wherein pouring the one of the cleaning fluid and the sanitizing fluid into the tank comprises pouring the one of the cleaning fluid and the sanitizing fluid into a portion of a top tank end of the tank sloping downwards with respect to a horizontal orientation from a front end of the tank, the method further comprising directing the one of the cleaning fluid and the sanitizing fluid into a water reservoir defined by the tank.

4. The method of claim 1, further comprising:
    causing a water pump of the ice maker to pulsate at least one of a) the one of the cleaning fluid and the sanitizing fluid and b) water exiting the water pump; and
    delivering the at least one of a) the one of the cleaning fluid and the sanitizing fluid and b) the water to the evaporator through the water circuit of the ice maker in a pulsating condition to facilitate cleaning of the evaporator.

5. The method of claim 1, further comprising:
    maintaining connections of all hoses in the water circuit during the overall cleaning procedure.

6. The method of claim 1, wherein:
    forming ice on the evaporator comprises:
        spraying water downwards into a series of channels defined by an evaporator plate of the evaporator, the evaporator being positioned in a vertical orientation in the evaporator case; and
        forming ice cubes on the surface of the evaporator plate; and
    harvesting the ice from the evaporator comprises releasing the ice cubes from the surface of the evaporator plate during a harvest cycle of the ice maker.

7. A method of cleaning an evaporator of an ice maker, the method comprising:
    a first manual intervention comprising activating a switch of an ice maker, activating the switch of the ice maker comprising initiating an overall cleaning procedure;
    a first automatic step comprising signaling to a user that a second manual intervention comprising pouring one of a cleaning fluid and a sanitizing fluid into a tank of an evaporator case of the ice maker is required;

the second manual intervention comprising pouring the one of the cleaning fluid and the sanitizing fluid into the tank; and a second automatic step comprising automatically initiating and completing at least one of a cleaning stage and a sanitizing stage upon completion of the second manual intervention, automatically initiating the at least one of the cleaning stage and the sanitizing stage comprising operating a cleaning valve of a water circuit of the ice maker by a main controller of the ice maker.

8. The method of claim 7, further comprising:

removing a single fastener securing a portion of an outer casing of the ice maker; and gaining, by only removing the single fastener, tool-less access by the user to the tank of the evaporator case from a front of the ice maker.

9. The method of claim 7, wherein pouring the one of the cleaning fluid and the sanitizing fluid into the tank comprises pouring the one of the cleaning fluid and the sanitizing fluid into a portion of a top tank end of the tank sloping downwards with respect to a horizontal orientation from a front end of the tank, the method further comprising directing the one of the cleaning fluid and the sanitizing fluid into a water reservoir defined by the tank.

10. The method of claim 7, further comprising:

delivering a fluid comprising the one of the cleaning fluid and the sanitizing fluid to an evaporator of the ice maker through the water circuit of the ice maker;

causing a water pump of the ice maker to pulsate the fluid delivered to the evaporator; and delivering the fluid to the evaporator in a pulsating condition to facilitate cleaning of the evaporator.

11. The method of claim 10, wherein delivering the fluid to the evaporator in a pulsating condition to facilitate cleaning of the evaporator comprises delivering the fluid to the evaporator in a pulsating condition for at least three minutes.

12. The method of claim 7, further comprising circulating the one of the cleaning fluid and the sanitizing fluid for a predetermined period of time.

13. The method of claim 12, wherein the predetermined period of time is 30 minutes or less.

14. The method of claim 7, further comprising:

maintaining connections of all hoses in the water circuit during the overall cleaning procedure.

15. The method of claim 7, wherein signaling to the user that the second manual intervention is required comprises sounding an audible alarm.

16. The method of claim 15, wherein the audible alarm is a first audible alarm, the method further comprising sounding a second audible alarm before or after sounding the first audible alarm.

17. The method of claim 7, further comprising initiating a delay timer after pouring the cleaning fluid into the tank.

18. The method of claim 7, wherein automatically initiating and completing one of a cleaning stage and a sanitizing stage comprises initiating the cleaning stage, the method further comprising initiating a sanitizing stage.

19. The method of claim 7, further comprising a third automatic step comprising automatically initiating and completing a rinsing stage, automatically initiating and completing the rinsing stage comprising initiating and completing a plurality of rinse cycles.

20. The method of claim 7, further comprising maintaining in water in the water circuit a pH level of 7, plus or minus 0.5, after cleaning and sanitizing.

* * * * *